(12) United States Patent
Geens et al.

(10) Patent No.: US 12,366,717 B2
(45) Date of Patent: Jul. 22, 2025

(54) TELECOMMUNICATIONS TRAY ASSEMBLY

(71) Applicant: CommScope Connectivity Belgium BVBA, Kessel-Lo (BE)

(72) Inventors: Johan Geens, Bunsbeek (BE); Pieter Vermeulen, Westerlo (BE); Eric Marcel M. Keustermans, Houwaart (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 304 days.

(21) Appl. No.: 18/190,748

(22) Filed: Mar. 27, 2023

(65) Prior Publication Data

US 2023/0314748 A1 Oct. 5, 2023

Related U.S. Application Data

(60) Continuation of application No. 17/304,075, filed on Jun. 14, 2021, now Pat. No. 11,614,593, which is a
(Continued)

(51) Int. Cl.
*G02B 6/00* (2006.01)
*G02B 6/38* (2006.01)
*G02B 6/44* (2006.01)

(52) U.S. Cl.
CPC ......... *G02B 6/4452* (2013.01); *G02B 6/3897* (2013.01); *G02B 6/4453* (2013.01); *G02B 6/4455* (2013.01)

(58) Field of Classification Search
CPC .. G02B 6/4452; G02B 6/3897; G02B 6/4453; G02B 6/4455; G02B 6/00
See application file for complete search history.

(56) References Cited

U.S. PATENT DOCUMENTS 4,708,430 A 11/1987 Donaldson et al.
4,792,203 A 12/1988 Nelson et al.
(Continued)

FOREIGN PATENT DOCUMENTS

DE 4329184 A1 3/1995
DE 4413136 C1 5/1995
(Continued)

OTHER PUBLICATIONS

Extended European Search Report for Application No. 24172856.7 mailed Aug. 20, 2024.
(Continued)

*Primary Examiner* — Jennifer Doan
(74) *Attorney, Agent, or Firm* — Merchant & Gould P.C.

(57) ABSTRACT

A modular multi-positionable tray assembly (420) for mounting within a chassis (10) of a telecommunications panel (100) is disclosed. The multi-positionable tray assembly (420) may include support arm structure (423) having a first support arm (424) and a second support arm (480) that pivotally supports a tray (422) and that allows the tray assembly (420) to be installed and removed from the chassis (10). The tray (422) and the support arm structure (423) cooperatively define a cable routing pathway (208) that extends through a pivot axis (A1) defined by the tray and the support arm. To protect the cables (300) and to increase accessibility of cables (300) within the portion of the cable routing pathway (208) defined by the tray (422), a bend radius limiter (460) can be provided that is rotatably mounted to the tray (422). The tray (422) can also be provided with attachment features for allowing the tray (422) to accept various telecommunications components, such as splice trays and splitter trays.

10 Claims, 60 Drawing Sheets

Related U.S. Application Data division of application No. 16/707,819, filed on Dec. 9, 2019, now Pat. No. 11,036,019, which is a division of application No. 15/512,036, filed as application No. PCT/EP2015/071196 on Sep. 16, 2015, now Pat. No. 10,502,917.

(60) Provisional application No. 62/051,093, filed on Sep. 16, 2014, provisional application No. 62/170,571, filed on Jun. 3, 2015, provisional application No. 62/186,034, filed on Jun. 29, 2015.

(56) References Cited

U.S. PATENT DOCUMENTS

| | | |
|---|---|---|
| 4,912,615 A | 3/1990 | Bluband |
| 4,995,681 A | 2/1991 | Parnell |
| 5,142,606 A | 8/1992 | Carney et al. |
| 5,266,272 A | 11/1993 | Griner et al. |
| 5,339,379 A | 8/1994 | Kutsch et al. |
| 5,402,515 A | 3/1995 | Vidacovich et al. |
| 5,497,444 A | 3/1996 | Wheeler |
| 5,584,396 A | 12/1996 | Schmitt |
| 5,689,606 A | 11/1997 | Hassan |
| 5,717,810 A | 2/1998 | Wheeler |
| 5,730,400 A | 3/1998 | Rinderer et al. |
| 5,740,299 A | 4/1998 | Llewellyn et al. |
| 5,758,003 A | 5/1998 | Wheeler et al. |
| 5,778,131 A | 7/1998 | Llewellyn et al. |
| 5,870,519 A | 2/1999 | Jenkins et al. |
| 5,946,440 A | 8/1999 | Puetz |
| 5,966,492 A | 10/1999 | Bechamps et al. |
| 6,160,946 A | 12/2000 | Thompson et al. |
| 6,234,240 B1 | 5/2001 | Cheon |
| 6,263,141 B1 | 7/2001 | Smith |
| 6,272,009 B1 | 8/2001 | Buican et al. |
| 6,301,424 B1 | 10/2001 | Hwang |
| 6,326,547 B1 | 12/2001 | Saxby et al. |
| 6,363,200 B1 | 3/2002 | Thompson et al. |
| 6,418,264 B1 | 7/2002 | Hough et al. |
| 6,427,045 B1 | 7/2002 | Matthes et al. |
| 6,438,310 B1 | 8/2002 | Lance et al. |
| 6,442,022 B1 | 8/2002 | Paul |
| 6,504,988 B1 | 1/2003 | Trebesch et al. |
| 6,529,373 B1 | 3/2003 | Liao et al. |
| 6,538,879 B2 | 3/2003 | Jiang |
| 6,540,083 B2 | 4/2003 | Shih |
| 6,556,763 B1 | 4/2003 | Puetz et al. |
| 6,560,099 B1 | 5/2003 | Chang |
| 6,591,051 B2 | 7/2003 | Solheid et al. |
| 6,600,665 B2 | 7/2003 | Lauchner |
| 6,608,765 B2 | 8/2003 | Vier et al. |
| 6,631,237 B2 | 10/2003 | Knudsen et al. |
| RE38,311 E | 11/2003 | Wheeler |
| 6,677,520 B1 * | 1/2004 | Kim ................. G02B 6/4453 398/58 |
| 6,693,802 B2 | 2/2004 | Vier et al. |
| 6,738,261 B2 | 5/2004 | Vier et al. |
| 6,760,531 B1 | 7/2004 | Solheid et al. |
| 6,771,872 B2 | 8/2004 | Wu et al. |
| 6,788,544 B1 | 9/2004 | Barsun et al. |
| 6,788,786 B1 | 9/2004 | Kessler et al. |
| 6,810,194 B2 | 10/2004 | Griffiths et al. |
| 6,850,685 B2 | 2/2005 | Tinucci et al. |
| 6,870,734 B2 | 3/2005 | Mertesdorf et al. |
| 6,902,069 B2 | 6/2005 | Hartman et al. |
| 6,920,274 B2 | 7/2005 | Rapp et al. |
| 6,925,241 B2 | 8/2005 | Bohle et al. |
| 6,944,383 B1 | 9/2005 | Herzog et al. |
| 6,944,387 B2 | 9/2005 | Howell et al. |
| 6,968,111 B2 | 11/2005 | Trebesch et al. |
| 7,070,459 B2 | 7/2006 | Denovich et al. |
| 7,079,744 B2 | 7/2006 | Douglas et al. |
| 7,086,539 B2 | 8/2006 | Knudsen et al. |
| 7,090,084 B2 | 8/2006 | Knudsen et al. |
| 7,102,884 B2 | 9/2006 | Mertesdorf et al. |
| 7,120,348 B2 | 10/2006 | Trebesch et al. |
| 7,139,461 B2 | 11/2006 | Puetz et al. |
| 7,142,765 B2 | 11/2006 | Rapp et al. |
| 7,149,398 B2 | 12/2006 | Solheid et al. |
| 7,231,125 B2 | 6/2007 | Douglas et al. |
| 7,302,154 B2 | 11/2007 | Trebesch et al. |
| 7,330,546 B2 | 2/2008 | Kessler et al. |
| 7,333,707 B2 | 2/2008 | Puetz et al. |
| 7,349,615 B2 | 3/2008 | Frazier et al. |
| 7,367,823 B2 | 5/2008 | Rapp et al. |
| 7,373,071 B2 | 5/2008 | Douglas et al. |
| RE40,358 E | 6/2008 | Thompson et al. |
| 7,408,769 B2 | 8/2008 | Mertesdorf et al. |
| 7,460,758 B2 | 12/2008 | Xin |
| 7,463,811 B2 | 12/2008 | Trebesch et al. |
| 7,473,846 B2 | 1/2009 | Doerr et al. |
| 7,478,730 B2 | 1/2009 | Knudsen et al. |
| 7,480,438 B2 | 1/2009 | Douglas et al. |
| 7,527,226 B2 | 5/2009 | Kusuda et al. |
| 7,555,193 B2 | 6/2009 | Rapp et al. |
| 7,589,277 B2 | 9/2009 | Kessler et al. |
| 7,664,361 B2 | 2/2010 | Trebesch et al. |
| 7,664,362 B2 | 2/2010 | Douglas et al. |
| RE41,460 E | 7/2010 | Wheeler |
| RE41,777 E | 9/2010 | Thompson et al. |
| 7,805,043 B2 | 9/2010 | Puetz et al. |
| 7,822,313 B2 | 10/2010 | Rapp et al. |
| 7,856,166 B2 | 12/2010 | Biribuze et al. |
| RE42,258 E | 3/2011 | Thompson et al. |
| 7,909,522 B2 | 3/2011 | Heaton et al. |
| 7,983,521 B2 | 7/2011 | Rapp et al. |
| 8,002,123 B2 | 8/2011 | Knudsen et al. |
| 8,019,191 B2 | 9/2011 | Laurisch |
| 8,019,192 B2 | 9/2011 | Puetz et al. |
| 8,078,029 B2 | 12/2011 | Douglas et al. |
| 8,078,030 B2 | 12/2011 | Trebesch et al. |
| 8,144,457 B2 | 3/2012 | Mertesdorf et al. |
| 8,315,498 B2 | 11/2012 | Redmann et al. |
| 8,331,752 B2 | 12/2012 | Biribuze et al. |
| 8,358,900 B2 | 1/2013 | Rapp et al. |
| 8,417,074 B2 | 4/2013 | Nhep et al. |
| 8,565,572 B2 * | 10/2013 | Krampotich ........ G02B 6/4452 385/135 |
| 8,607,993 B2 | 12/2013 | Williams |
| 8,655,136 B2 | 2/2014 | Trebesch et al. |
| 8,768,134 B2 | 7/2014 | Puetz et al. |
| 8,879,881 B2 | 11/2014 | Cote et al. |
| 8,991,623 B2 | 3/2015 | Knudsen et al. |
| 9,057,859 B2 | 6/2015 | Bolster et al. |
| 9,069,150 B2 | 6/2015 | Bolster et al. |
| 9,081,164 B2 | 7/2015 | Badar et al. |
| 9,128,262 B2 | 9/2015 | Campbell et al. |
| 9,329,353 B2 | 5/2016 | Bolster et al. |
| 9,354,416 B2 | 5/2016 | Bolster et al. |
| 9,429,728 B2 | 8/2016 | Puetz et al. |
| 9,442,267 B2 | 9/2016 | Douglas et al. |
| 9,494,759 B2 | 11/2016 | Claessens et al. |
| 9,523,833 B2 | 12/2016 | Campbell et al. |
| 9,529,171 B2 | 12/2016 | Knudsen et al. |
| 9,581,781 B2 | 2/2017 | Takeuchi et al. |
| 9,664,870 B2 | 5/2017 | Trebesch et al. |
| 9,715,075 B2 | 7/2017 | Bolster et al. |
| 9,810,868 B2 | 11/2017 | Puetz et al. |
| 9,810,869 B2 | 11/2017 | Campbell et al. |
| 9,823,432 B2 | 11/2017 | Alexi et al. |
| 9,829,666 B2 | 11/2017 | Ellison et al. |
| 9,877,407 B1 * | 1/2018 | Sim ...................... H04Q 1/06 |
| 9,958,630 B2 | 5/2018 | Claessens et al. |
| 10,025,055 B2 | 7/2018 | Alexi et al. |
| 10,031,304 B2 | 7/2018 | Hill et al. |
| 10,048,460 B2 | 8/2018 | Courchaine et al. |
| 10,054,751 B2 | 8/2018 | Knudsen et al. |
| 10,067,309 B2 | 9/2018 | Puetz et al. |
| 10,082,634 B2 | 9/2018 | Geling et al. |
| 10,094,996 B2 | 10/2018 | Cooke et al. |
| 10,146,023 B2 | 12/2018 | Douglas et al. |
| 10,175,440 B2 | 1/2019 | Alexi et al. |
| 10,209,470 B2 | 2/2019 | Geling et al. |

(56) References Cited

U.S. PATENT DOCUMENTS

| | | |
|---|---|---|
| 10,209,471 B2 | 2/2019 | Campbell et al. |
| 10,302,872 B2 | 5/2019 | Verheyden et al. |
| 10,459,182 B2 | 10/2019 | Trebesch et al. |
| 10,502,917 B2 | 12/2019 | Geens et al. |
| 10,509,190 B2 | 12/2019 | Alexi et al. |
| 10,545,306 B2 | 1/2020 | Geling et al. |
| 10,613,286 B2 | 4/2020 | Courchaine et al. |
| 10,627,591 B2 | 4/2020 | Geling et al. |
| 10,638,636 B1 | 4/2020 | Chen et al. |
| 10,670,821 B2 | 6/2020 | Claessens et al. |
| 10,678,010 B2 | 6/2020 | Bolster et al. |
| 11,002,931 B2 | 5/2021 | Geling et al. |
| 11,002,932 B2 | 5/2021 | Alexi et al. |
| 11,036,019 B2 | 6/2021 | Geens et al. |
| 2002/0125800 A1 | 9/2002 | Knudsen et al. |
| 2002/0159745 A1 | 10/2002 | Howell et al. |
| 2002/0170726 A1 | 11/2002 | Mendoza |
| 2002/0179485 A1 | 12/2002 | Shih |
| 2002/0181922 A1 | 12/2002 | Xin et al. |
| 2002/0191942 A1 | 12/2002 | Griffiths et al. |
| 2003/0007767 A1 | 1/2003 | Douglas et al. |
| 2003/0012007 A1 | 1/2003 | Vier et al. |
| 2003/0026069 A1 | 2/2003 | Jiang |
| 2003/0026084 A1 | 2/2003 | Lauchner |
| 2003/0086675 A1 | 5/2003 | Wu et al. |
| 2003/0095772 A1 | 5/2003 | Solheid et al. |
| 2003/0165315 A1 | 9/2003 | Trebesch et al. |
| 2003/0185535 A1 | 10/2003 | Tinucci et al. |
| 2003/0202334 A1 | 10/2003 | Vier et al. |
| 2003/0206406 A1 | 11/2003 | Vier et al. |
| 2004/0074852 A1 | 4/2004 | Knudsen et al. |
| 2004/0079711 A1 | 4/2004 | Hartman et al. |
| 2004/0120681 A1 | 6/2004 | Bohle et al. |
| 2004/0146266 A1 | 7/2004 | Solheid et al. |
| 2004/0251220 A1 | 12/2004 | Mertesdorf et al. |
| 2004/0258384 A1 | 12/2004 | Trebesch et al. |
| 2005/0036277 A1 | 2/2005 | Kessler et al. |
| 2005/0100301 A1 | 5/2005 | Solheid et al. |
| 2005/0135768 A1 | 6/2005 | Rapp et al. |
| 2005/0220436 A1 | 10/2005 | Mertesdorf et al. |
| 2005/0232566 A1 | 10/2005 | Rapp et al. |
| 2006/0118497 A1 | 6/2006 | Knudsen et al. |
| 2006/0127027 A1 | 6/2006 | Douglas et al. |
| 2006/0193590 A1 | 8/2006 | Puetz et al. |
| 2006/0193591 A1 | 8/2006 | Rapp et al. |
| 2006/0275008 A1 | 12/2006 | Xin |
| 2007/0058918 A1 | 3/2007 | Trebesch et al. |
| 2007/0075026 A1 | 4/2007 | Knudsen et al. |
| 2007/0127201 A1 | 6/2007 | Mertesdorf et al. |
| 2007/0201806 A1 | 8/2007 | Douglas et al. |
| 2007/0221793 A1 | 9/2007 | Kusuda et al. |
| 2007/0230889 A1 | 10/2007 | Sato et al. |
| 2008/0050083 A1 | 2/2008 | Frazier et al. |
| 2008/0063350 A1 | 3/2008 | Trebesch et al. |
| 2008/0093101 A1 | 4/2008 | Kessler et al. |
| 2008/0152416 A1 | 6/2008 | Heaton et al. |
| 2008/0219634 A1 | 9/2008 | Rapp et al. |
| 2008/0267573 A1 | 10/2008 | Douglas et al. |
| 2009/0022467 A1 | 1/2009 | Puetz et al. |
| 2009/0067800 A1 | 3/2009 | Vazquez et al. |
| 2009/0129045 A1 | 5/2009 | Mertesdorf et al. |
| 2009/0136196 A1 | 5/2009 | Trebesch et al. |
| 2009/0148117 A1 | 6/2009 | Laurisch |
| 2009/0180749 A1 | 7/2009 | Douglas et al. |
| 2009/0257726 A1 | 10/2009 | Redmann et al. |
| 2009/0270832 A1 | 10/2009 | Vancaillie et al. |
| 2010/0003000 A1 | 1/2010 | Rapp et al. |
| 2010/0012599 A1 | 1/2010 | Knudsen et al. |
| 2010/0054681 A1 | 3/2010 | Biribuze et al. |
| 2010/0129028 A1 | 5/2010 | Nhep et al. |
| 2010/0195968 A1 | 8/2010 | Trebesch et al. |
| 2010/0202744 A1 | 8/2010 | Douglas et al. |
| 2011/0038591 A1 | 2/2011 | Rapp et al. |
| 2011/0058784 A1 | 3/2011 | Puetz et al. |
| 2011/0085776 A1 | 4/2011 | Biribuze et al. |
| 2011/0268413 A1 | 11/2011 | Cote et al. |
| 2011/0286712 A1 | 11/2011 | Puetz et al. |
| 2011/0297629 A1 | 12/2011 | Knudsen et al. |
| 2011/0317973 A1 | 12/2011 | Rapp et al. |
| 2012/0076466 A1 | 3/2012 | Douglas et al. |
| 2012/0093475 A1 | 4/2012 | Trebesch et al. |
| 2013/0170810 A1 | 7/2013 | Badar et al. |
| 2013/0243386 A1 | 9/2013 | Pimental et al. |
| 2013/0287356 A1 | 10/2013 | Bolster et al. |
| 2013/0287357 A1 | 10/2013 | Bolster et al. |
| 2013/0322839 A1 | 12/2013 | Claessens et al. |
| 2014/0119704 A1 | 5/2014 | Ciechomski et al. |
| 2014/0133819 A1 | 5/2014 | Trebesch et al. |
| 2014/0153892 A1 | 6/2014 | Puetz et al. |
| 2014/0248028 A1 | 9/2014 | Campbell et al. |
| 2014/0376870 A1 | 12/2014 | Takeuchi et al. |
| 2015/0234142 A1 | 8/2015 | Courchaine et al. |
| 2015/0286025 A1 | 10/2015 | Douglas et al. |
| 2015/0293323 A1 | 10/2015 | Bolster et al. |
| 2015/0309280 A1 | 10/2015 | Knudsen et al. |
| 2015/0338596 A1 | 11/2015 | Bolster et al. |
| 2016/0047999 A1 | 2/2016 | Alexi et al. |
| 2016/0103289 A1 | 4/2016 | Campbell et al. |
| 2016/0124160 A1 | 5/2016 | Verheyden et al. |
| 2016/0186895 A1 | 6/2016 | Chen et al. |
| 2016/0238812 A1 | 8/2016 | Bolster et al. |
| 2017/0115462 A1 | 4/2017 | Puetz et al. |
| 2017/0131507 A1 | 5/2017 | Douglas et al. |
| 2017/0146762 A1 | 5/2017 | Campbell et al. |
| 2017/0227728 A1 | 8/2017 | Claessens et al. |
| 2017/0235077 A1 | 8/2017 | Knudsen et al. |
| 2017/0276892 A1 | 9/2017 | Geling et al. |
| 2017/0276893 A1 | 9/2017 | Geling et al. |
| 2017/0293099 A1 | 10/2017 | Alexi et al. |
| 2017/0351046 A1 | 12/2017 | Trebesch et al. |
| 2018/0081140 A1 | 3/2018 | Douglas et al. |
| 2018/0120528 A1 | 5/2018 | Puetz et al. |
| 2018/0129006 A1 | 5/2018 | Bolster et al. |
| 2018/0136422 A1 | 5/2018 | Alexi et al. |
| 2018/0188466 A1 | 7/2018 | Campbell et al. |
| 2018/0231730 A1 | 8/2018 | Geens et al. |
| 2018/0329165 A1 | 11/2018 | Claessens et al. |
| 2018/0348462 A1 | 12/2018 | Courchaine et al. |
| 2018/0364435 A1 | 12/2018 | Geling et al. |
| 2019/0004269 A1 | 1/2019 | Alexi et al. |
| 2019/0137715 A1 | 5/2019 | Knudsen et al. |
| 2019/0187395 A1 | 6/2019 | Bolster et al. |
| 2019/0250352 A1 | 8/2019 | Geling et al. |
| 2019/0250353 A1 | 8/2019 | Campbell et al. |
| 2019/0361189 A1 | 11/2019 | Douglas et al. |
| 2020/0018905 A1 | 1/2020 | Verheyden et al. |
| 2020/0081216 A1 | 3/2020 | Takeuchi et al. |
| 2020/0110238 A1 | 4/2020 | Geens et al. |
| 2020/0142147 A1 | 5/2020 | Alexi et al. |
| 2020/0174213 A1 | 6/2020 | Douglas et al. |
| 2020/0233169 A1 | 7/2020 | Geling et al. |

FOREIGN PATENT DOCUMENTS

| | | |
|---|---|---|
| EP | 215668 A2 | 3/1987 |
| EP | 215668 A3 | 11/1987 |
| EP | 293183 A2 | 11/1988 |
| EP | 293183 A3 | 11/1989 |
| EP | 215668 B1 | 12/1990 |
| EP | 594913 A1 | 5/1994 |
| EP | 293183 B1 | 12/1994 |
| EP | 594913 B1 | 1/1997 |
| EP | 2159617 A2 | 3/2010 |
| EP | 2241916 | 10/2010 |
| EP | 2159617 A3 | 1/2013 |
| EP | 2772780 A1 | 9/2014 |
| EP | 2775334 A1 | 9/2014 |
| EP | 2772780 B1 | 7/2019 |
| EP | 2775334 B1 | 7/2019 |
| EP | 2775334 B8 | 7/2019 |
| EP | 3998503 A1 | 5/2022 |
| EP | 3998503 B1 | 4/2024 |
| FR | 2959383 A1 | 10/2011 |
| FR | 2959383 B1 | 4/2012 |

(56)           References Cited

FOREIGN PATENT DOCUMENTS

| WO | 0219005 A2 | 3/2002 |
| WO | 0221182 A1 | 3/2002 |
| WO | 02071767 A2 | 9/2002 |
| WO | 0219005 A3 | 7/2003 |
| WO | 02071767 A3 | 11/2003 |
| WO | 2008149131 A2 | 12/2008 |
| WO | 2008149131 A8 | 2/2009 |
| WO | 2008149131 A3 | 3/2009 |
| WO | 2011100613 A1 | 8/2011 |
| WO | 2014124001 A2 | 8/2014 |
| WO | 2014124001 A3 | 10/2014 |
| WO | 2016/042032 | 3/2016 |

OTHER PUBLICATIONS

Notice of Opposition for Application No. EP21203502.6 mailed Dec. 9, 2024.
ADC Telecommunications, Inc., FL2000 Products Catalog, Literature No. 803, front cover, table of contents, pp. 1-32, rear cover (Dec. 2000).
ADC Telecommunications, Inc., Next Generation Frame Product Family Ordering Guide, Literature No. 820, front cover, table of contents, pp. 1-43, rear cover (Apr. 2002).
Extended European Search Report for European Patent Application No. 21204240.2 mailed May 9, 2022, 7 pages.
International Search Report and Written Opinion for Application No. PCT/EP2015/071196 mailed Mar. 29, 2016.

* cited by examiner

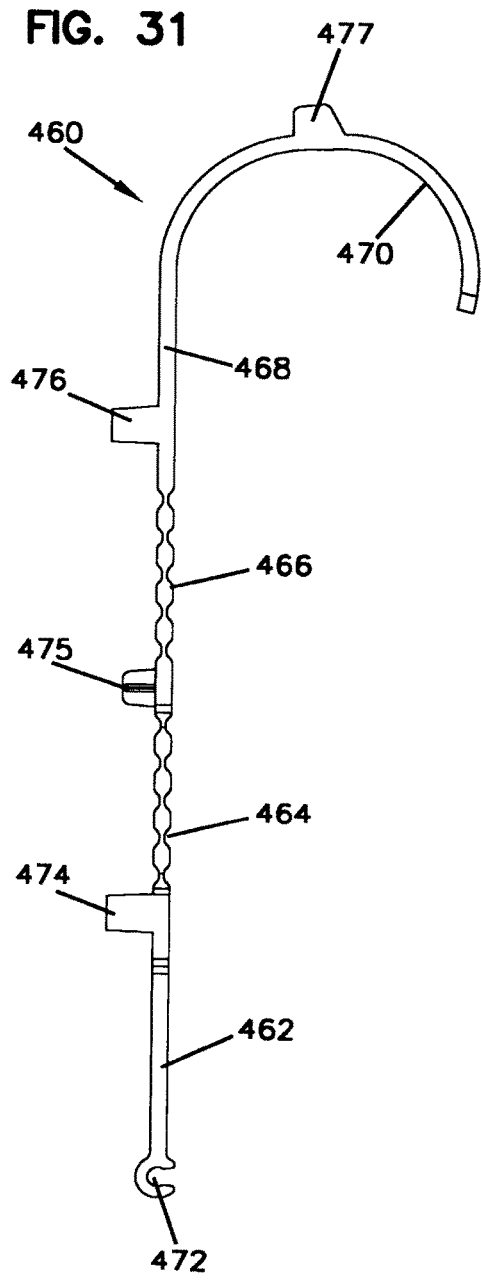
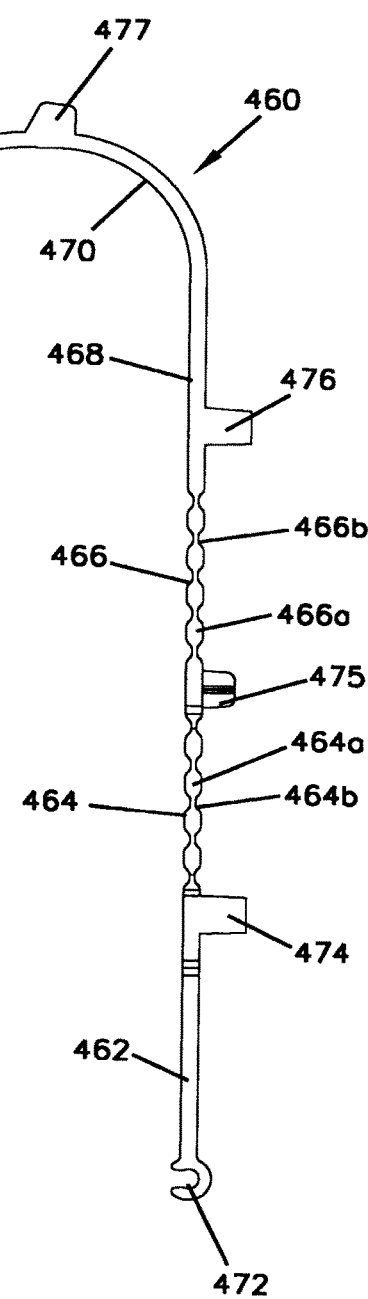

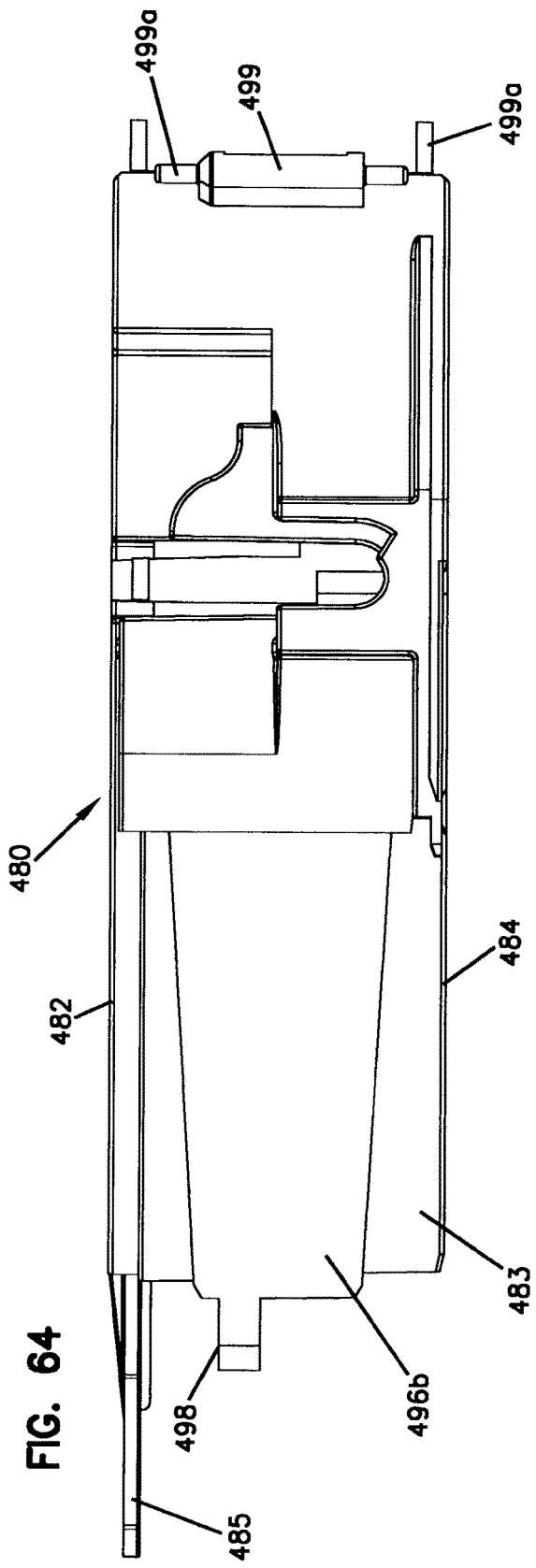

TELECOMMUNICATIONS TRAY ASSEMBLY

CROSS-REFERENCE TO RELATED APPLICATIONS

This application is a continuation of U.S. patent application Ser. No. 17/304,075, filed Jun. 14, 2021, now U.S. Pat. No. 11,614,593. U.S. patent application Ser. No. 17/304,075 is a divisional of U.S. patent application Ser. No. 16/707,819, filed Dec. 9, 2019, now U.S. Pat. No. 11,036,019. U.S. patent application Ser. No. 16/707,819 is a divisional of U.S. patent application Ser. No. 15/512,036, filed on Mar. 16, 2017, now U.S. Pat. No. 10,502,917; which is a National Stage Application of PCT/EP2015/071196, filed on Sep. 16, 2015; which claims benefit of U.S. Patent Application Ser. No. 62/170,571, filed on Jun. 3, 2015, and claims benefit of U.S. Patent Application Ser. No. 62/186,034, filed on Jun. 29, 2015, and claims benefit of U.S. Patent Application Ser. No. 62/051,093, filed on Sep. 16, 2014, the disclosures of which are incorporated herein by reference in their entireties. To the extent appropriate, a claim of priority is made to each of the above disclosed applications.

FIELD OF THE INVENTION

The present invention relates to telecommunications panels and cable bend control guides, patch cord supports, and hinges adapted to be used in various telecommunications panels.

BACKGROUND

Numerous telecommunications panels exist today and are used in various equipment applications. Conventional telecommunications panels include hinges that are designed to allow a tray to be rotated out of the telecommunications panel. By rotating the tray out of the telecommunications panel, access is provided to rear portions of a termination field. Such trays may include cable management structures that aid in organizing and managing telecommunications cables routed to and away from the telecommunications panel.

SUMMARY

Aspects of the disclosure are directed to a multi-positionable tray assembly for mounting within a chassis of a telecommunications panel. In one aspect, the multi-positionable tray assembly includes a tray and a support arm. The tray is configured to support at least one cable management structure while the support arm is connected to and supports the tray at a pivot joint. This structure allows the tray to be rotatable about the pivot joint at a pivot axis between a folded position and an access position. In one aspect, the support arm is configured for removable attachment to the chassis such that the multi-positionable tray assembly can be placed in a removed position away from the chassis and an installed position within the chassis.

In one embodiment, the multi-positionable tray assembly includes a tray that defines a wall structure having a top wall, a back wall, and a bottom wall that together define a channel having an open face. The tray can be further provided with a bend radius limiter that defines a curved surface for limiting the degree to which a cable can bend as the cable extends from the support arm, through the pivot joint, and into the channel of the wall structure. In one aspect, the bend radius limiter is pivotally mounted to the tray such that the bend radius limiter is rotatable between an open position and a closed position in which the open face is at least partially covered by the bend radius limiter in the closed position.

A method of routing a cable through a multi-positionable tray assembly is also disclosed. The method can include the steps of: rotating a tray of a tray assembly with respect to a support arm to place the tray in an access position; rotating a bend radius limiter with respect to the tray to an open position to expose an open face of a wall structure defining a channel; routing a cable through the support arm and into the wall structure channel; rotating the bend radius limiter to a closed position to at least partially block the channel open face; and rotating the tray to a folded position with respect to the support arm.

A modular multi-positionable tray assembly is also disclosed that has a tray and a support arm structure having a first support arm and a second support arm. In one aspect, the first support arm is configured for removable attachment to the chassis such that the multi-positionable tray assembly can be placed in a removed position away from the chassis and an installed position within the chassis. In one aspect, the second support arm is removably connected to and supports the tray. The second support arm is also connected to the first support arm at a pivot joint such that the tray is rotatable about the pivot joint at a pivot axis between a folded position and an access position. As configured, the tray, the first support arm, and the second support arm cooperatively define a cable routing pathway.

A cable management feature can also be provided with the modular multi-positionable tray assembly. To accommodate this configuration, the second support arm can be provided with a mounting structure to which the cable management feature can be pivotally and removably attached. The cable management feature can be rotatable between a first position in which a portion of the pivot joint is at least partially covered by the cable management feature and a second position in which the portion of the pivot joint is uncovered.

BRIEF DESCRIPTION OF THE DRAWINGS

The accompanying drawings, which are incorporated in and constitute a part of the description, illustrate several aspects of the present disclosure. A brief description of the drawings is as follows:

FIG. 31 is a first side view of the bend radius limiter shown in FIG. 27.

FIG. 32 is a second side view of the bend radius limiter shown in FIG. 27.

FIG. 64 is a side view of the first arm shown in FIG. 61.

FIG. 65 is an end view of the first arm shown in FIG. 61.

DETAILED DESCRIPTION

Reference will now be made in detail to exemplary aspects of the present disclosure that are illustrated in the accompanying drawings. Whenever possible, the same reference numbers will be used throughout the drawings to refer to the same or similar parts.

Telecommunications Panel—General

Figure 1:
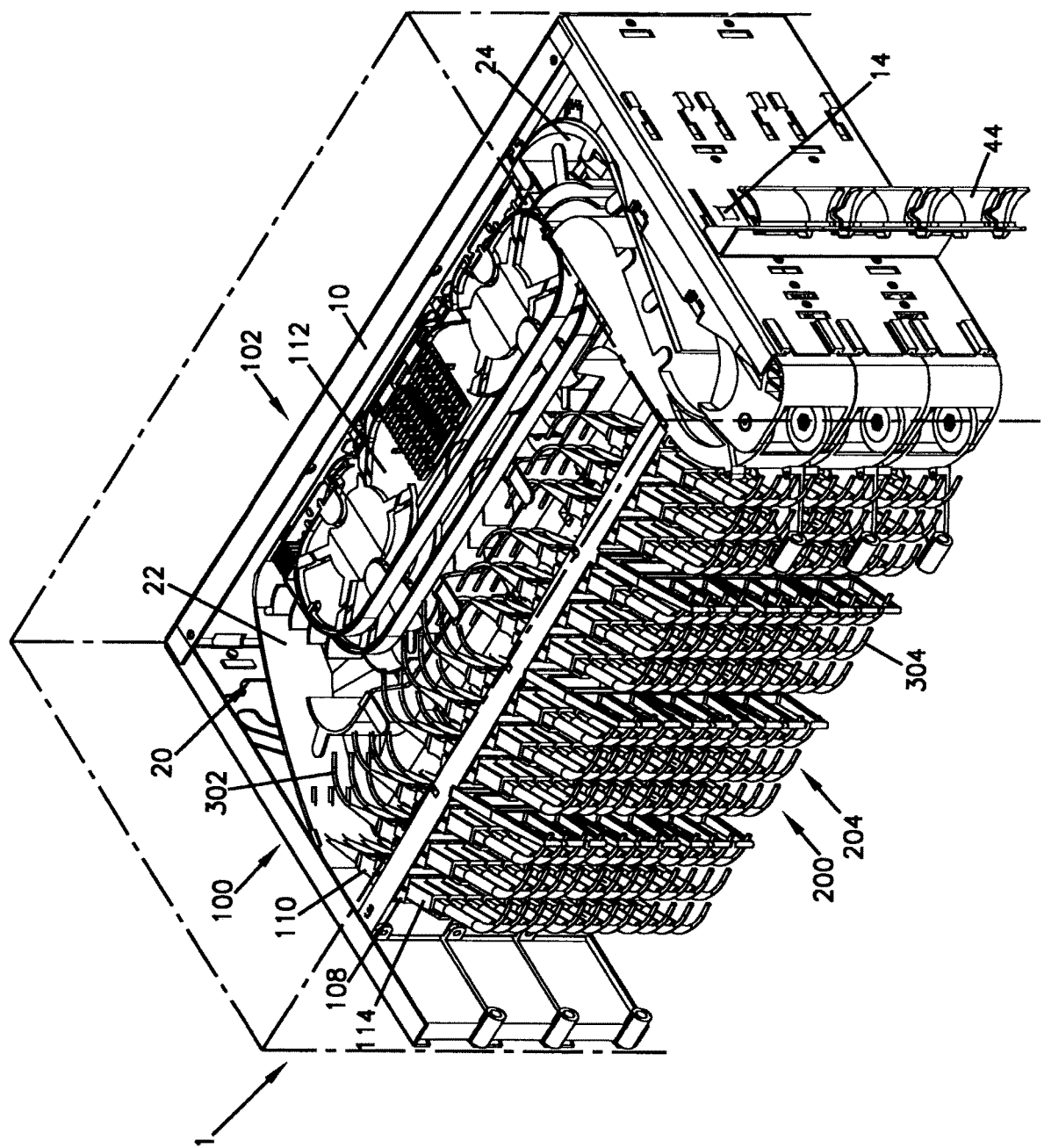
FIG. 1 is a perspective view of an example telecommunications panel including a plurality of multi-positionable tray assembly in accordance with principles of the present disclosure.
Figure 2:
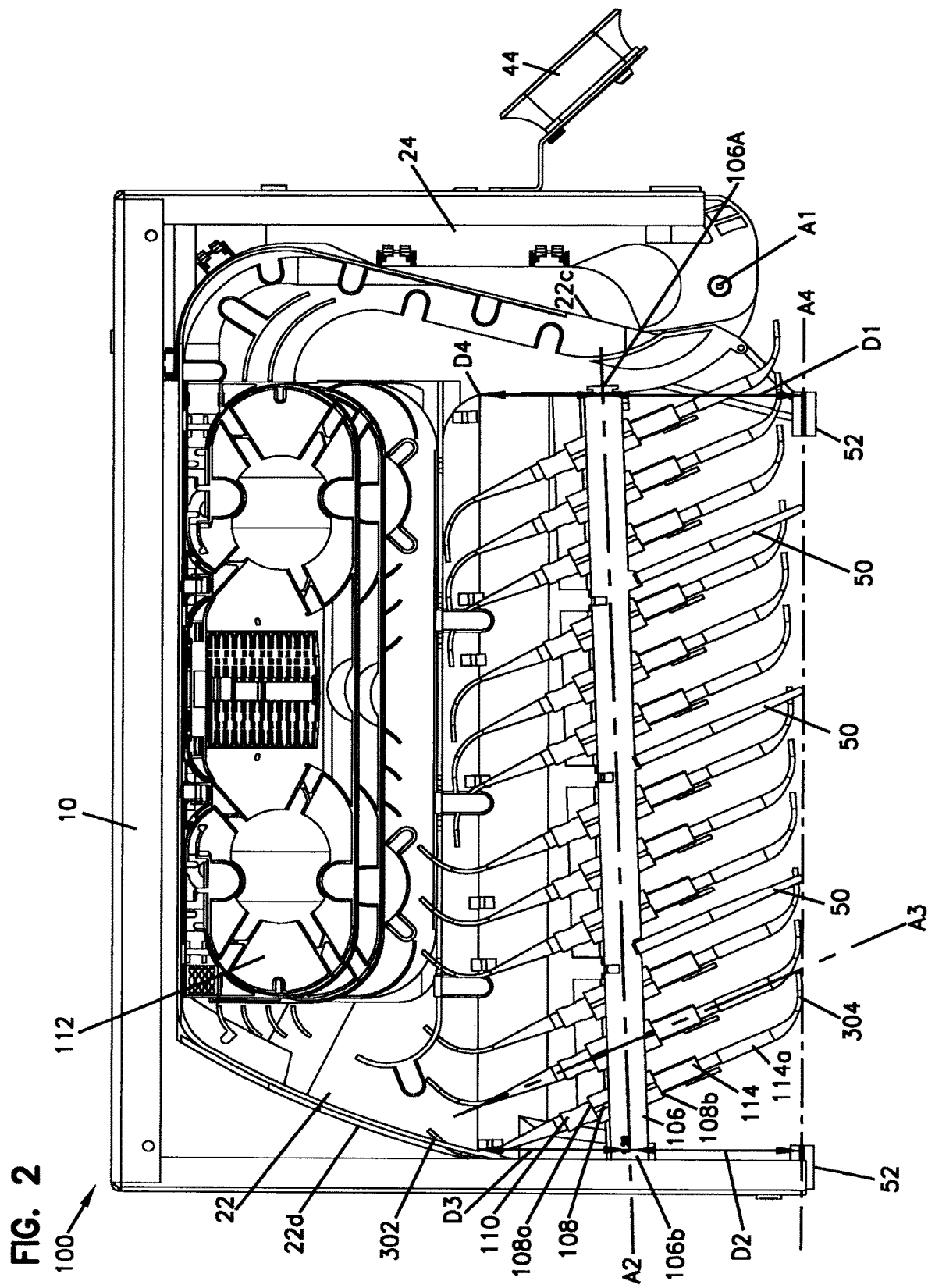
FIG. 2 is a top view of the telecommunications panel of FIG. 1.
Figure 3:
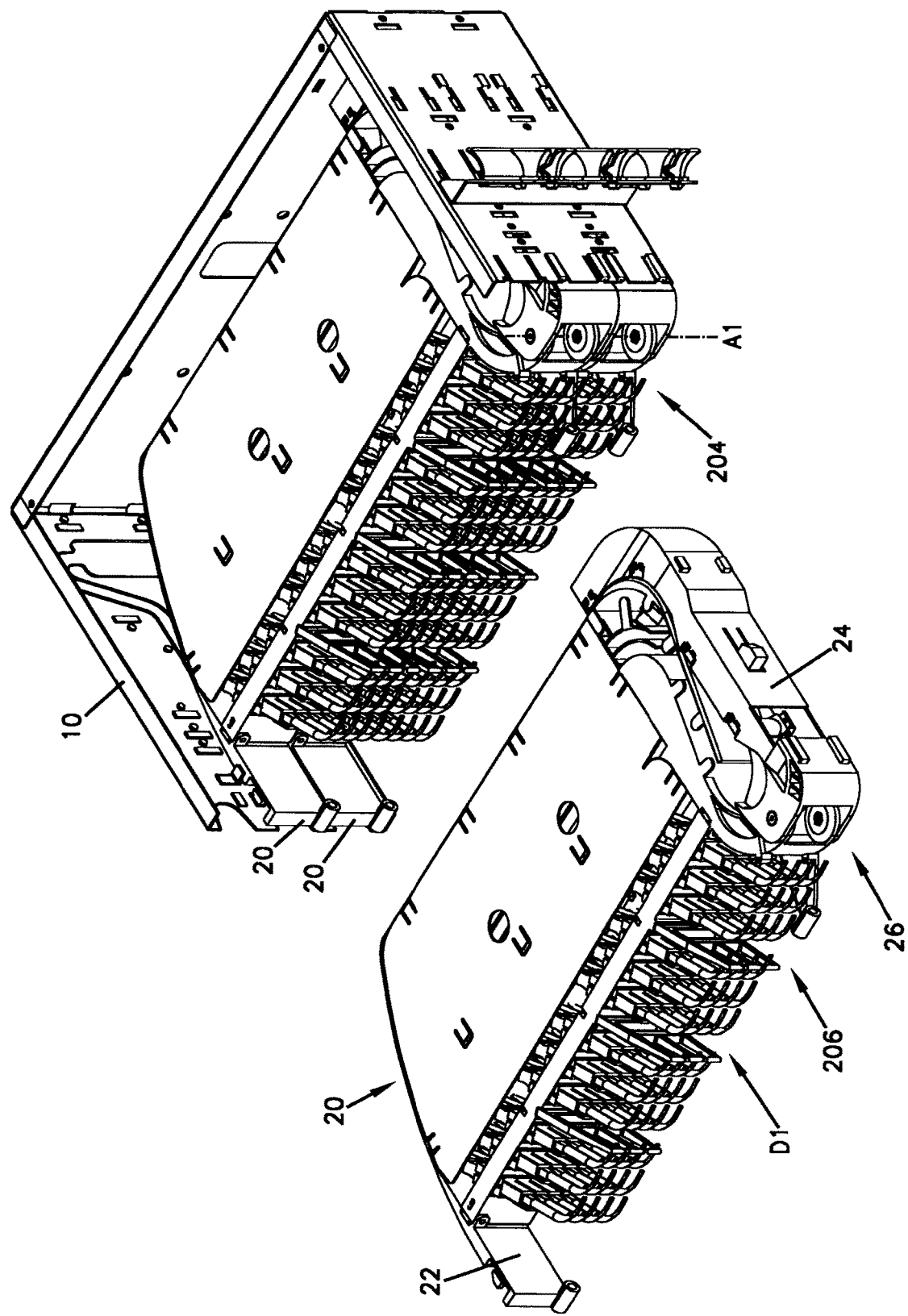
FIG. 3 is a perspective view of the telecommunications panel of FIG. 1, with one of the multi-positionable tray assemblies in a removed position.

Referring now to FIGS. 1 and 2, a telecommunications panel 100 (e.g., an enclosure, an optical distribution frame, etc.) is illustrated according to the principles of the present disclosure. As further illustrated at FIG. 1, the telecommunications panel 100 may be included in a cabinet 200. The telecommunications panel 100 and/or the cabinet 200 may be used for various purposes in telecommunications systems. For example, housing a cable management structure 102 including, for example, stacked splice trays 112 and a patch panel 104. In one aspect, patch cords 302, 304 (i.e., patch cables, connectorized fiber optic cables, etc.) may enter the telecommunications panel 100 and/or the cabinet 200 and be interconnected at a patch panel 104. The patch panel 104 may include a plurality of fiber optic adapters 108. Fiber optic connectors 110, 114 that terminate ends of the patch cords 302, 304 may connect with the fiber optic adapters 108 of the patch panel 104. The interconnections at the patch panel 104 may be rearranged from time-to-time, as desired, for changing configurations of the telecommunications system. The telecommunications panel 100 may further hold splitters, filters, and various other telecommunications components. An exemplary telecommunications system 1 is shown and described in U.S. Provisional Patent Application 62/051,093, filed on Sep. 16, 2014, the entirety of which is incorporated by reference herein.

Chassis 10 and Multi-Positionable Tray Assembly 20

The telecommunications panel 100 may include a chassis 10 to which a plurality of stacked multi-positionable tray assemblies 20, 420 may be removably attached. The multi-positional tray assembly 20 is further shown at FIGS. 6-16 while the tray assembly 420 is illustrated at FIGS. 20-41. As many of the features of trays 20 and 420 are similar, the following description for tray assembly 20 is generally applicable for tray assembly 420. In one aspect, the multi-positionable tray assembly 20 includes a tray 22 (e.g., a sub-rack) and a support arm 24 that are pivotally connected to each other via a pivot joint 26 that allows the tray assembly 20 to be moved between a folded position 200 and an access position 202. The pivot joint 26 is formed by the interface between an upper joint arm 28 of the support arm 24 and an upper joint extension 32 of the tray 22 and by the interface between a lower joint arm 30 of the support arm 24 and a lower joint extension 34 of the tray 22. The interfaces can be secured together by a variety of means, for example, a snap-fit type connection via protrusions and corresponding recesses or by a connection utilizing fasteners. As depicted, the pivot joint 26 represents the connection between the tray 22 and the support arm 24 to the chassis 10 and defines a vertical hinge with an axis A1 for the multi-positionable tray assembly 20.

Figure 4:
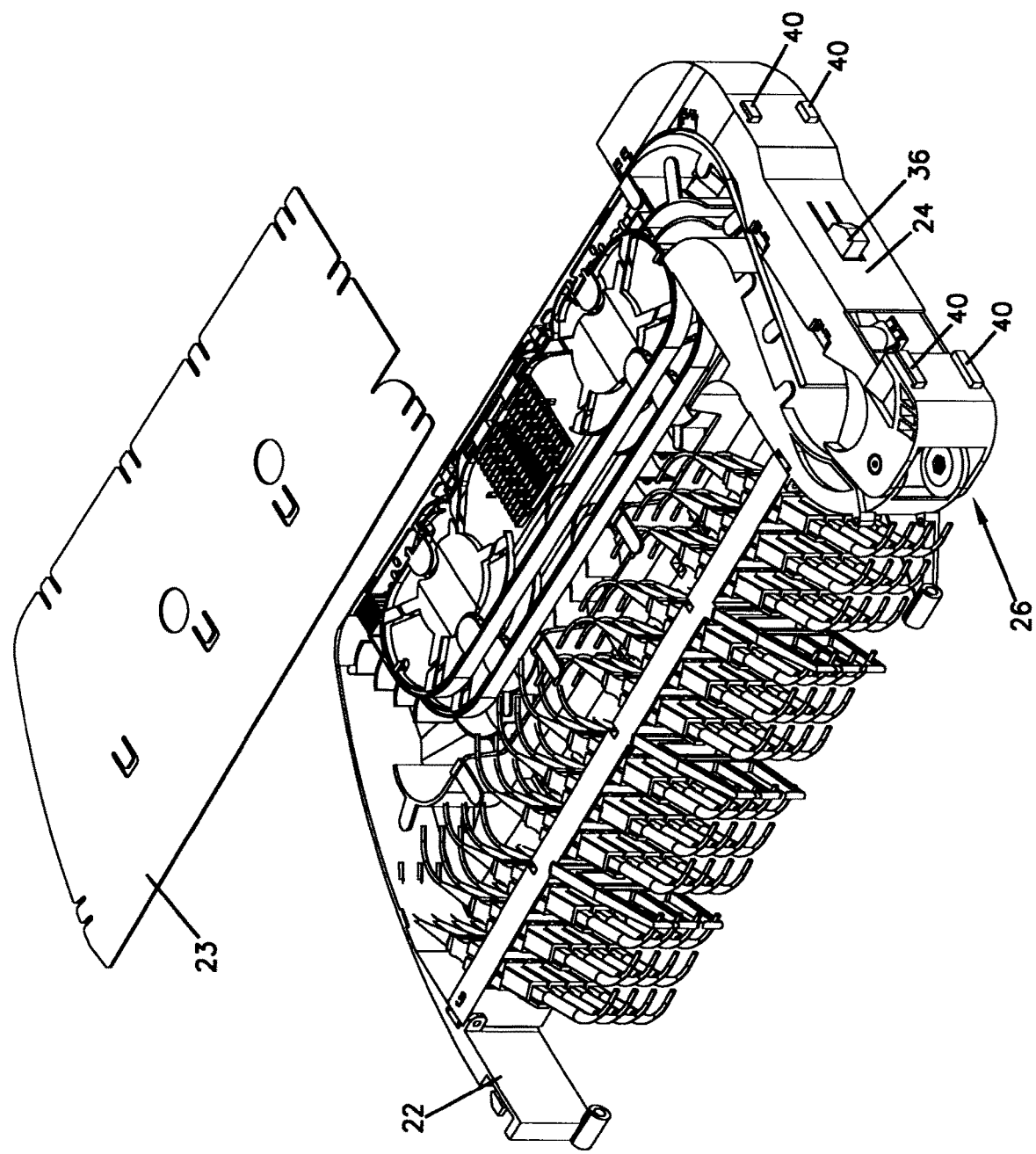
FIG. 4 is a perspective view of the chassis of the telecommunications panel of FIG. 1.
Figure 5:
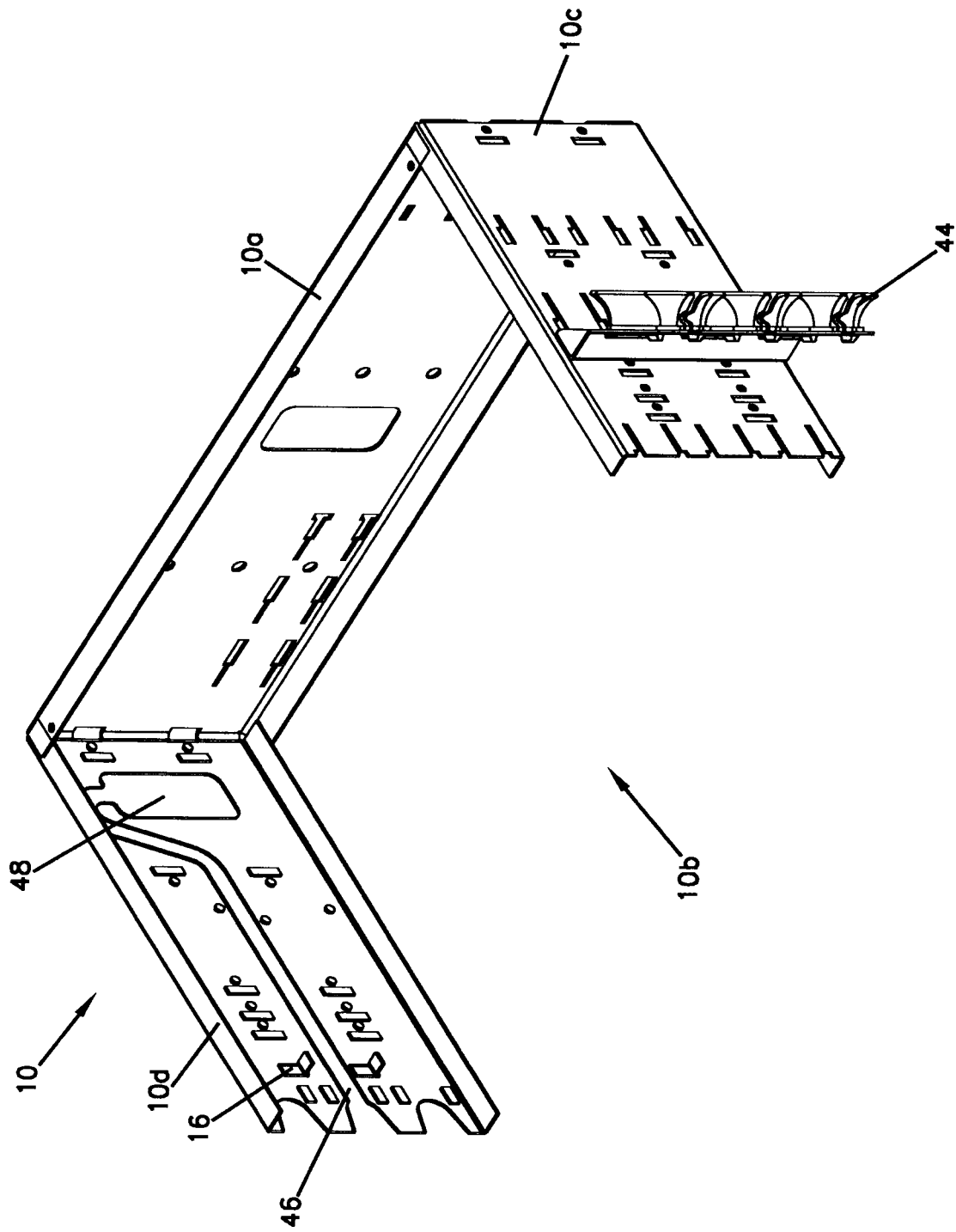
FIG. 5 is a perspective view of one of the multi-positionable tray assemblies of FIG. 1.
Figure 6:
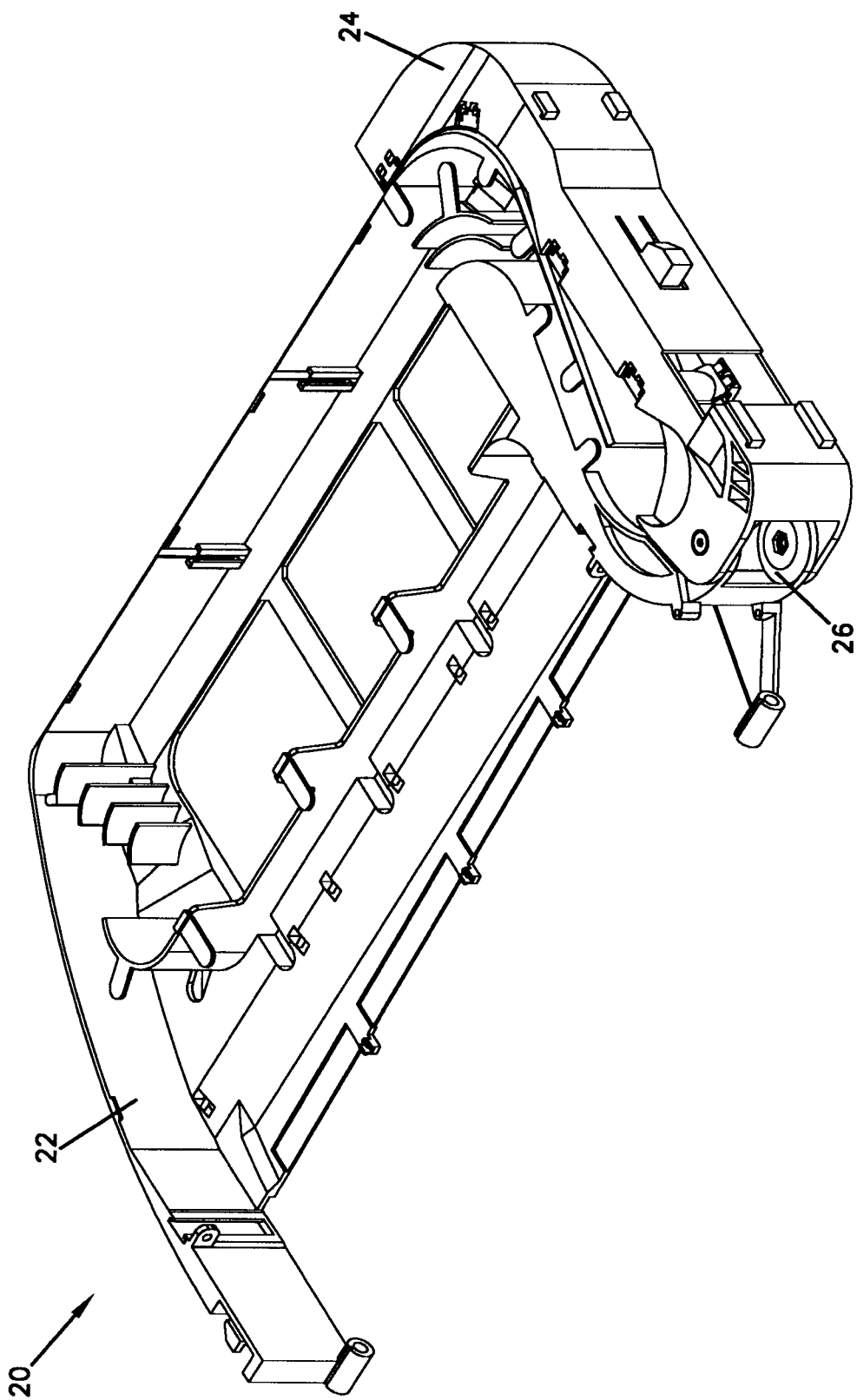
FIG. 6 is a perspective view of the multi-positionable trays of FIG. 5 with the various cable management structures removed from the tray.
Figure 7:
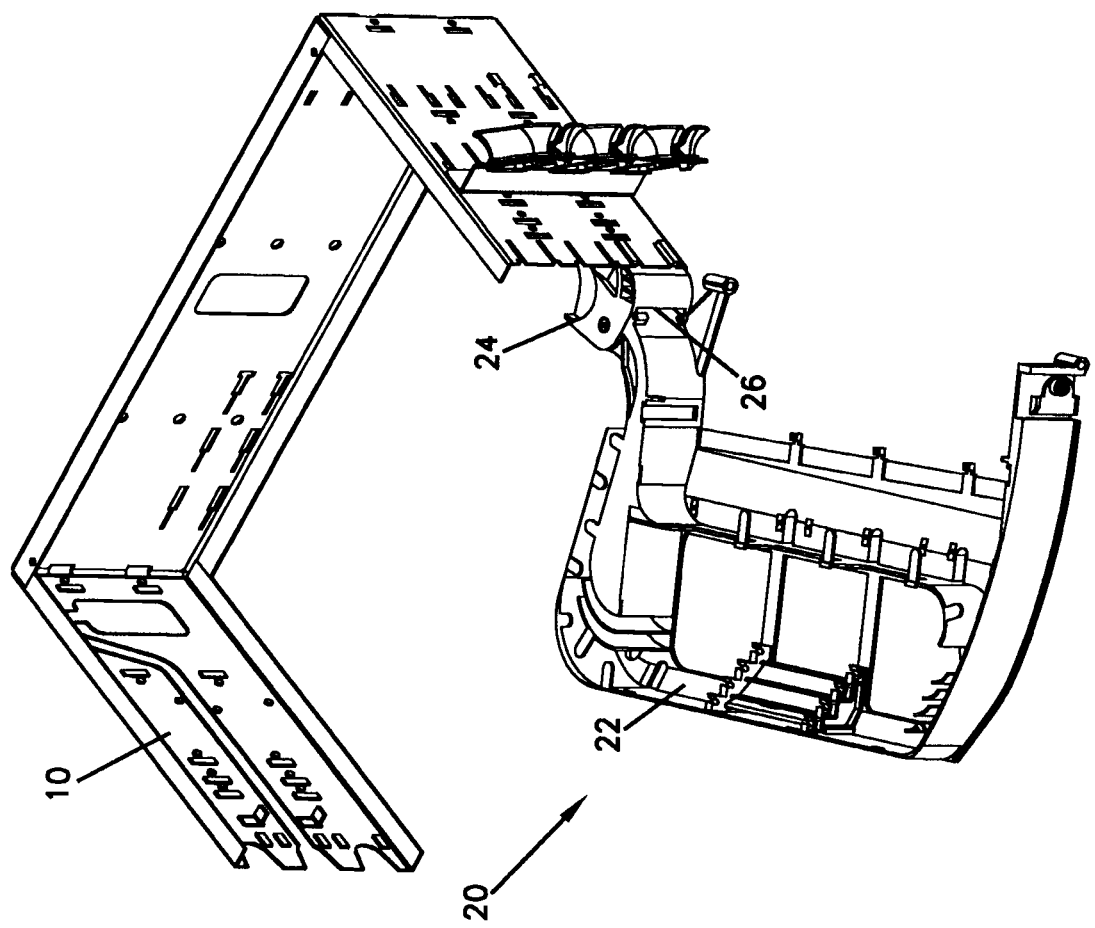
FIG. 7 is a perspective view of the multi-positionable tray assembly of FIG. 6 mounted to the chassis in an installed position and rotated into an access position.

As most easily seen at FIG. 4, the chassis 10 includes a rear side 10a extending between a first side 10c and a second side 10d. The chassis 10 also includes an open front side 10b for slidably receiving the tray assembly 20. The chassis may include a number of features to facilitate the mounting of the tray assembly 20 to the chassis 10 from a removed position 206 to an installed position 204. For example, the chassis 10 may be provided with a plurality of attachment slots 12 at the first and second sides 10c, 10d that are configured to engage with corresponding attachment guide members 40 located on the support arm 24. In the embodiment shown, the attachment slots 12 and the guide members 40 extend in a direction D1 that is parallel to the first and second sides 10c, 10d of the chassis 10. This configuration allows the guide members 40 to engage with the attachment slots 12 when the tray assembly 20 is inserted into the chassis 10 into an installed position 204. In one example, the guide members 40 have a T-shape cross-section to more securely engage the attachment slots 12 by preventing rotation of the support arm 24 with respect to the side 10c or 10d of the chassis 10 to which the support arm 24 is attached.

The chassis 10 can also be provided with features to secure the tray assembly 20 within the chassis 10 so that the tray assembly 20 is retained in the installed position 204. For example, the chassis 10 can be provided with a first latch recess 14 configured to receive a first latch member 36 of the tray assembly 20. In the embodiment shown, the support arm 24 is provided with a depressible first latch member 36 that initially deflects as the tray assembly 20 is being pushed into the installed position 204 and then snaps into the latch recess 14 once the tray assembly 20 is fully installed to form a snap-fit type of connection. The tray assembly 20 can be released from the chassis 10 by depressing the latch member 36 and pulling the tray assembly out of the chassis 10.

The chassis 10 can also be provided with features to secure the tray 22 of the tray assembly 20 to the chassis 10 so that the tray assembly 20 is retained in the folded position 200. For example, the chassis 10 can be provided with a second latch recess 16 configured to receive a second latch member 38 of the tray assembly 20. In the embodiment shown, the tray 22 is provided with a second depressible latch member 38 that initially deflects as the tray assembly 20 is being rotated into the folded position 200 and then snaps into the latch member 38 once the tray assembly 20 is fully rotated to form a snap-fit type of connection. The tray 22 can be released from the chassis 10 by depressing the latch member 38 and rotating the tray 22 away from the chassis 10 towards the access position 202.

The chassis 10 can also be configured to support other components of the telecommunications panel 100, as desired. For example, the chassis 10 can be configured to support cable management features 44 and 54. In the embodiment shown, cable management features 54 and 44 guide patch cords 304 extending from the tray assembly 20. The chassis 10 may also be provided with one or more features for allowing cable to enter the chassis 10, for example cable routing slot 46 and cable routing aperture 48.

In addition to the previously described aspects of the support arm 24, the support arm 24 further includes a first end 24a and a second end 24b having an exterior side 24d, a top wall 24e, and a bottom wall 24f. In the embodiment presented, the walls 24e, 24f and the side 24d together form a channel-like structure having an open interior side 24c within which a portion of a cable pathway 208 is formed. Adjacent the first end 24a are the upper and lower joint arms 28, 30 that form a part of the pivot joint 26. In one aspect, the support arm 24 is provided with a plurality of cable guides 42 to ensure that cables 300 routed within the support arm 24 are adequately retained.

In addition to the previously described aspects of the tray 22, the tray 22 further includes a rear side 22a and a front side 22b that extend between opposite first and seconds sides 22c, 22d. As shown, the second side 22d is provided with a curved shape such that the rear sidewall 22a is shorter than the front side 22b to allow for clearance between the tray 22 and the chassis 10 as the tray 22 is rotated out of the chassis 10. The tray 22 may also be provided with a cover 23 for protecting the components and fiber supported within the tray 22. In one aspect, the tray 22 includes a pair of hinges 52 for rotatably supporting an access door or cover. The location of the door and hinges 52 can define a front plane A4 of the tray 22 which is shown as being parallel to the rear side 22a and orthogonal to the first and second sides 22c, 22d.

The tray 22 further defines the cable routing pathway 208 via the walls forming the first side 22c and the rear side 22a of the tray 22, along with a bottom portion 22h of the tray 22. An interior wall structure 22e also functions to define the cable routing pathway 208, as do radius guides 22f which prevent the cables 300 from kinking or bending too severely. The cables 300 can be further retained within the cable routing pathway 208 via a plurality of cable guides 22g located at the top of the tray 22.

Figure 17:
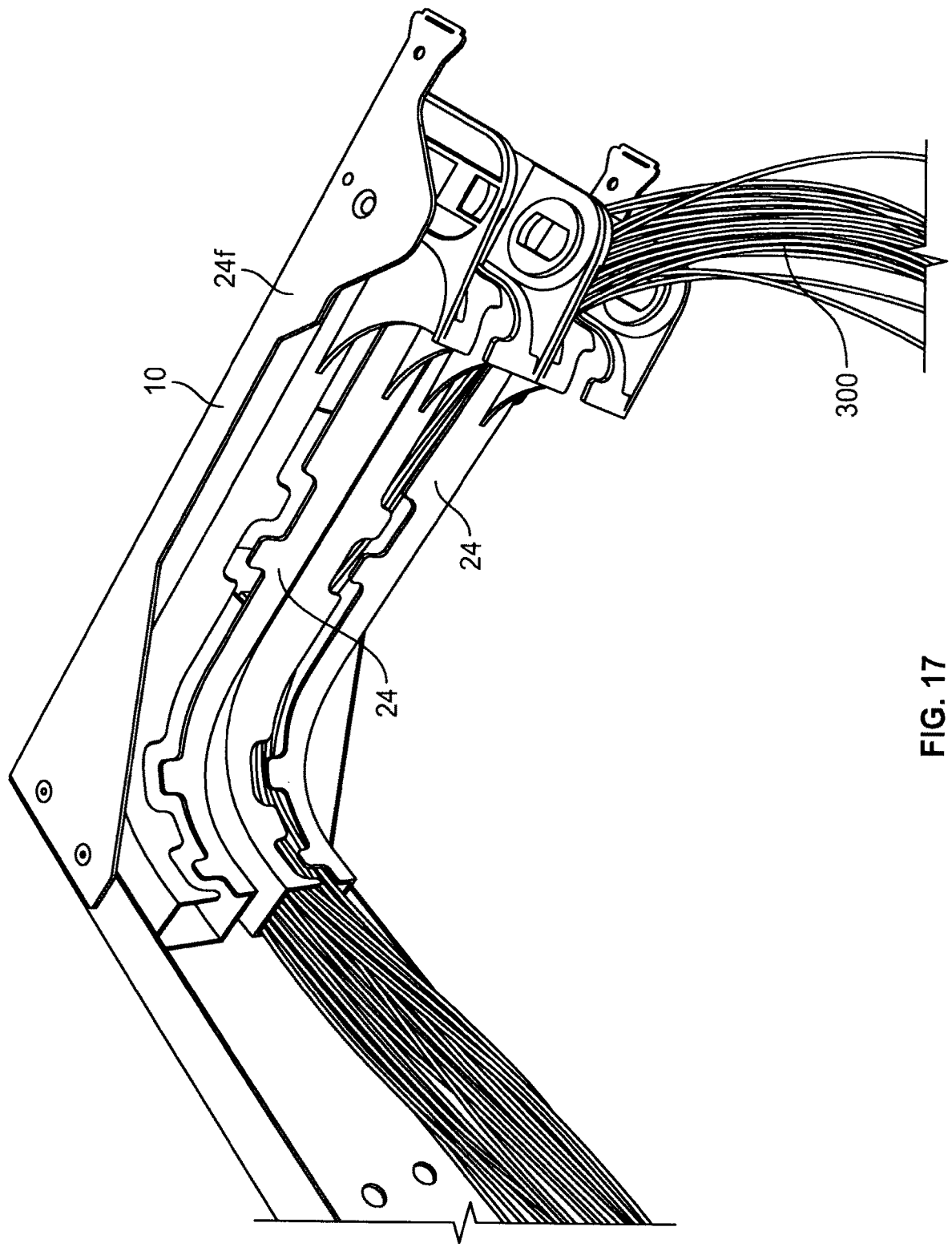
FIG. 17 is a perspective photographic view of a support arm of FIG. 12 with cables routed within a cable routing path defined by the support arm.
Figure 18:
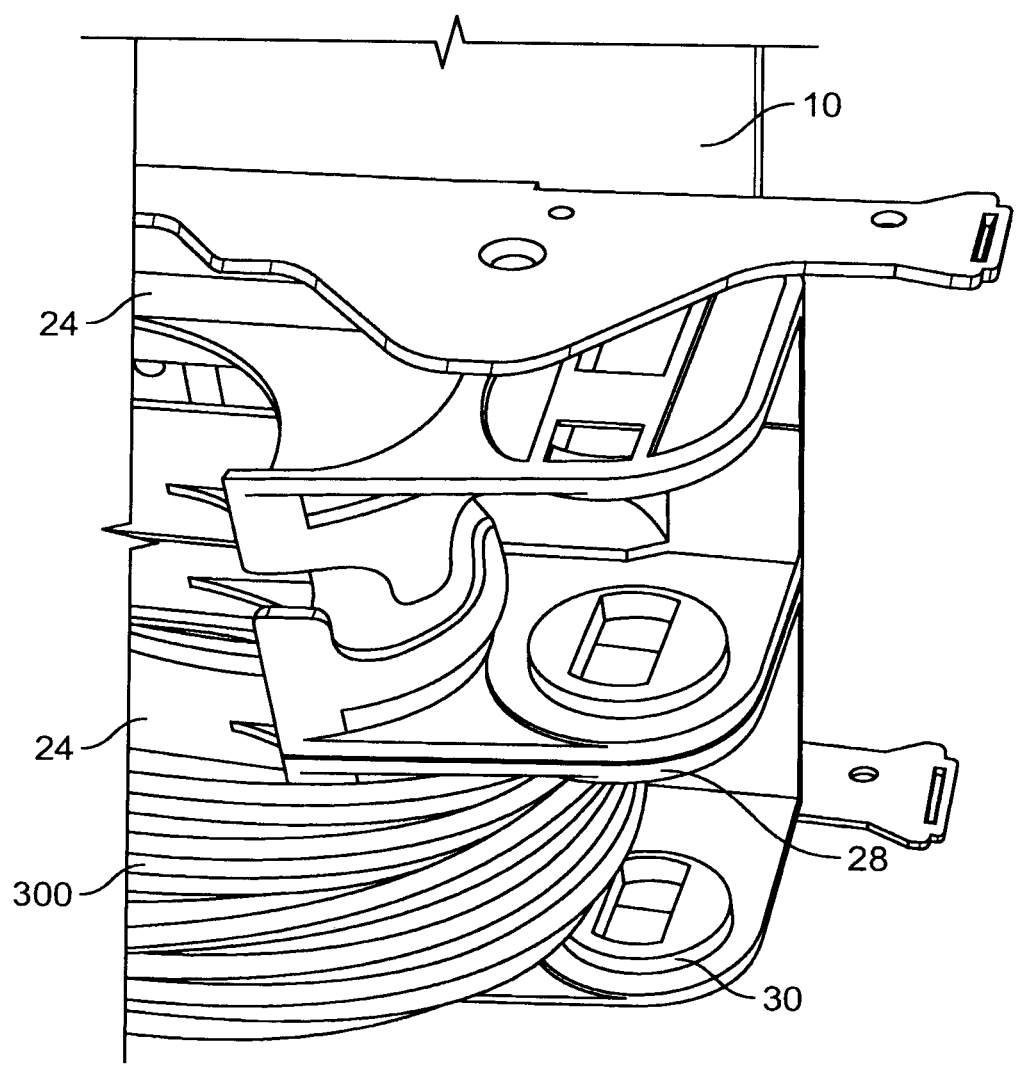
FIG. 18 is a perspective photographic view of a support arm of FIG. 12 with cables of FIG. 17 wrapped around the first end of the support arm about the pivot joint.
Figure 19:
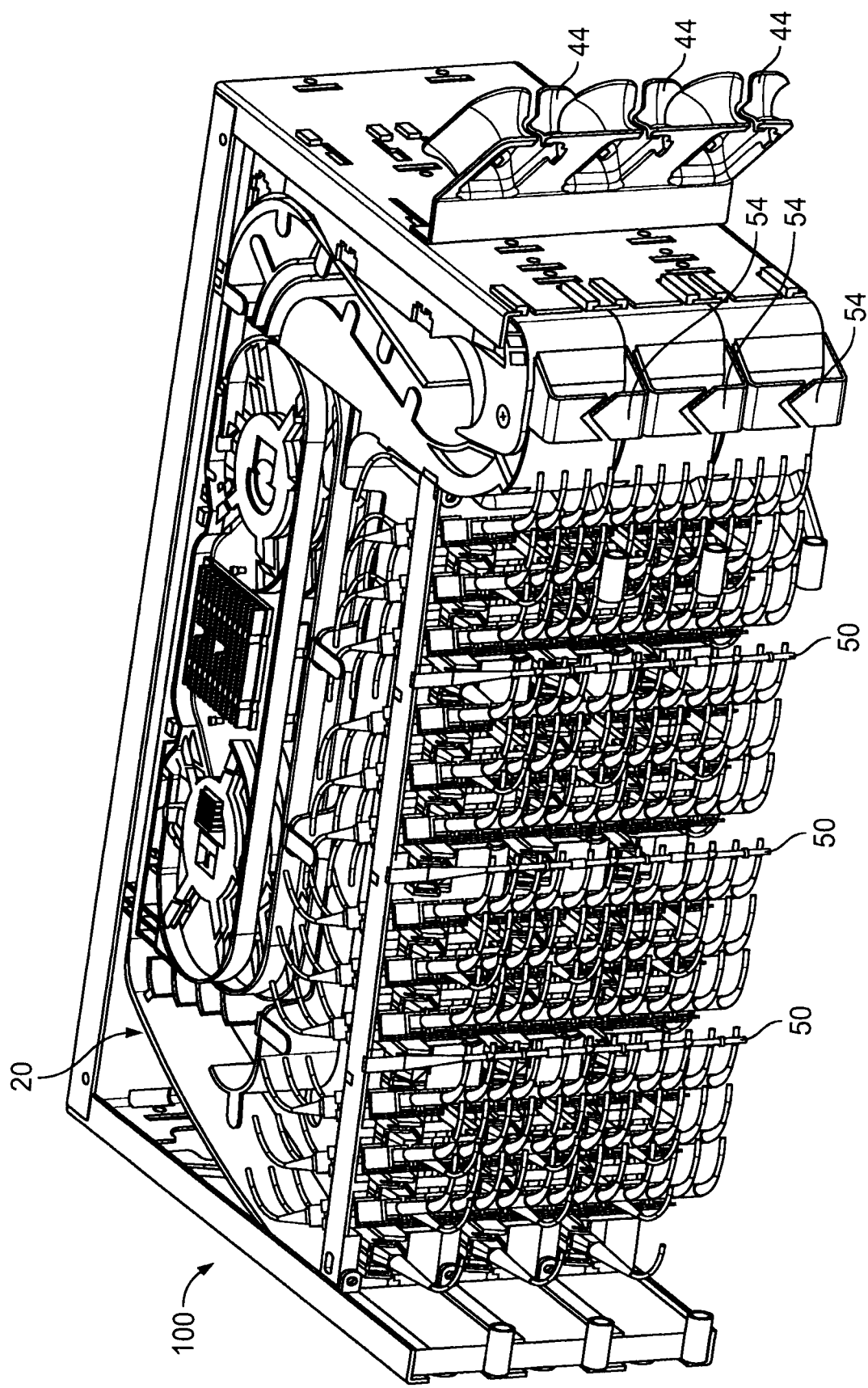
FIG. 19 is a perspective view of the telecommunications panel of FIG. 1, with additional cable mounting features mounted thereon.

As discussed previously, the cable routing pathway 208 passes between the space defined between the upper and lower joint extensions 32, 34 of the tray 22. Because the upper joint extension 32 engages with the upper joint arm 28 and the lower joint extension 34 engages with the lower joint arm 30, the pivot joint 26 is formed without the need for any structure between the upper and lower joint extensions 32, 34. Accordingly, this space can be utilized to define the cable routing pathway 208 as it extends from the support arm 24 and the tray 22. The upper and lower joint extensions 32, 34 also serve to constrain the cables 300 as the cables traverse between the support arm 24 and the tray 22. Accordingly, the cables 300 within the cable routing pathway 208 enter the tray 22 through the pivot joint 26 in an orientation that is perpendicular to the rotation axis A1. FIGS. 17 and 18 show an example of a number of cables 300 passing through the pivot joint 26. A key benefit to allowing the cables 300 to be routed through the pivot joint 26 rotational axis A1 is that the routing length of the cables 300 can remain relatively unchanged as the tray 22 is rotated between the folded and access positions 200, 202. Thus, the rotation of the tray 22 does not cause undue tension on the cables 300 as the tray 22 is being rotated about the pivot axis A1.

Figure 8:
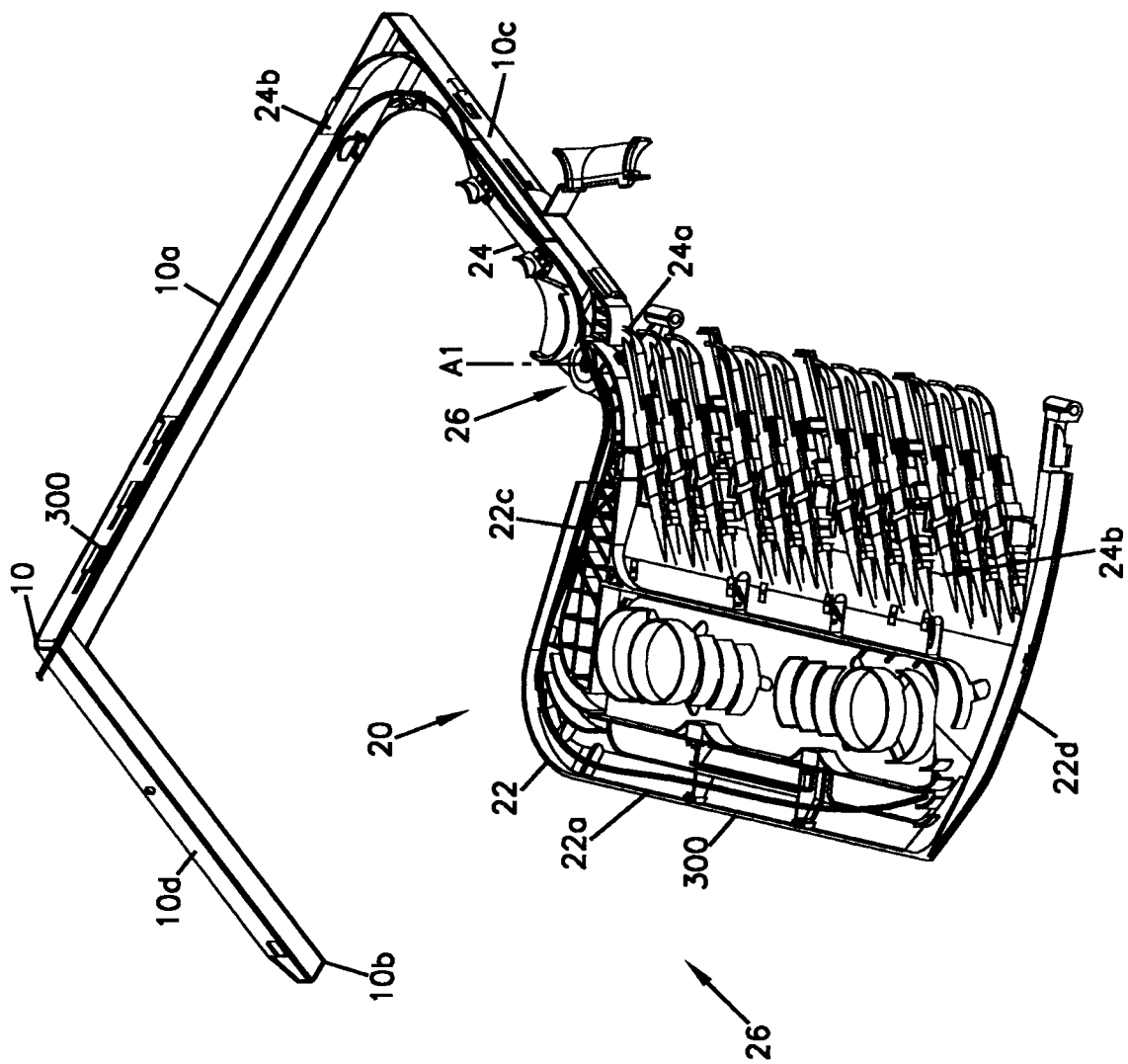
FIG. 8 is a cross-sectional perspective view of one of the multi-positionable tray assemblies of FIG. 1 shown in an installed position and rotated into an access position.
Figure 9:
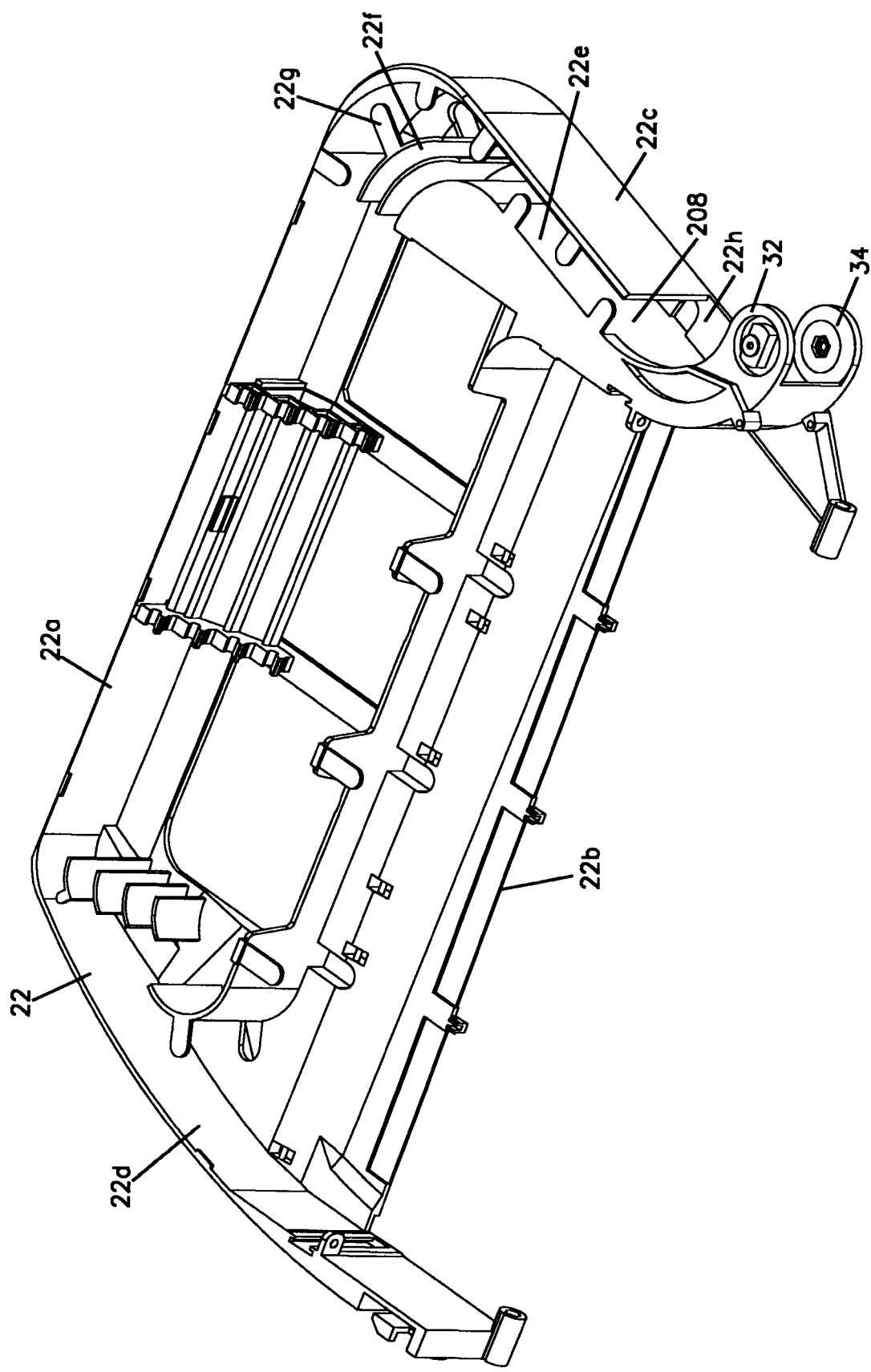
FIG. 9 is a perspective view of a tray of one of the multi-positionable tray assemblies of FIG. 1.
Figure 10:
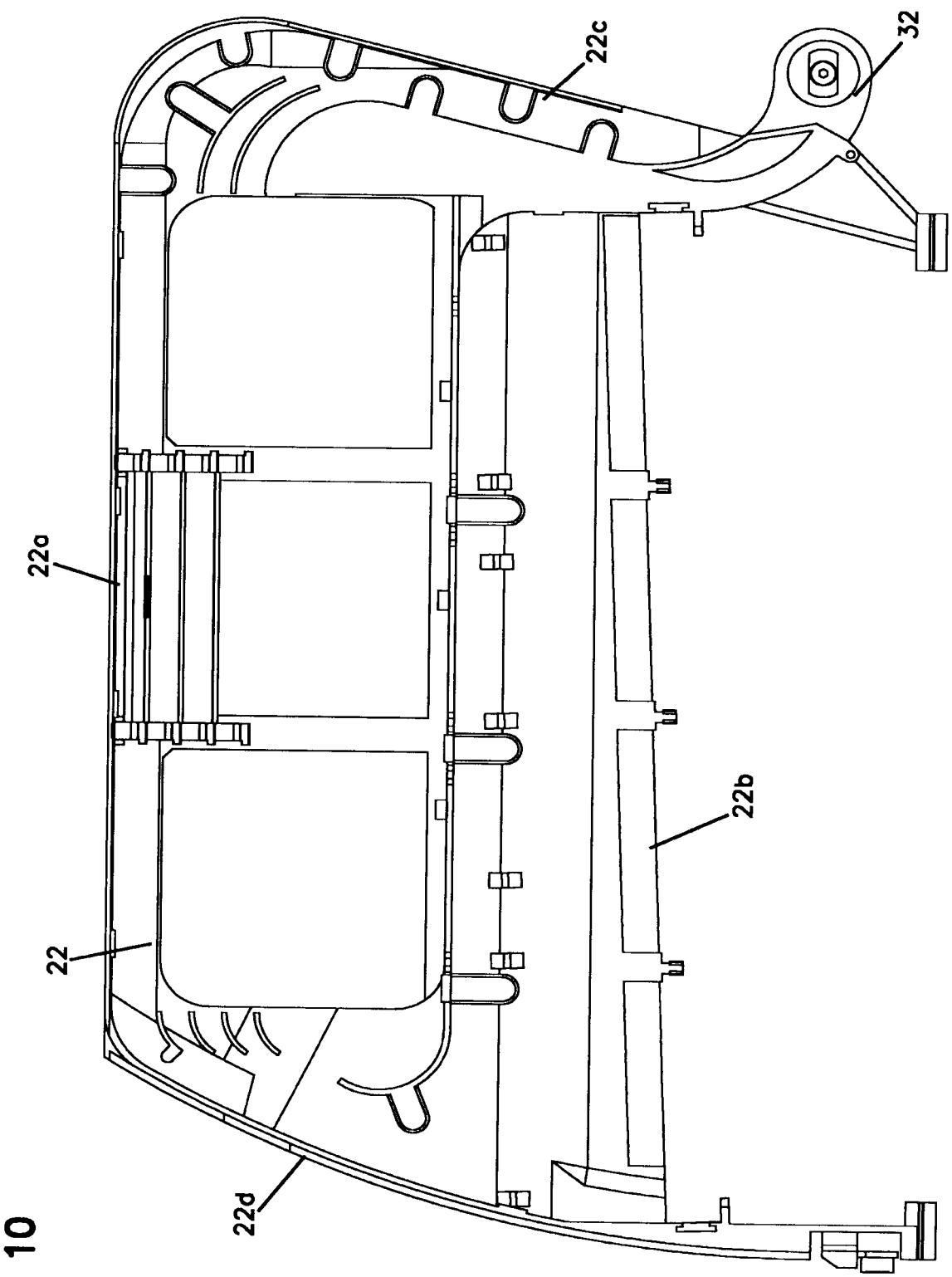
FIG. 10 is a top view of the tray of FIG. 9.
Figure 11:
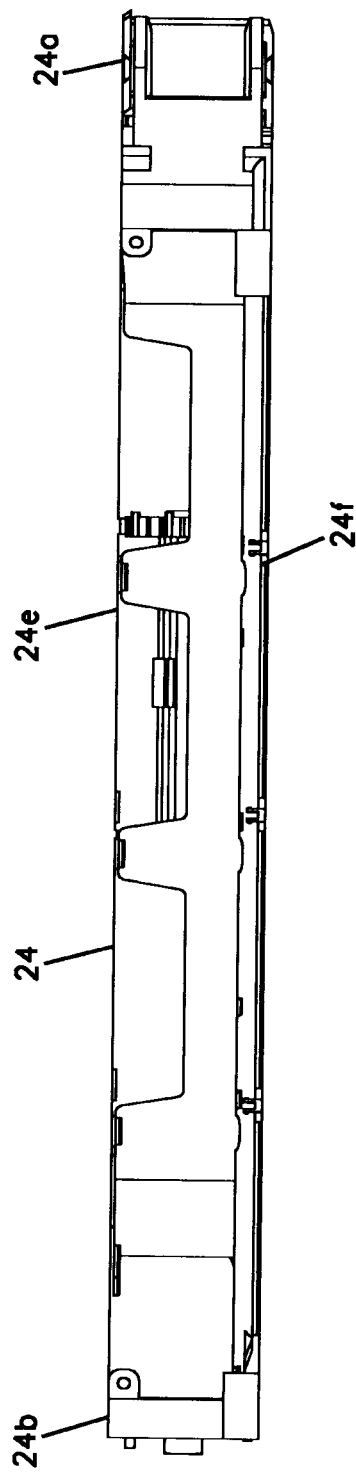
FIG. 11 is a front view of the tray of FIG. 10.
Figure 12:
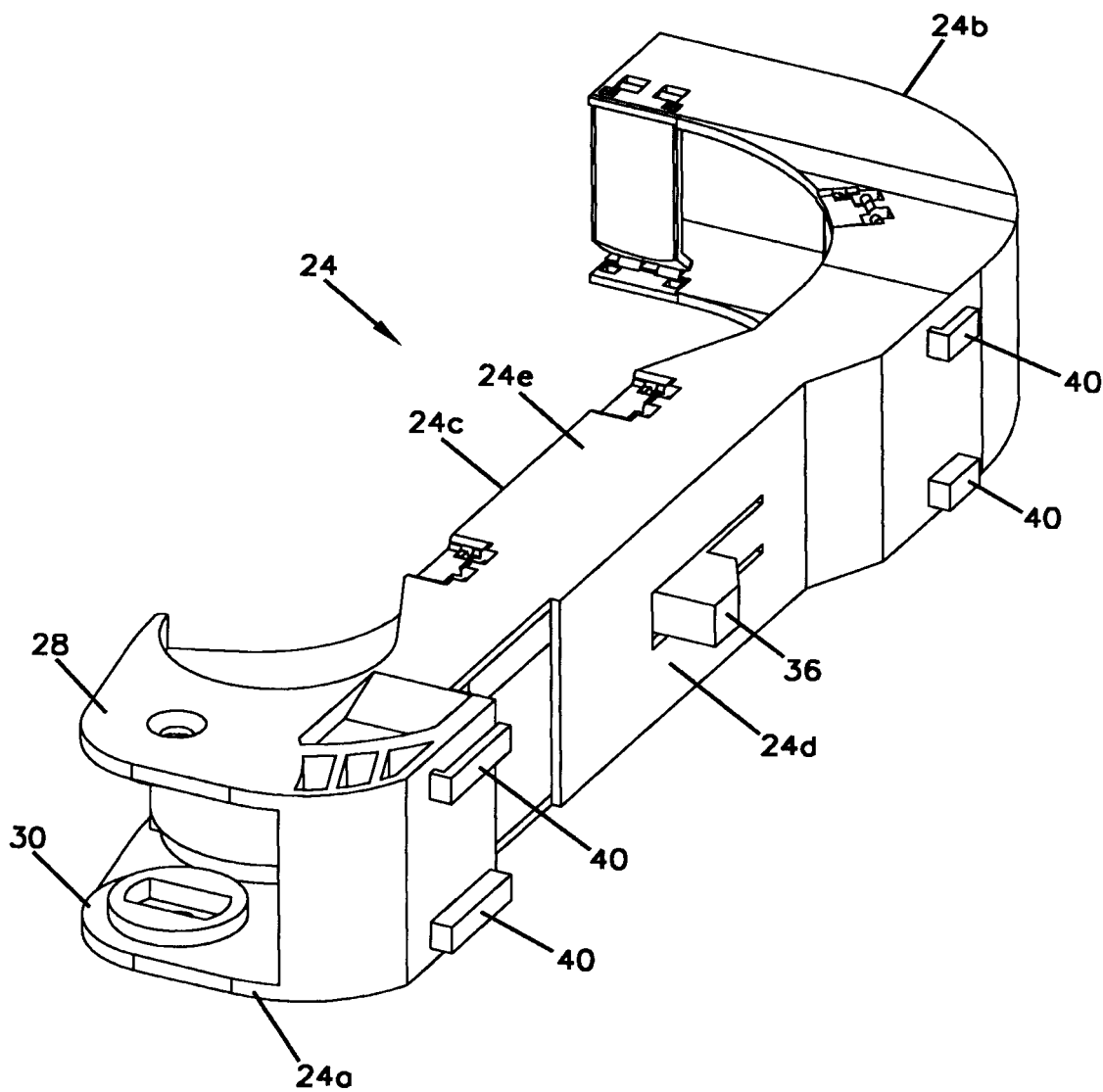
FIG. 12 is a front-right perspective view of a support arm of one of the multi-positionable trays of FIG. 1.
Figure 13:
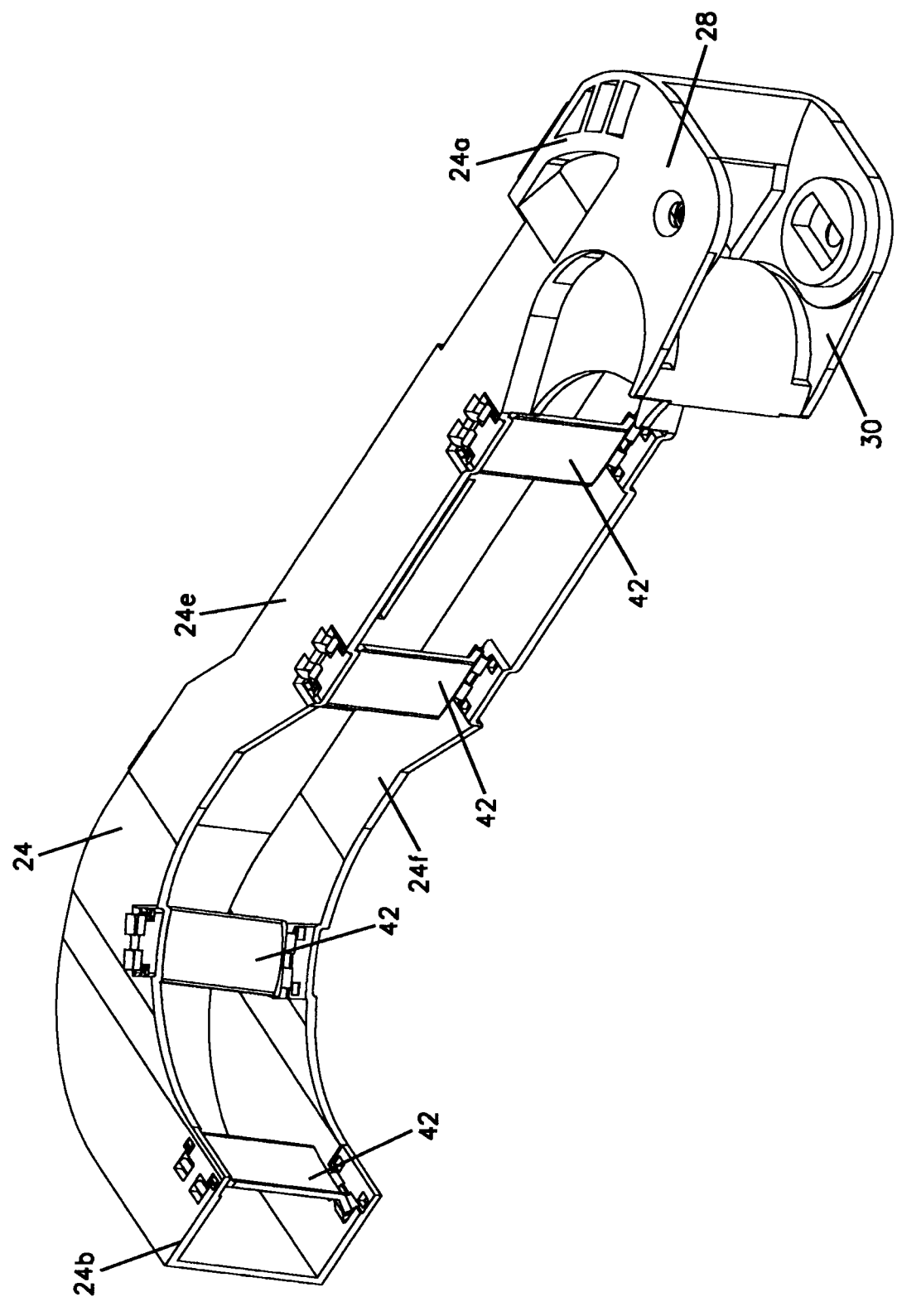
FIG. 13 is a front-left perspective view of the support arm of FIG. 12.
Figure 14:
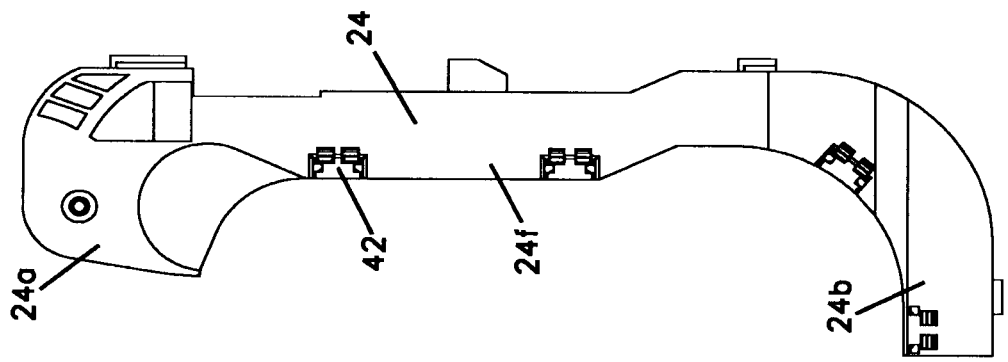
FIG. 14 is a top view of the support arm of FIG. 12.
Figure 15:
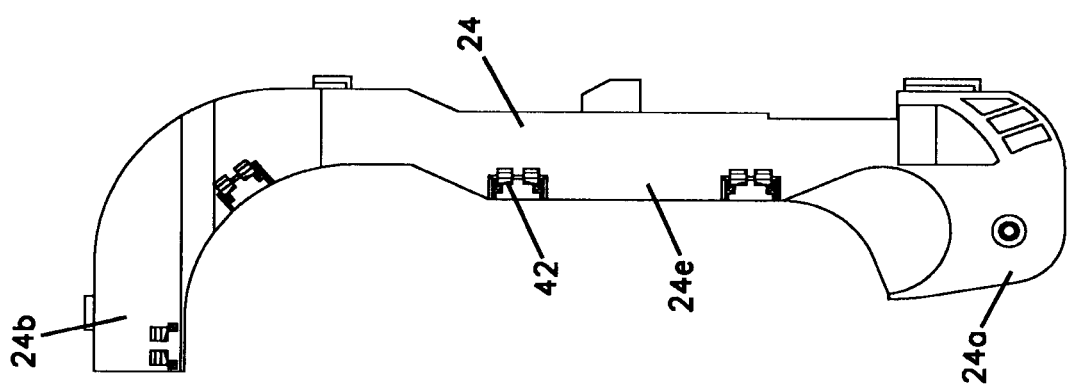
FIG. 15 is a bottom view of the support arm of FIG. 12.
Figure 16:
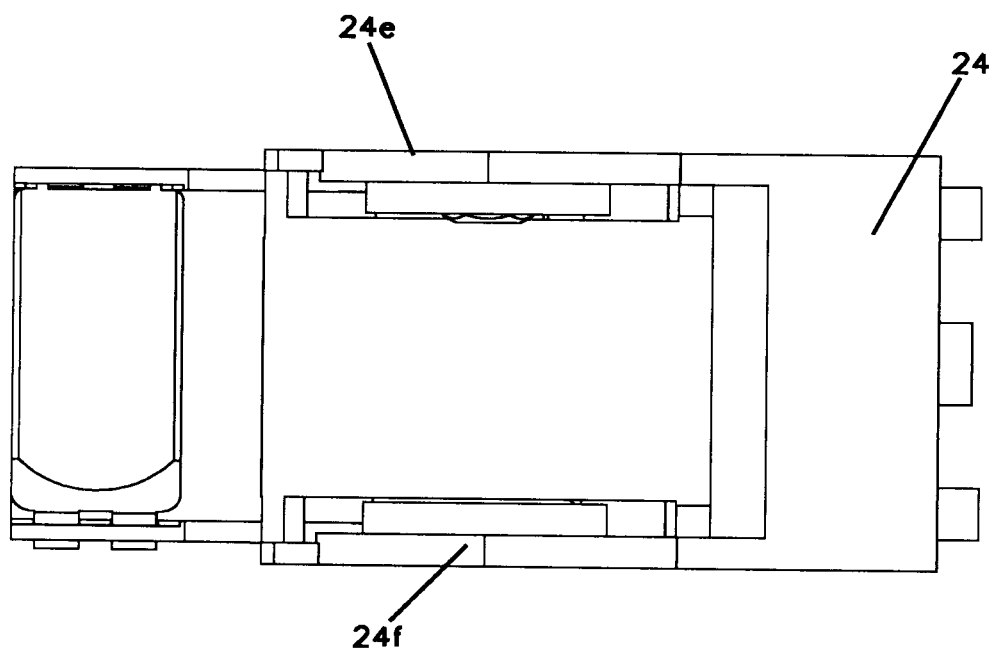
FIG. 16 is an end view of the support arm of FIG. 12.

Referring to FIG. 8, it can be seen that above described configuration results in the cable routing pathway 208 extending from the second end 24b of the support arm 24 to the first end 24a of the support arm 24, across the pivot joint 26, and along the first side 22c and rear side 22a of the tray 22. The cables 300 can further extend from the second end 24b of the support arm along the rear side 10a of the chassis 10 towards the second end 10d, and through the cable routing aperture 48.

In the embodiment presented, the tray 22 is configured to hold a plurality of splice trays 112 or other components to which the cables 300 can be routed along the rear side 22a of the tray 22. In the embodiment shown, the cables 300 extend to the splice trays 112 from which patch cords 302 extend as cabled ends 110a of fiber optic connectors 110. The fiber optic connectors 110 are shown as being connected to the first sides 108a of adapters 108. As shown, the adapters 108 are arranged along a transverse axis A2 which generally extends between the sides 22c and 22d of the tray 22. In one embodiment, the adapters 108 in the patch panel 104 are supported by a patch panel frame 106 extending along transverse axis A2 from a first end 106a proximate first side 22c to a second end 106b proximate second side 22d. Fiber optic connectors 114 are shown as being connected to the second sides 108b of the adapters 108. The fiber optic connectors 114 are shown as having cabled ends 114a which form patch cords 304 which can be routed through cable management features 44 and 50 to the outside of the telecommunications panel 100.

As shown, the adapters 108 and connectors 110, 114 are aligned along an axis A3 which is shown as forming an oblique angle with the transverse axis A2. This configuration is advantageous over configurations in which the axes A2 and A3 are generally orthogonal in that less overall depth (i.e. the distance between the rear side 22a and the front side 22b) is required of the tray 22 in order to accommodate the cable management structures. Additionally, by disposing the cabled ends 114a of the connectors 114 at an angle towards the end of the telecommunications panel 100 at which the patch cords 304 exit via cable management feature 44, less turning is required of the cords and thus bend radius protection is enhanced. Likewise, by disposing the cabled ends 110a of the connectors 110 at an angle towards the splice trays 112, less turning is required of the cords and thus bend radius protection is enhanced in this manner as well. Space allocation can be further enhanced by arranging the patch panel frame 106 such that axis A3 is not parallel to the front plane A4 or rear side 22a. For example, the patch panel 104 and frame 106 can be oriented such that axis A3 is at an angle from about 2 to about 4 degrees, and preferably about 2.5 degrees, with respect to the axis A4 and the rear side 22a of the panel 22. This configuration allows for there to be a greater distance D1 provided between the patch panel 104 and the front face plane A4 of the tray 22 at the first side 22c, as compared to the corresponding distance D2 at the second side 22d of the tray 22. Likewise, this configuration also allows for there to be a greater distance D3 provided between the patch panel 104 and the splice tray 112 of the tray 22 at the second side 22d, as compared to the corresponding distance D4 at the first side 22c of the tray 22. As the patch cords 302 are greater towards the second end 22d of the tray 22 and the patch cords 304 are greater in number towards the first end 22c of the tray 22, the increased distances D1 and D3, respectively, provide for additional cable routing space where it is most needed and allows for a more compact construction of the tray 22.

It is noted that the drawings show a configuration in which the support arm 24 and pivot joint 26 are proximate the first side 22c of the tray 22. This configuration results in the tray 22 being pivotable from the first side 22c of the tray 22. However, the support arm 24 and tray 22 can be produced as mirror images of the embodiment shown in the drawings, such that the support arm 24 and pivot joint 26 are located proximate the second side 22d of the tray 22 which would allow for the tray 22 to be rotated about the second side 22d of the tray 22.

Tray Assembly 420

Referring to FIGS. 20-67, a second embodiment of a tray assembly 420 is shown, as noted previously. As many of the concepts and features are similar to the first embodiment of the tray assembly 20 shown in FIGS. 5-16, the description for the first embodiment is hereby incorporated by reference for the second embodiment. Where like or similar features or elements are shown, the same reference numbers will be used where possible (e.g. reference number 422 instead of reference number 22 for the tray). The following description for the second embodiment will be limited primarily to the differences between the first and second embodiments.

The second embodiment of the tray assembly 420 is different from tray assembly 20 in that the tray assembly 420 includes a repositionable bend radius limiter 460 which can be attached to the tray 422, in that the tray assembly 420 has a multiple piece support arm structure 423, in that a pivotable cable management part 454 is provided on the support arm structure 423, in that the interior bay of the tray 422 has attachment features for accepting different types of accessories, such as splice trays and splitters. The tray 422 also has a modified latch member 438 for securing the tray 422 into the chassis 10 when in the folded position.

Figure 56:
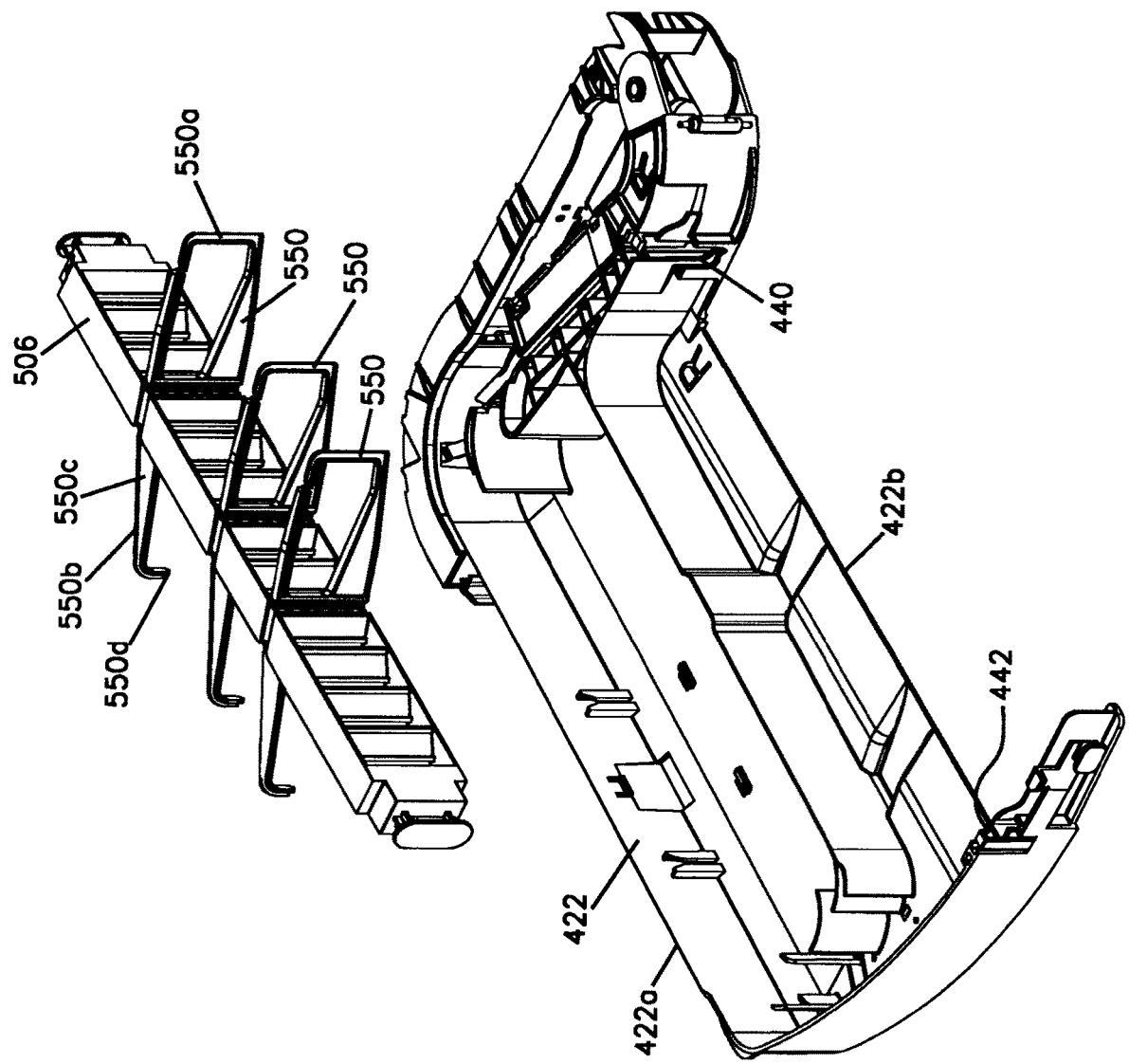
FIG. 56 is a front perspective view of the tray assembly shown in FIG. 44 with a second embodiment of a patch panel frame aligned for installation onto the tray.
Figure 57:
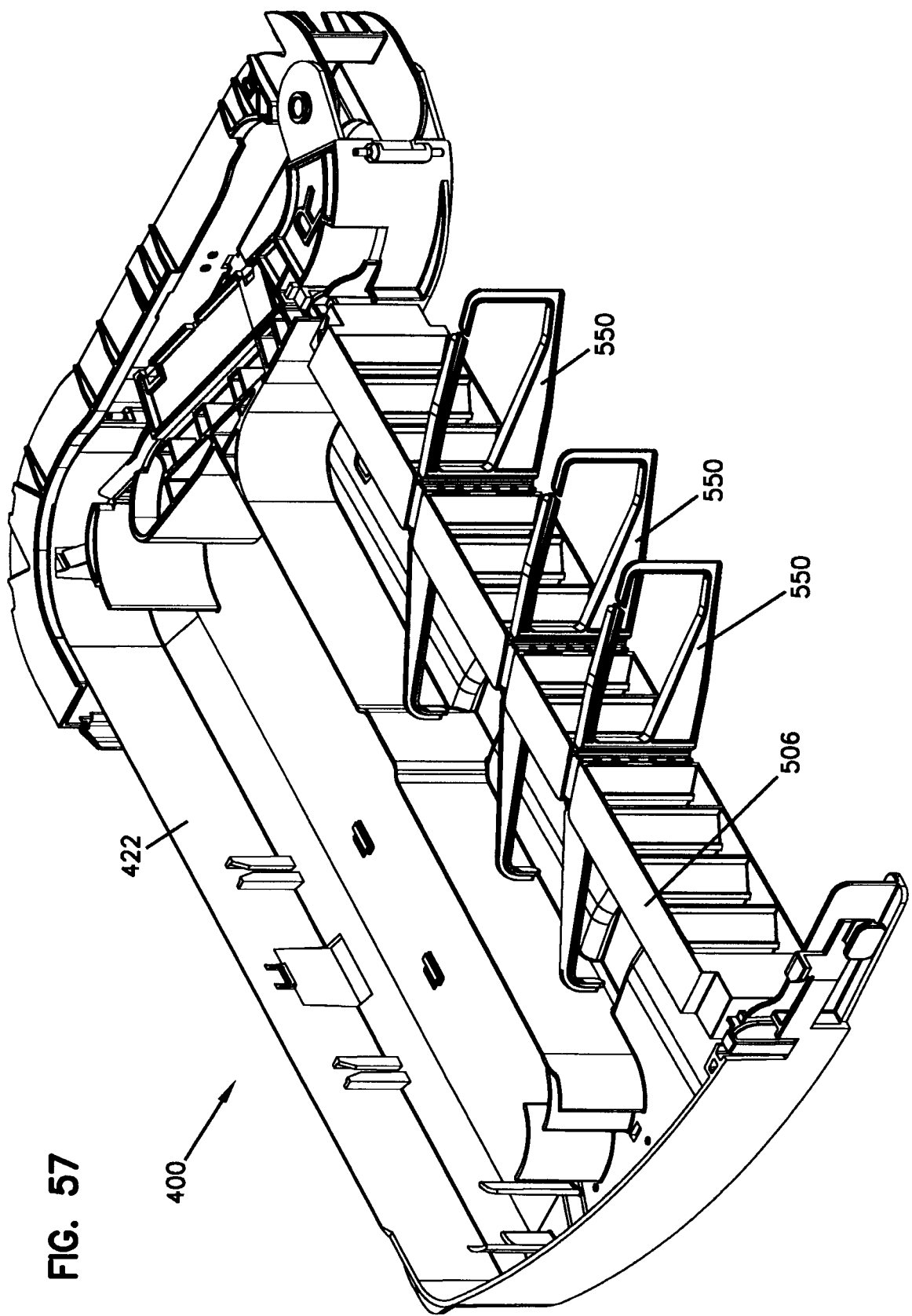
FIG. 57 is a front perspective view of the tray assembly shown in FIG. 44 with the patch panel frame shown in FIG. 56 installed onto the tray.

The tray 422 is also provided with modified receiving structures 440, 442 for receiving variously configured patch panel frames, such as the patch panel frame 506 shown in FIGS. 56 and 57 which has cable management features 550 and is configured for use with LC-type adapters. As shown, the cable management feature 550 can be a singly formed component (i.e. a single molded plastic part) that is mounted from the top and into a slot of the patch panel frame 506. The cable management feature 550 has a front portion 550a that extends towards the front end 422b of the tray 422 and forms a largely enclosed structure with an opening at the top through which cables can be inserted. The cable management features 550 also has a rear portion 550b that extends towards the rear end 422a of the tray 422. The rear portion 550b has a horizontal portion 550c that extends across the top plane of the tray assembly 420 and acts to hold the cables within the tray 422 such that they do not rise beyond the top of the tray 422. A downwardly extending portion 550d is also provided to further secure the cables. This configuration ensures that sufficient clearance exists between vertically adjacent tray assemblies 420 without interference between cables within one tray assembly 420 and the bottom of an above tray assembly 420. As shown, three cable management features 550 are shown. However, more or fewer may be utilized depending upon application.

In one aspect of the disclosure, the support arm structure 423 includes the previously described first support arm 424 and a second support arm 480. The second support arm 480 is configured to pivotally connect to the first support arm 424 with the same general pivot location 426 functionality as previously described and has many of the features that were previously integral to the tray 422. However, the second support arm 480 is separable from the tray 422 which provides modularity in that the same support arm structure 423 can be used with differently sized and configured trays without the need for modification of the support arm structure 423. To accommodate this configuration, the wall structure 422c of the tray 422 is provided with a modified configuration in which the wall structure 422c is provided with a plurality of lower lugs 490 and a plurality of upper lugs 492 that together define a receiving channel 494 for accepting the second support arm 480. A modified arrangement of radius limiting guides 422f is also provided. Additionally, instead of providing the wall structure corresponding to wall 22e of the previous embodiment, the tray assembly 420 achieves the function of this wall with the bend radius limiter 460 (discussed below) which is pivotally attached to the tray 422 to cover an opening defined by the second support arm 480.

As shown, the lower lugs 490 of the second support arm are each provided with a base portion 490a, wherein at least one of the lower lugs 490 additionally includes an extension portion 490b that forms a recess 490c with the base portion 490a. Similarly, each of the upper lugs 492 are provided with a base portion 492a, wherein at least one of the upper lugs additionally includes an extension portion 492b that forms a recess 492c with the base portion 492a. Collectively, the base portions 490a, 492a and the recesses 490c, 492c define the receiving channel 494. In one aspect, the base portions 490a are aligned along a first axis A while the base portions 492a are aligned along a second axis B. In the exemplary embodiment shown, the axis A is disposed at an oblique angle to the axis B such that the receiving channel 494 tapers from a larger dimension nearest the front side 422b to a narrower dimension nearest the rear side 422a of the tray 422.

The second support arm 480, which is shown in further detail at FIGS. 24, 58, and 61-65, includes a top wall 482, a back wall 483, and a bottom wall 484 that together define a channel 480a having an open face 480b. A mounting structure 496 is provided on the back wall 483 and is configured to be received into the receiving channel 494 defined by the tray 422. As shown, the mounting structure 496 includes a base portion 496a extending from the back wall 483 and a flange portion 496b extending from the base portion 496a to form a t-shaped structure having recesses 496c and 496d. The base portion 496a and the flange portion 496b are dimensioned such that the flange portion 496b can extend into the recesses 490c, 492c of the lower and upper lugs 490, 492, respectively. Likewise, the extension portions 490b, 492b of the lugs 490, 492 extend into the respective recesses 496c, 496d of the mounting structure 496.

Figure 58:
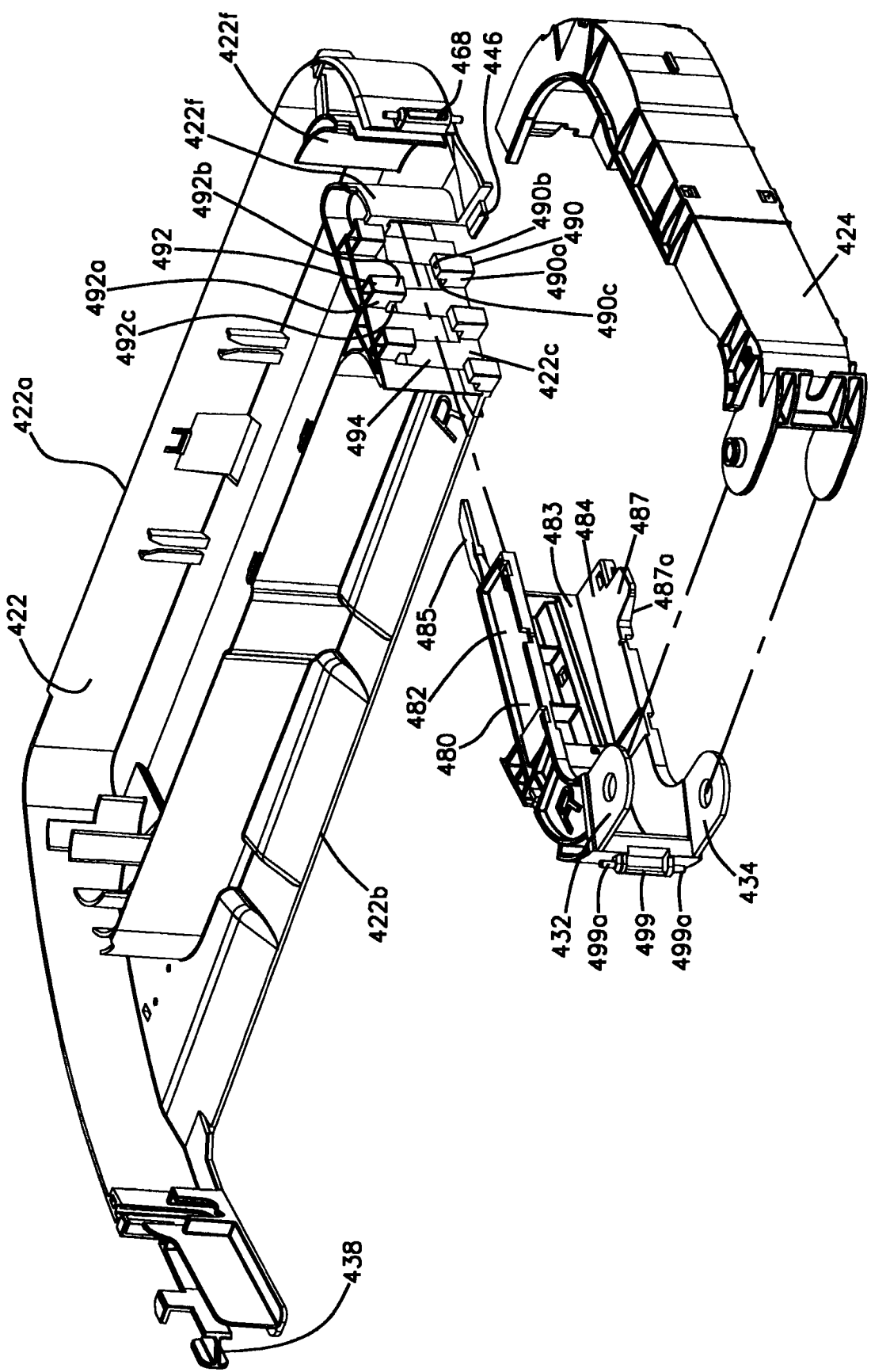
FIG. 58 is an exploded perspective view of the tray assembly shown in FIG. 44 with the support arm structure removed from the main body of the tray.
Figure 59:
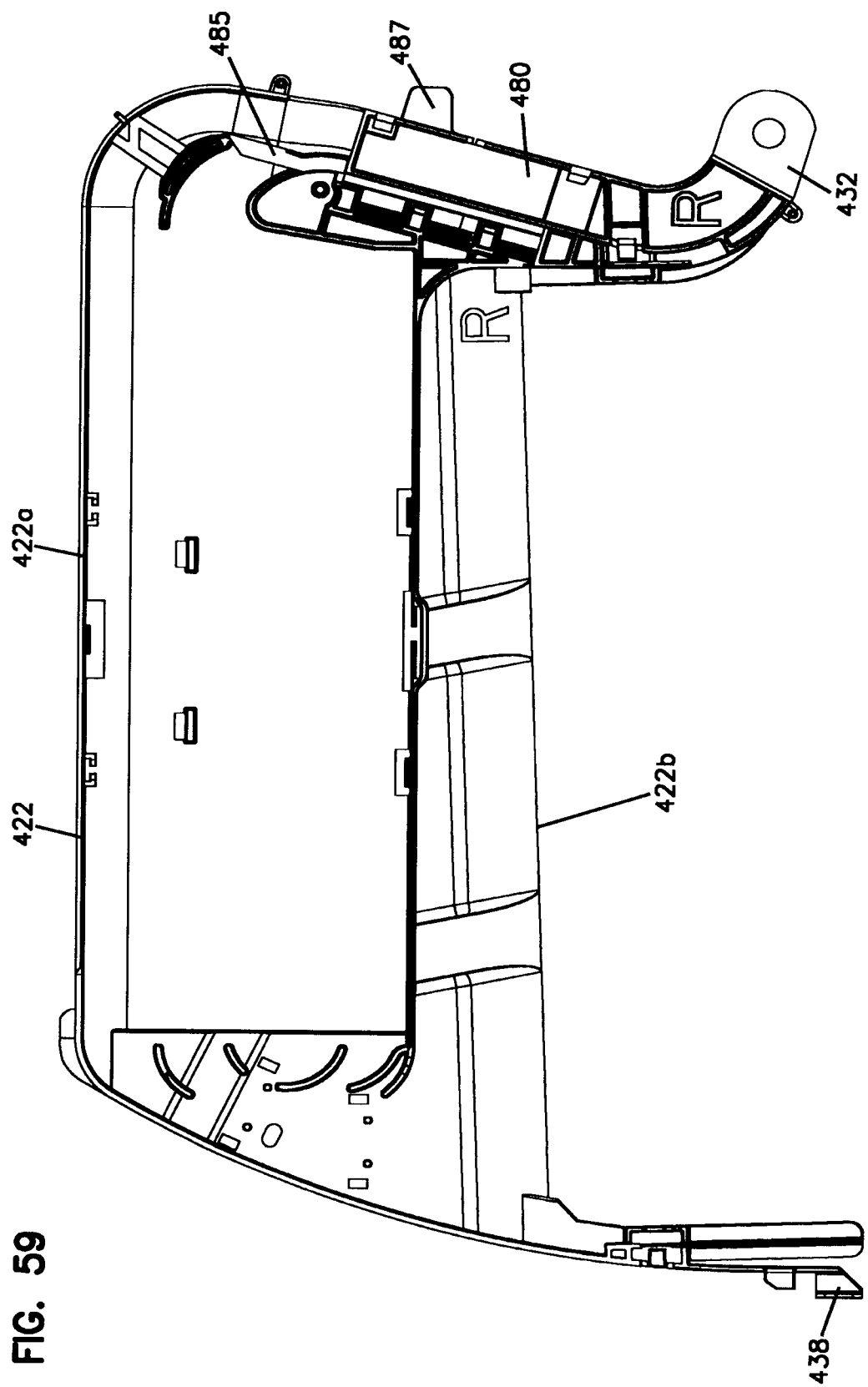
FIG. 59 is a top view of the tray of the tray assembly shown in FIG. 44.
Figure 60:
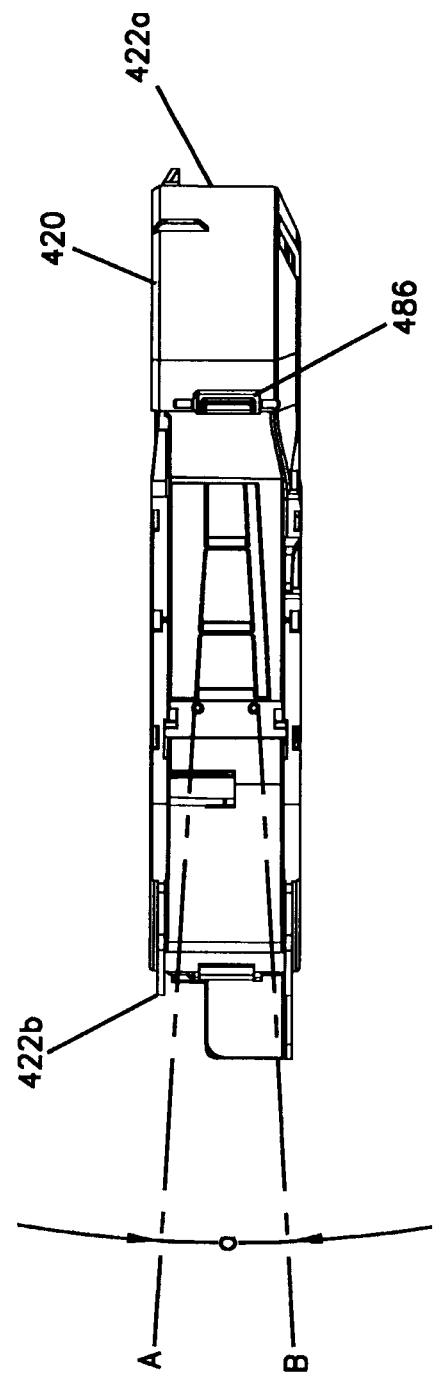
FIG. 60 is a side view of the tray shown in FIG. 59.
Figure 61:
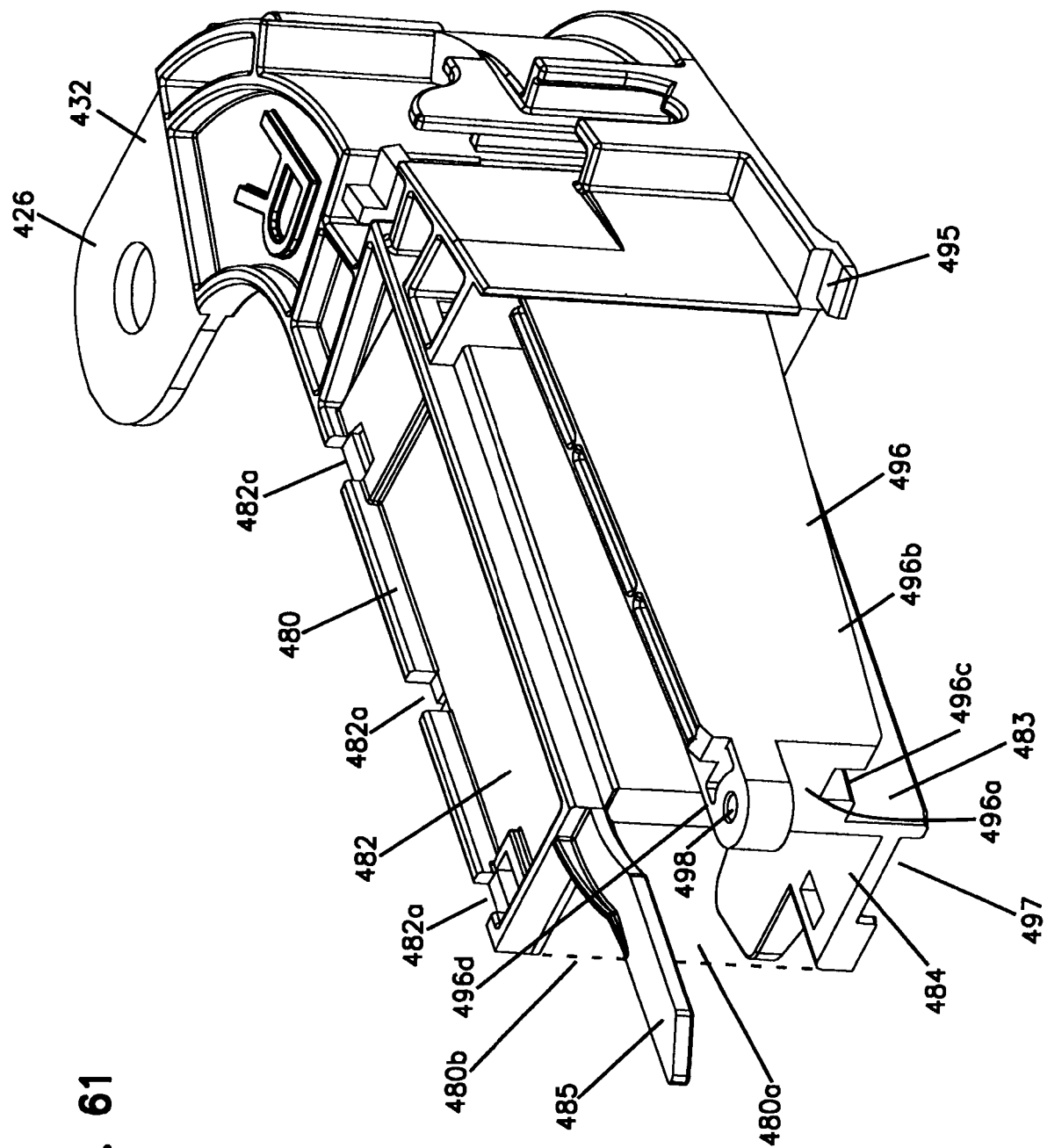
FIG. 61 is a perspective view of a first arm of the support arm assembly which is part of the tray assembly shown in FIG. 44.
Figure 62:
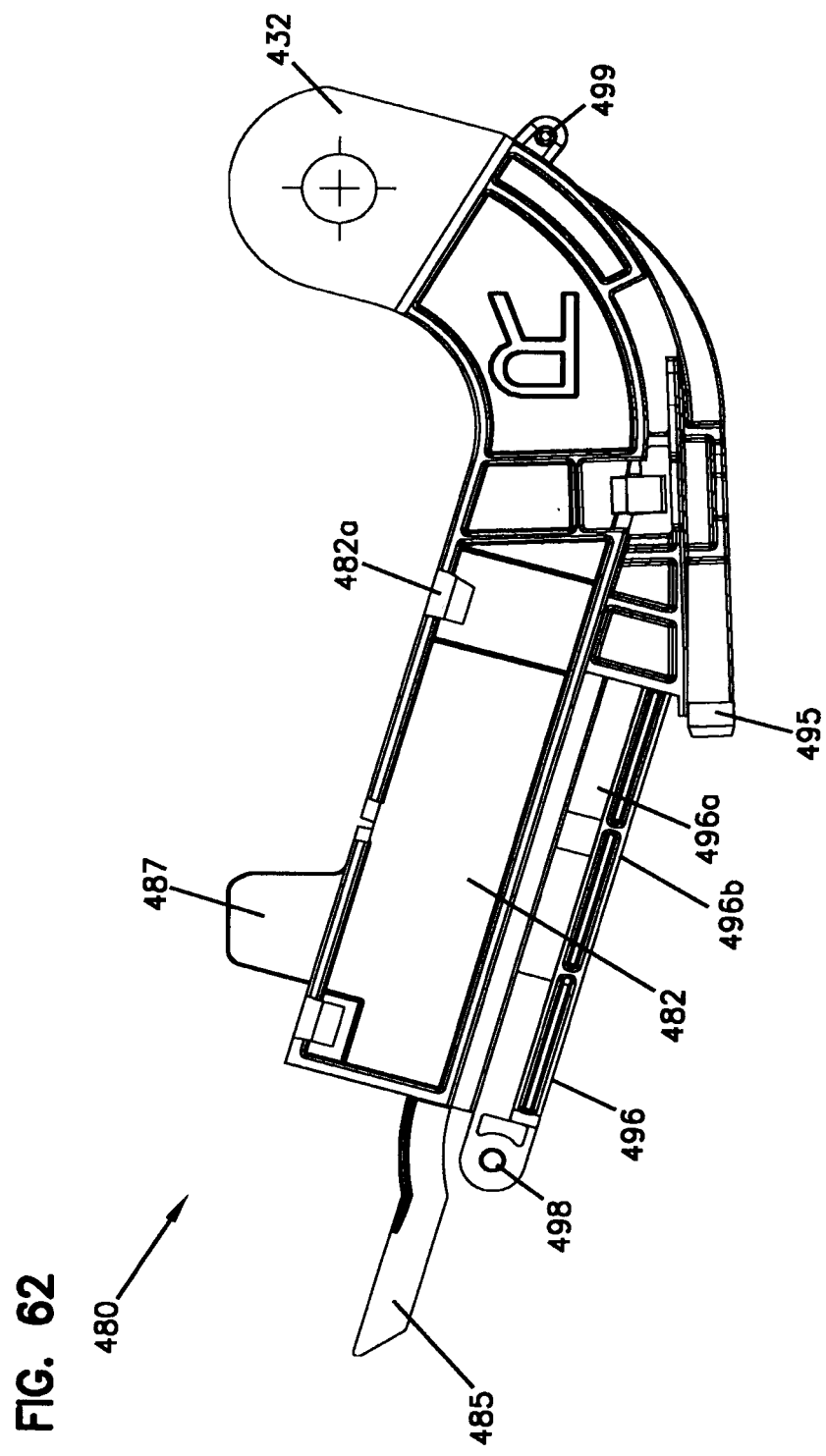
FIG. 62 is a top view of the first arm shown in FIG. 61.
Figure 63:
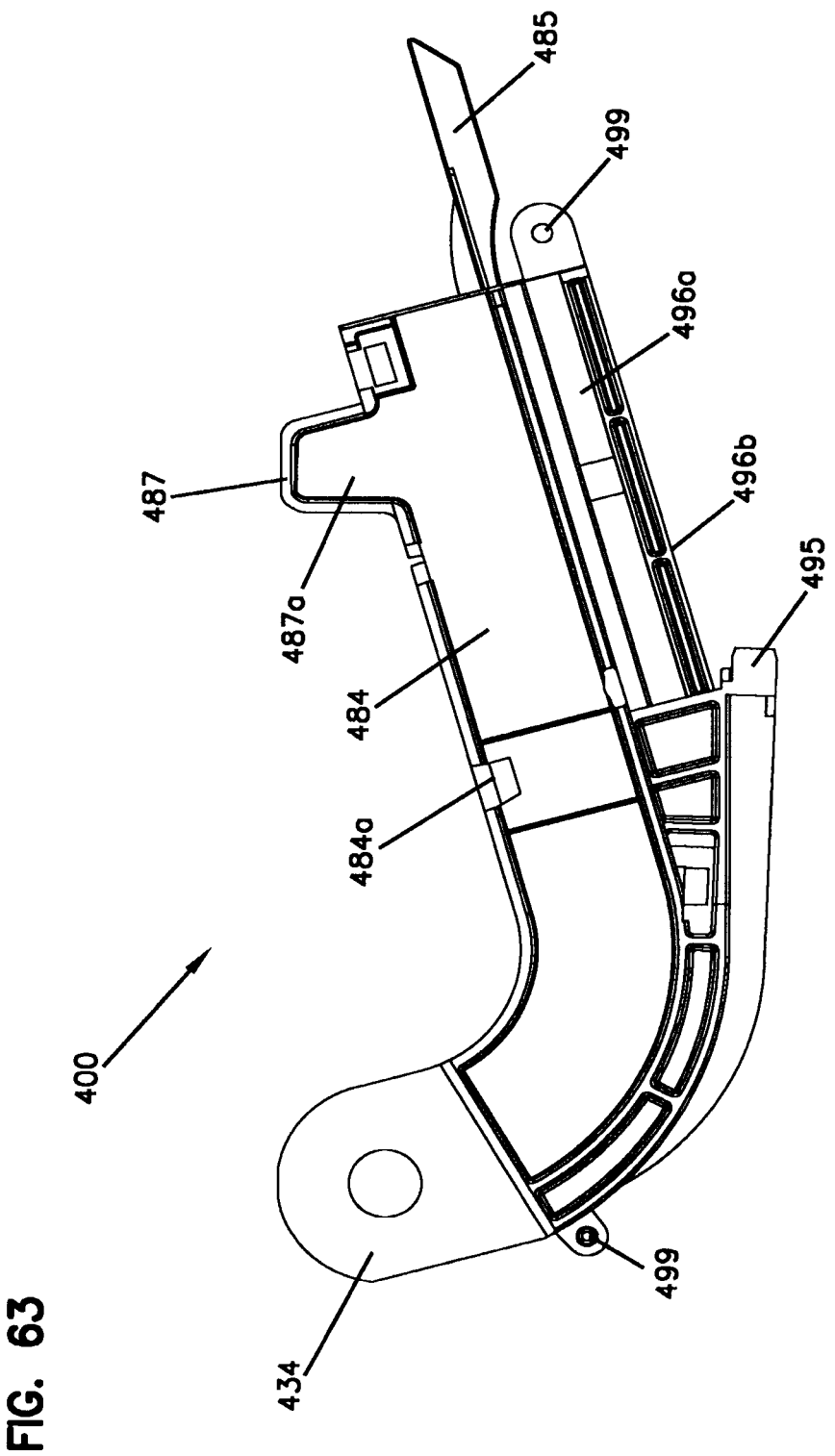
FIG. 63 is a bottom view of the first arm shown in FIG. 61.

The flange and base portions 496a, 496b are also provided with a tapered shape matching the angle "a" of the receiving channel 494. The tapered shape allows for greater clearance when initially aligning the second support arm 480 to the tray 422, as shown at FIG. 58, and then allows for a relatively tight fit once the second support arm 480 is fully inserted into the receiving channel 494. To secure the second support arm 480 onto the tray 422, a post or fastener can be inserted through an aperture 498 disposed on the mounting structure 496 which prevents the second support arm 480 from being removed from the receiving channel 494 by abutting against the lugs 490, 492 nearest the rear side 422a of the tray 422.

To further aid in alignment, the tray 422 can be provided with a tab 446 which is received by a slot or channel 497 in the bottom wall 484 of the second support arm 480. Alternatively, the tray 422 can be provided with a slot and the second support arm 480 could be provided with an extension tab. The second support arm 480 is also shown as having an alignment tab 485 which is received by a structure 422g of the tray 422. Additional alignment features may also be used, such as cooperating pins and cavities for receiving the pins.

The second support arm 480 can also be provided with a support member 487 extending from the bottom wall 484. The support member 480 is received into the first support arm 484 and rests above the bottom wall 424f (see 24F in FIG. 13) of the support arm 424. As such, the bottom wall 424f can provide support to the second support arm 480 via the support member 487 to reduce sagging between the first and second support arms 424, 480. The support member 487 can be provided with a tapered bottom surface to enable the support member 487 to be more easily guided onto the top of the bottom wall 424f when moving the tray assembly 420 into the folded position.

Figure 66:
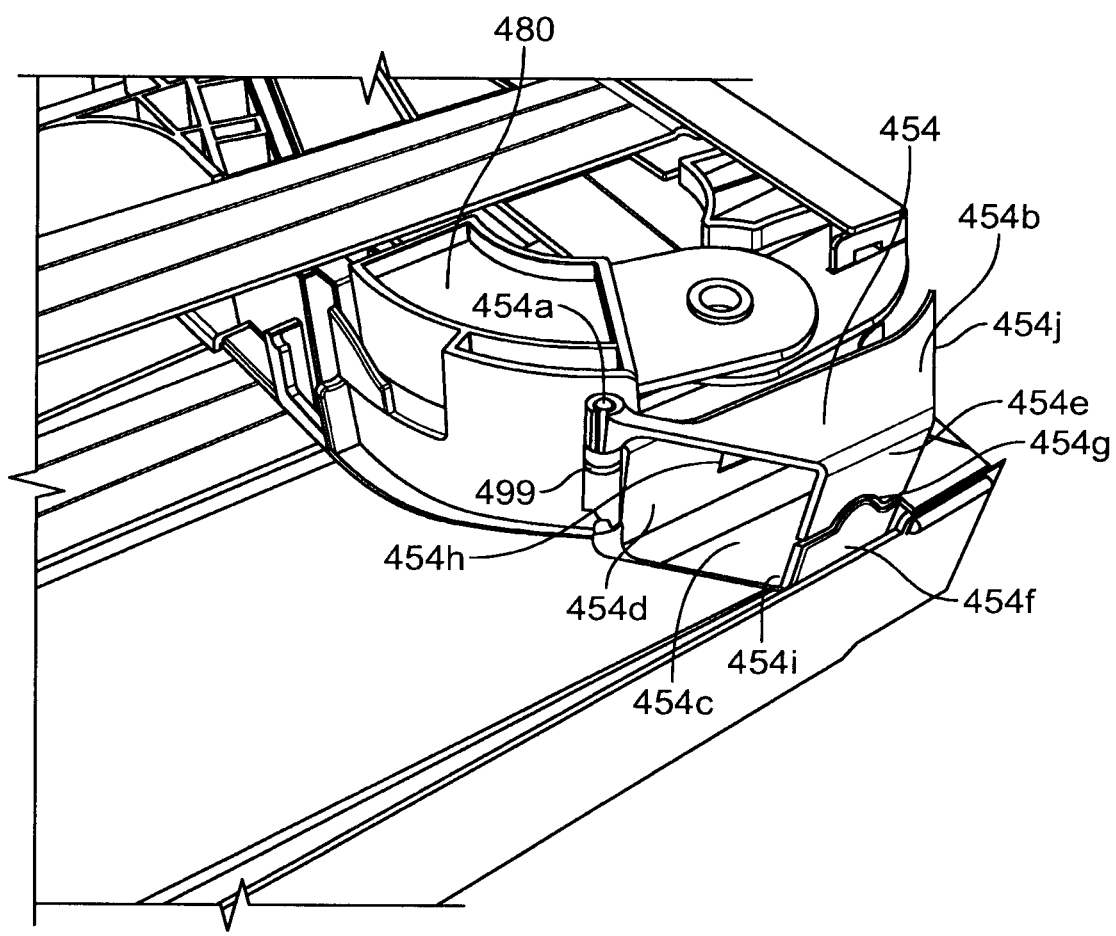
FIG. 66 is a perspective view of a pivotable cable management feature mounted to the tray assembly shown in FIG. 44, with the cable management feature rotated to a first position.
Figure 67:
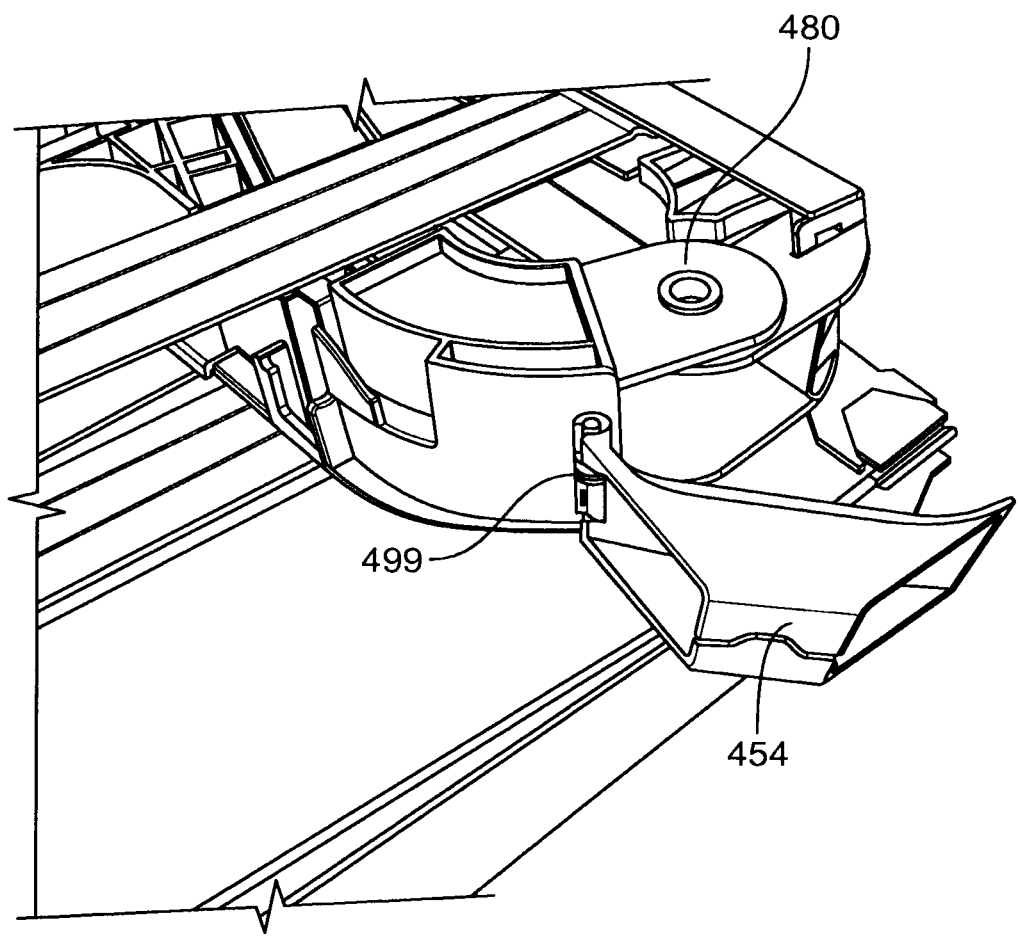
FIG. 67 is a perspective view of the pivotable cable management feature shown in FIG. 66, with the cable management feature rotated to a second position.

The second support arm 480 can also be provided with a mounting structure 499 to which a cable management part 454 can be rotatably attached. As shown, the mounting structure 499 is provided with a pair of pins 499a configured to be received in corresponding recesses 454a in the cable management part 454. It is noted that although the mounting structure 499 is shown as including pins 499a, such pins could be located on the cable management part 454 with corresponding recesses provided on the mounting structure 499. Other types of pivotable or hinged connections may also be utilized. The cable management part 454, which is shown at FIGS. 66 and 67, is also provided with a top wall 454b and a bottom wall 454c that extend from a back wall 454d. A downwardly depending front wall 454e is shown as extending from the top wall 454b and an upwardly depending front wall 454f is shown as extending from the bottom wall 454c such that a channel 454g is formed for allowing cables to be placed within an interior space 454h defined by the walls 454b, 454c, 454d, 454e, and 454f.

As configured, cables or patch cords 304 extend from the tray 422 into the interior space 454h via a first opening 454i and exit the interior space 454h via a second opening 454j. The back wall 454d acts as a bend radius limiter for the patch cords 304 which extend toward the cable management feature 44. As the tray 422 is being rotated between the access and folded positions, the cable management part 454 can automatically rotate about the mounting structure 499 between a first position (FIG. 66) and a second position (FIG. 67) to accommodate the resulting movement of the patch cords 304 such that bunching is minimized or prevented. To further accommodate cable movement, the back wall 454d may be made longer than the front walls 454e, 454g such that the first and second openings 454i, 454j are non-parallel (i.e. the cable management part 454 has a generally trapezoidal shape).

In one aspect, the top wall 482 and bottom wall 484 of the second support arm 480 are each respectively provided with a plurality of attachment features 482a, 484a, such as notches or detents designed to retain corresponding attachment features on the bend radius limiter 460. As shown, three attachment features 482a are shown on the top wall 482 while three attachment features 484a are shown on the bottom wall 484. However, more or fewer attachment features 482a, 484a may be utilized. It is also possible for the number of attachment features 482a to be different from the number of attachment features 484a. It is noted that although the tray 422 is shown as including notches, such notches or other attachment features configurations, could be provided on the bend radius limiter 460 with corresponding latch or attachment features being provided on the top and bottom walls 482, 484. Additionally, attachment features may be provided on only one of the top and bottom walls 482, 484 as well in some applications. In the particular embodiment shown, the middle attachment features 482a, 484a do not receive a latch connection and instead are used for guiding and alignment purposes.

Figure 20:
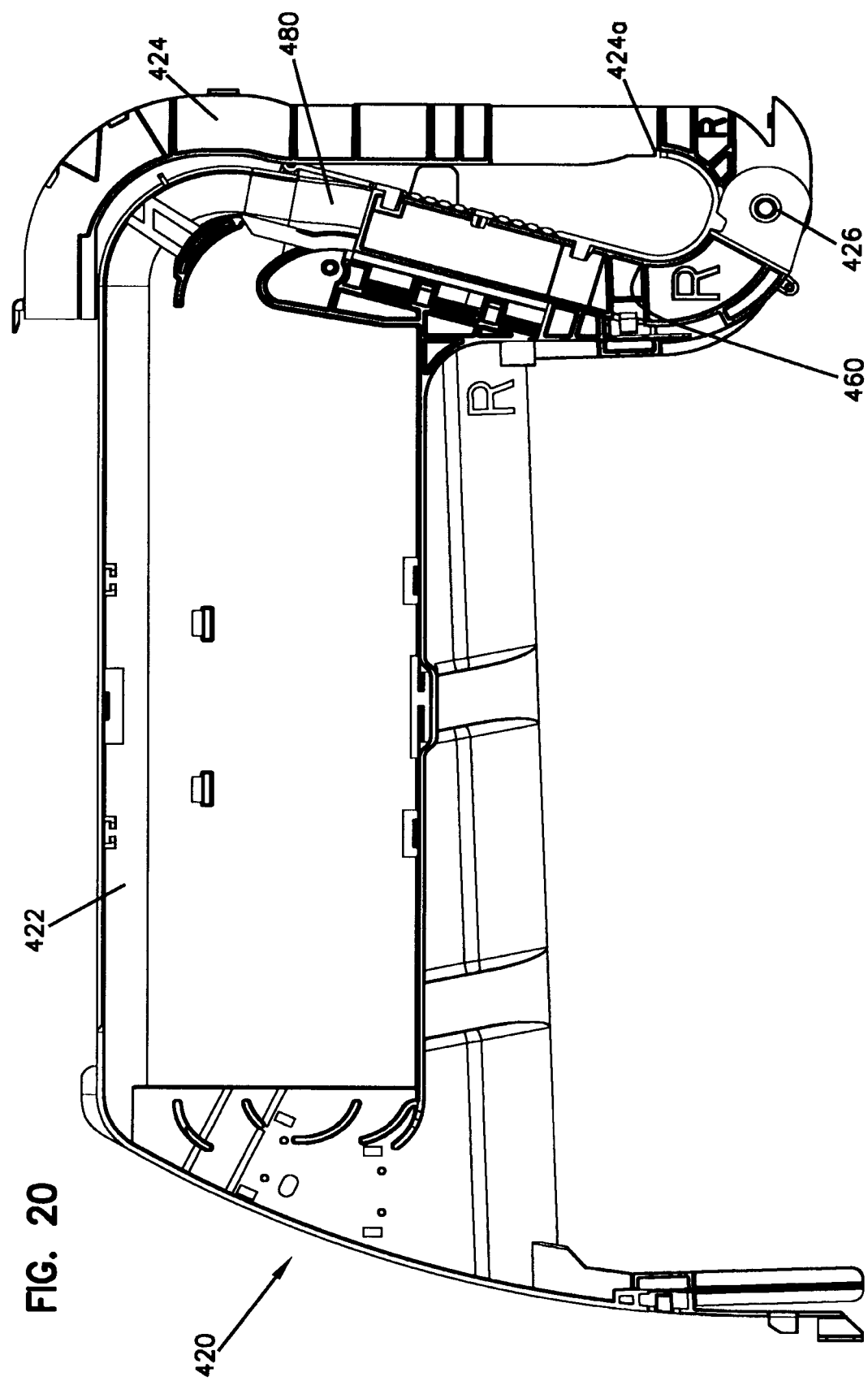
FIG. 20 is a top view of a second embodiment of a multi-positionable tray assembly usable in the system of FIG. 1.
Figure 21:
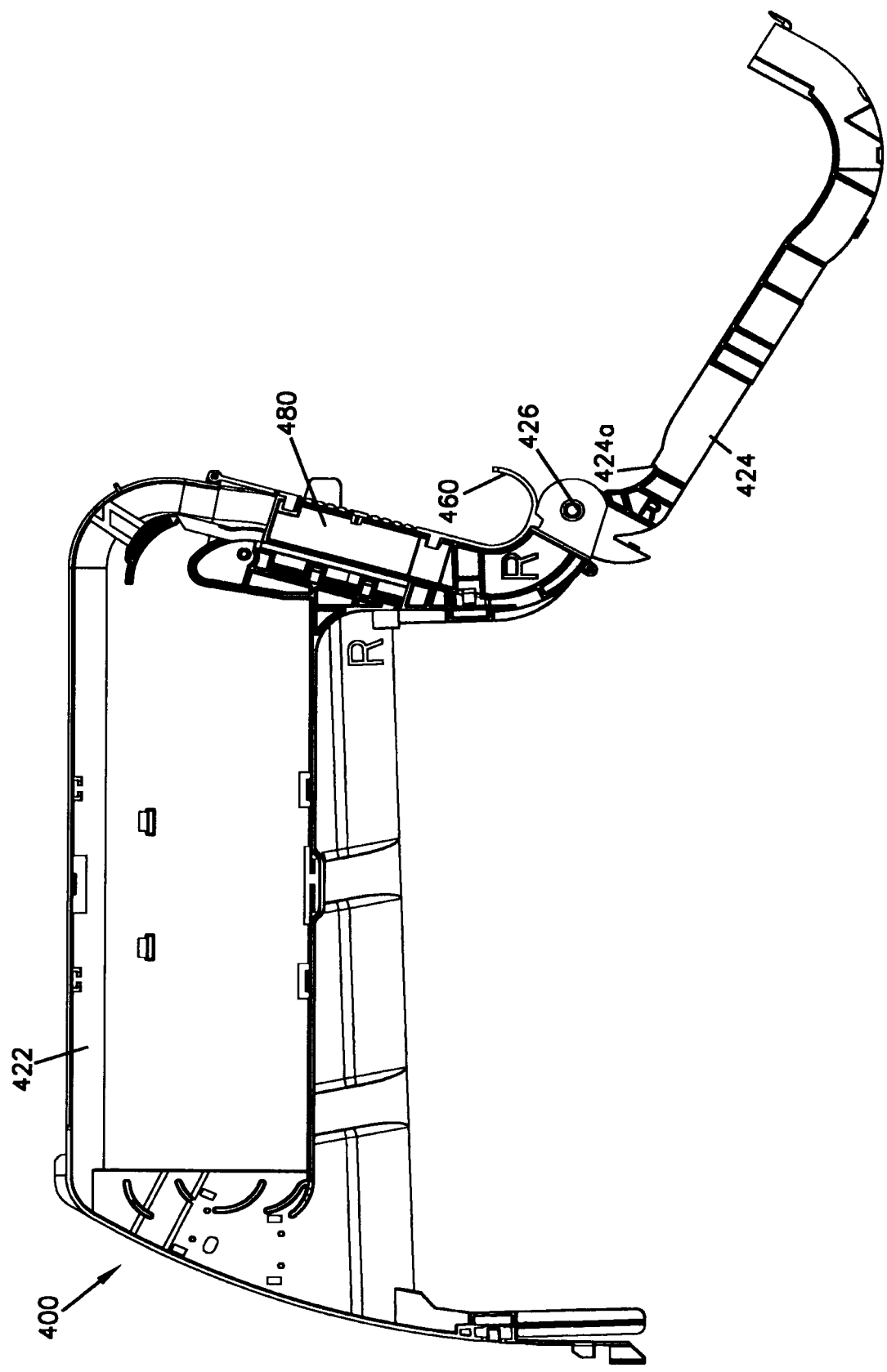
FIG. 21 is a top view of the tray assembly shown in FIG. 20, in the access position.
Figure 22:
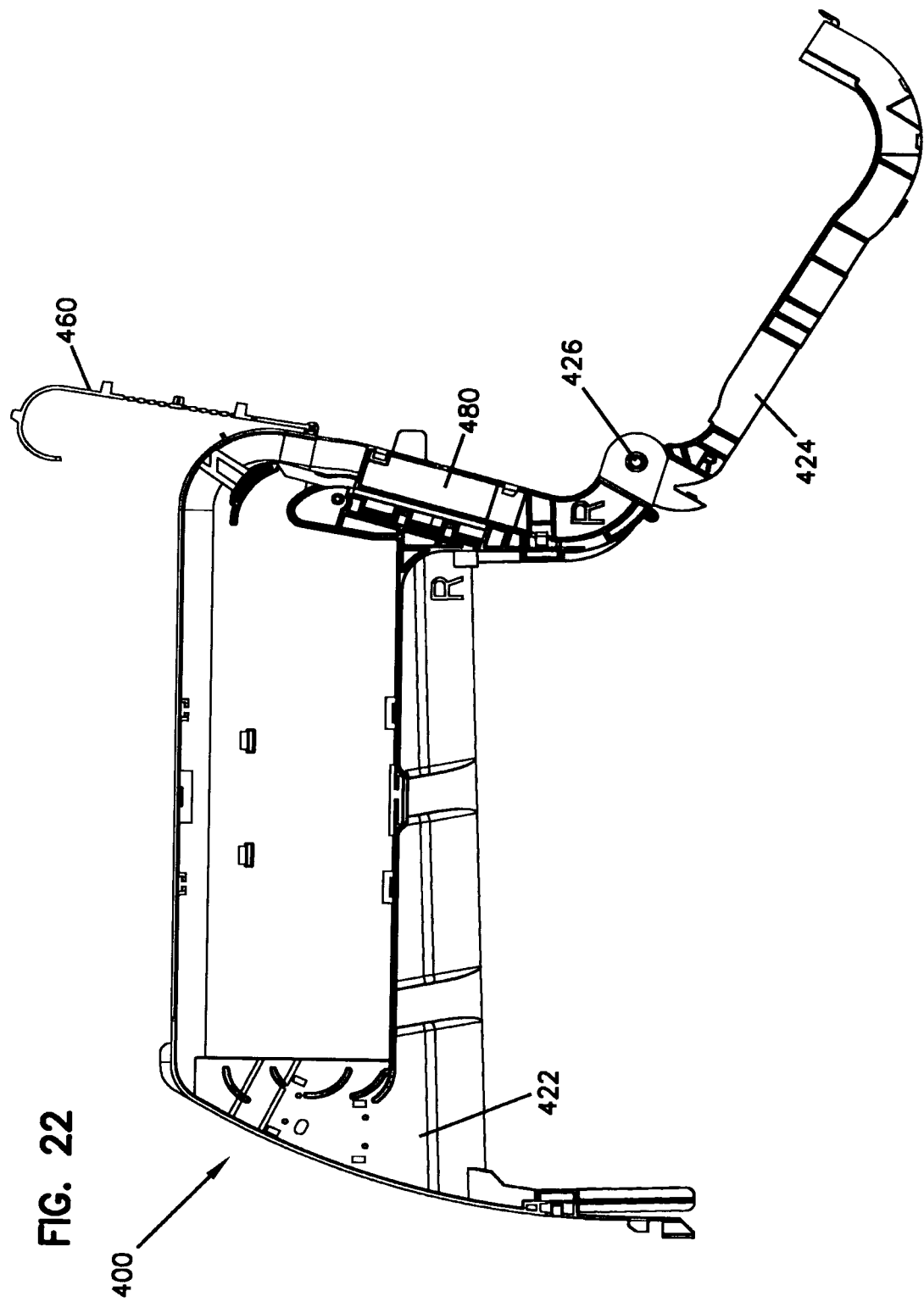
FIG. 22 is a top view of the tray assembly shown in FIG. 20, in the access position with a bend radius limiter in an open position.
Figure 23:
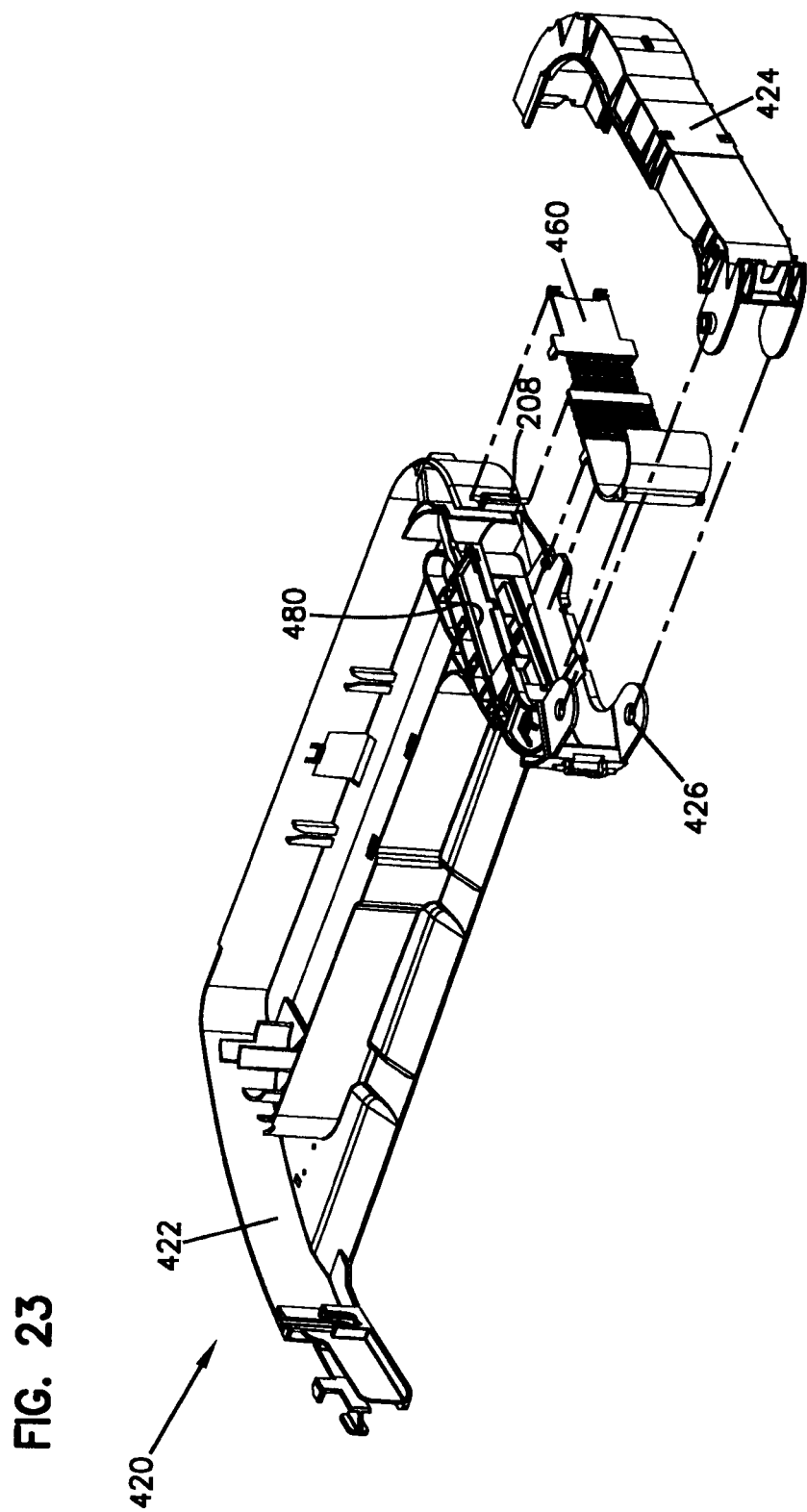
FIG. 23 is an exploded perspective view of the tray assembly shown in FIG. 20.
Figure 24:
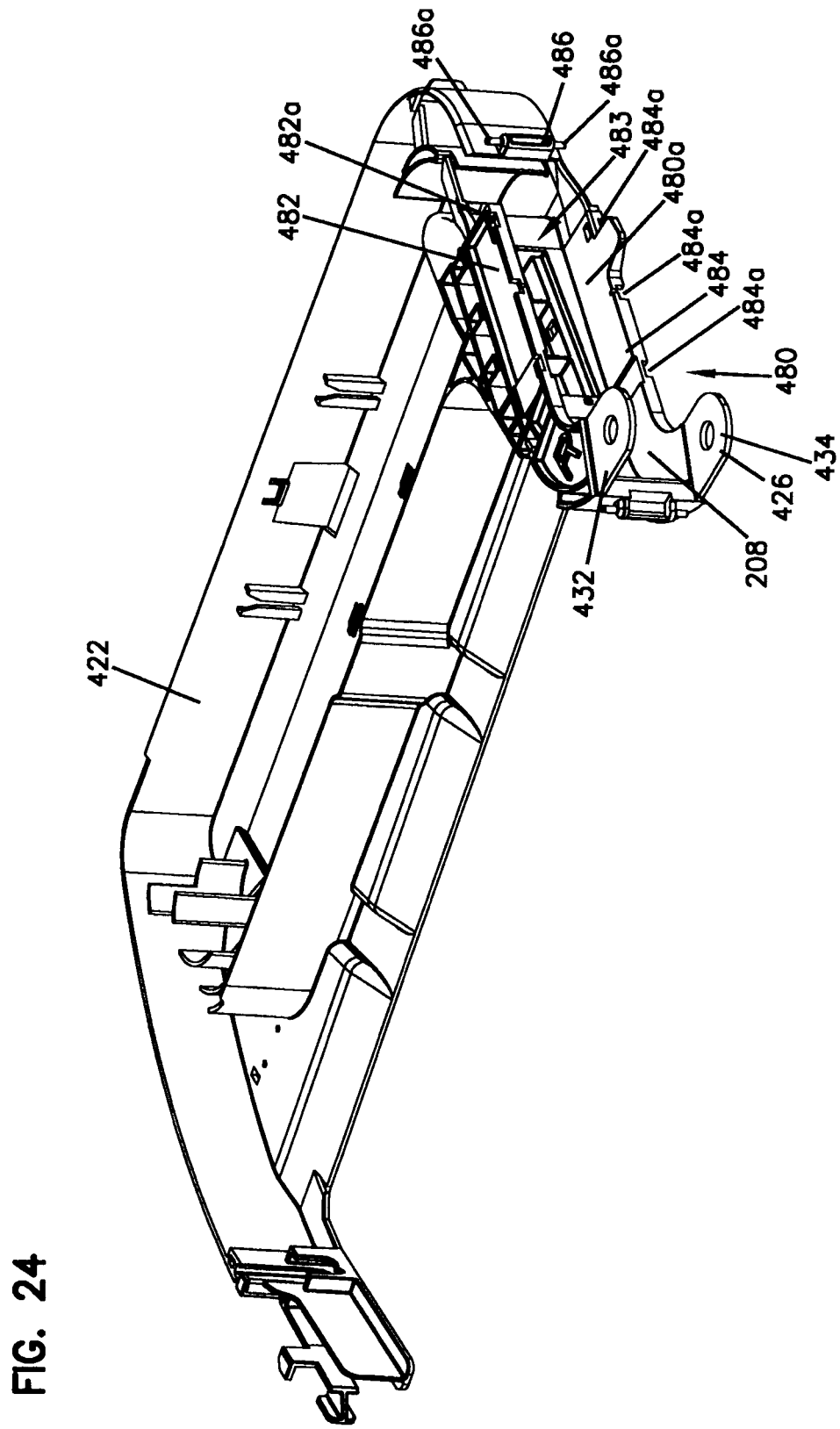
FIG. 24 is a perspective view of the tray of the tray assembly shown in FIG. 20, with the bend radius limiter and support arm removed.
Figure 25:
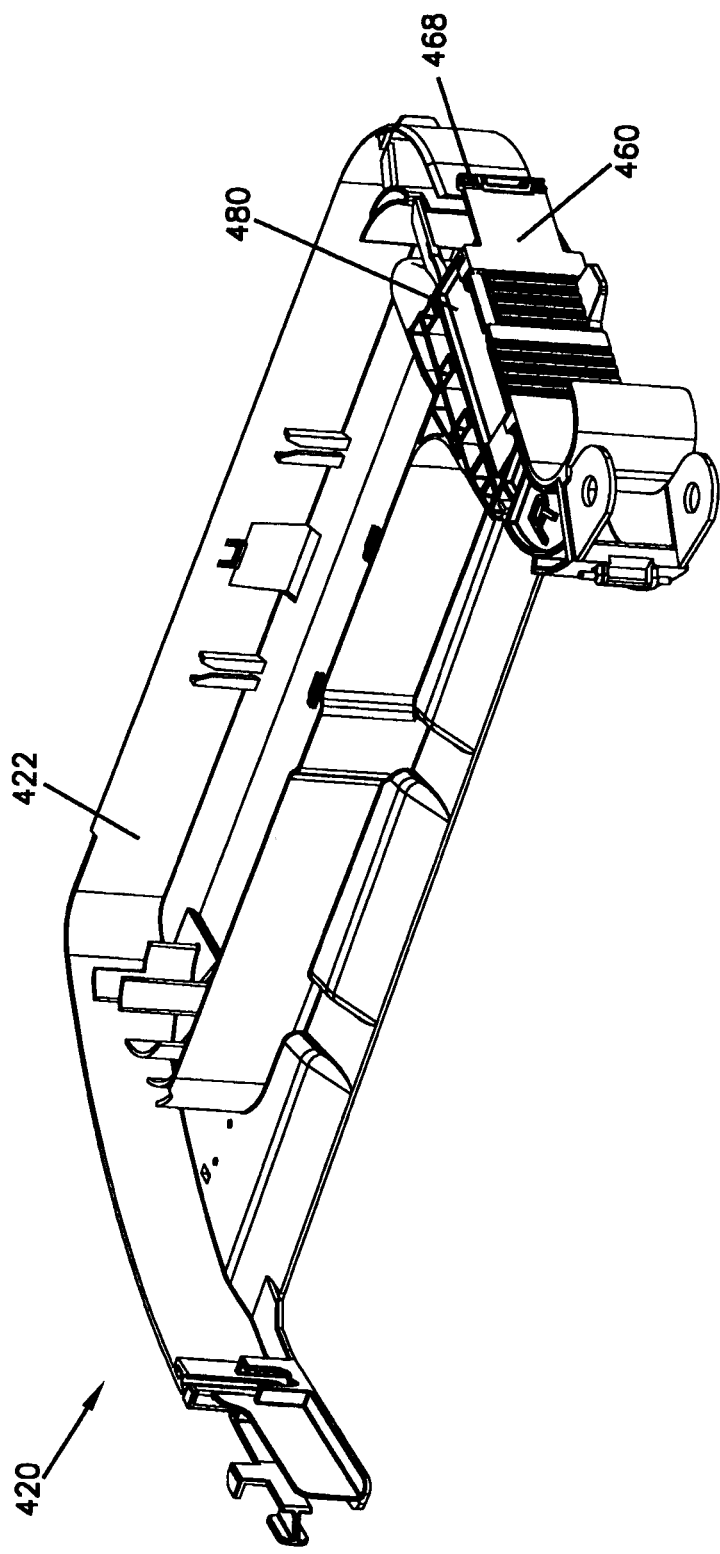
FIG. 25 is a perspective view of the tray of the tray assembly shown in FIG. 20, with the support arm removed.
Figure 26:
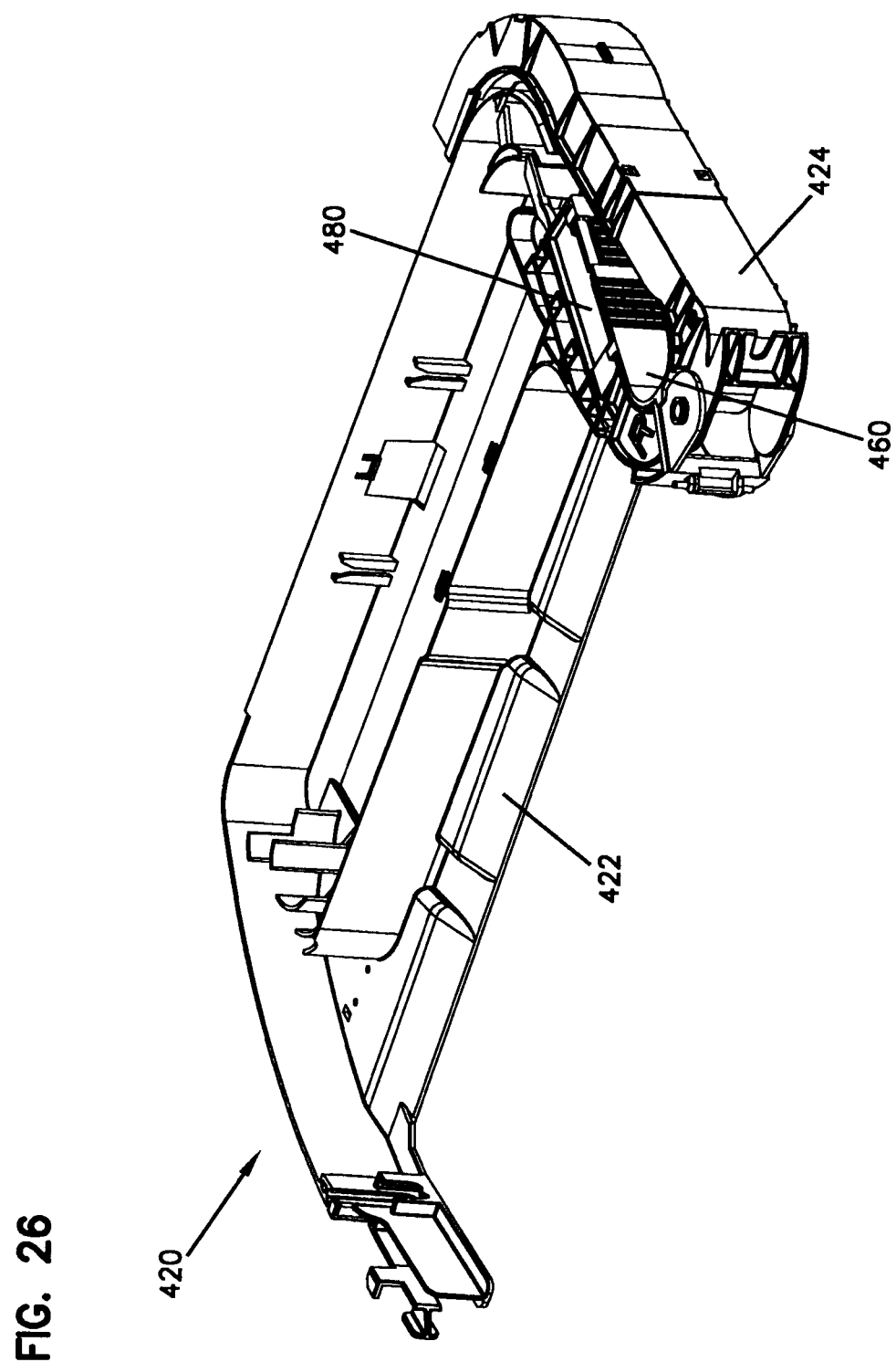
FIG. 26 is a perspective view of the tray assembly shown in FIG. 20, in the folded position.
Figure 27:
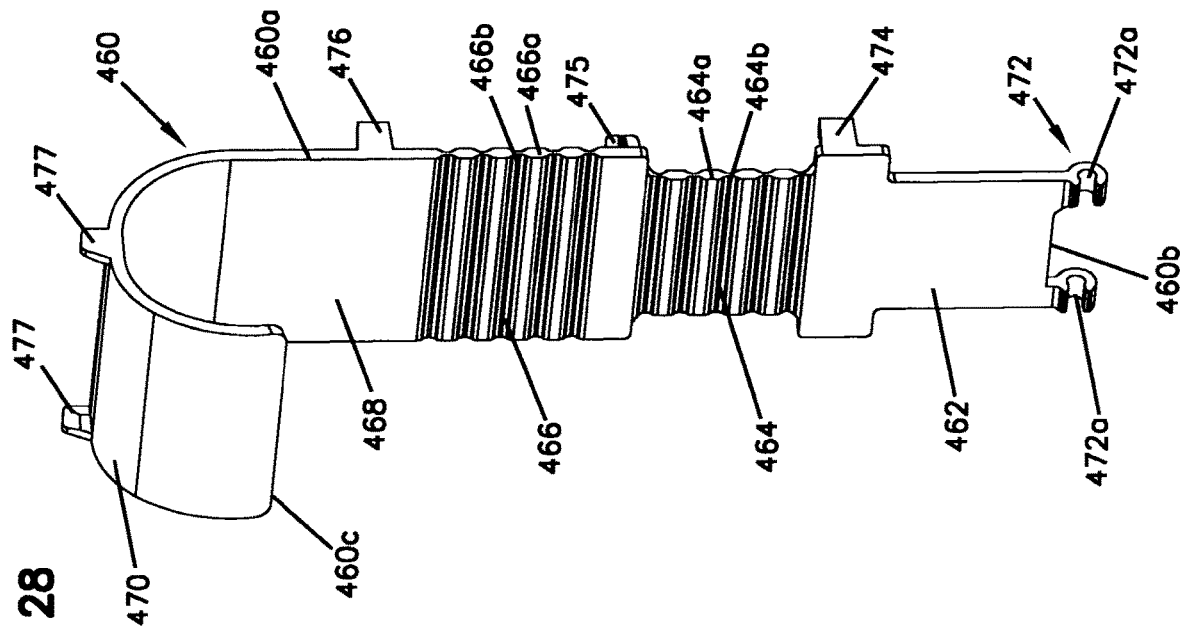
FIG. 27, is a rear perspective view of the bend radius limiter of the tray assembly shown in FIG. 20.
Figure 28:
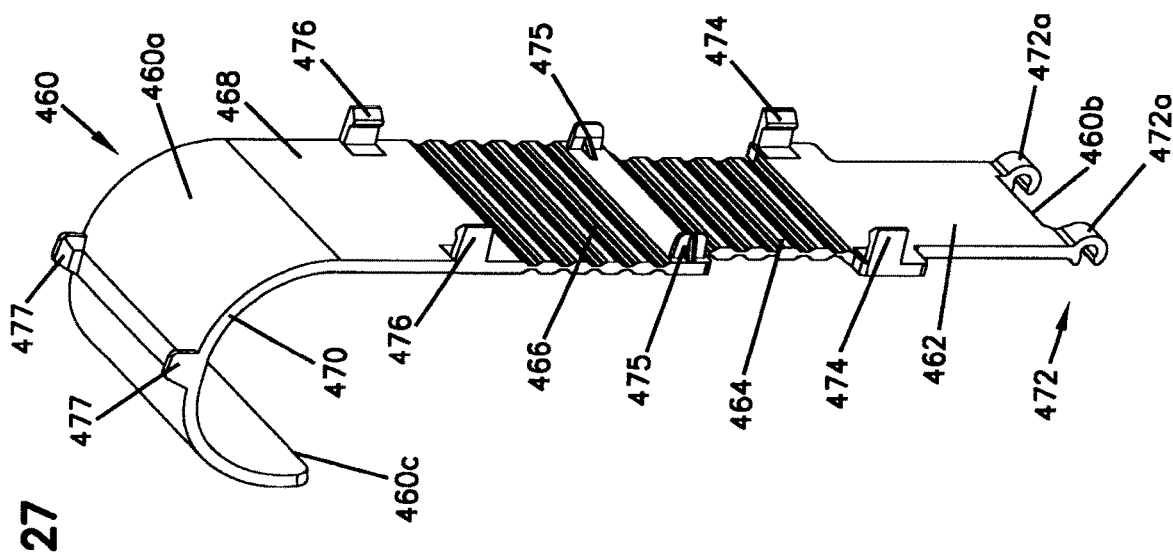
FIG. 28 is a front perspective view of the bend radius limiter shown in FIG. 27.
Figure 29:
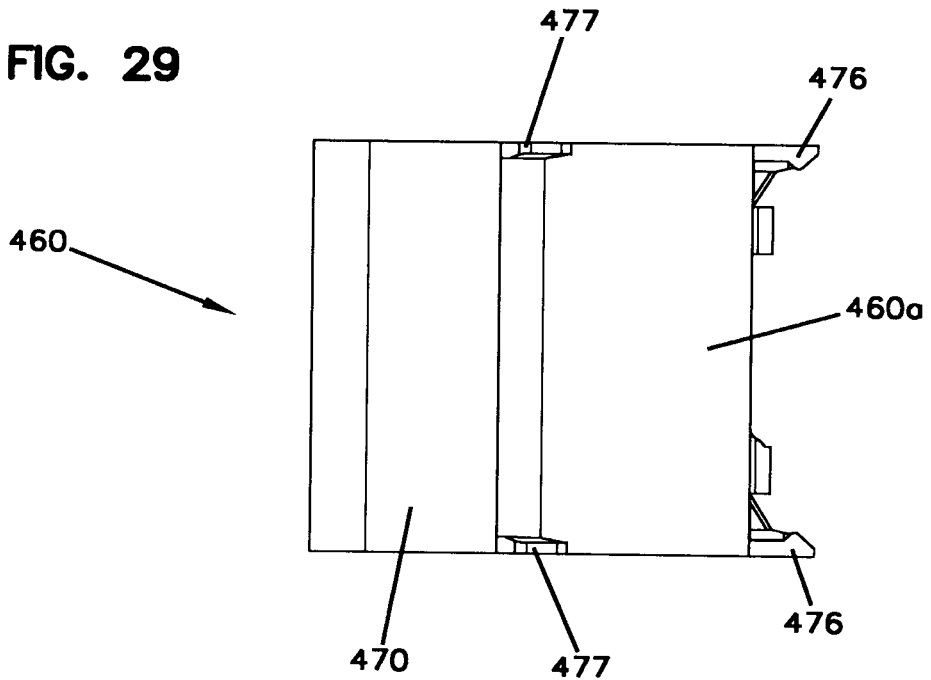
FIG. 29 is a first end view of the bend radius limiter shown in FIG. 27.
Figure 30:
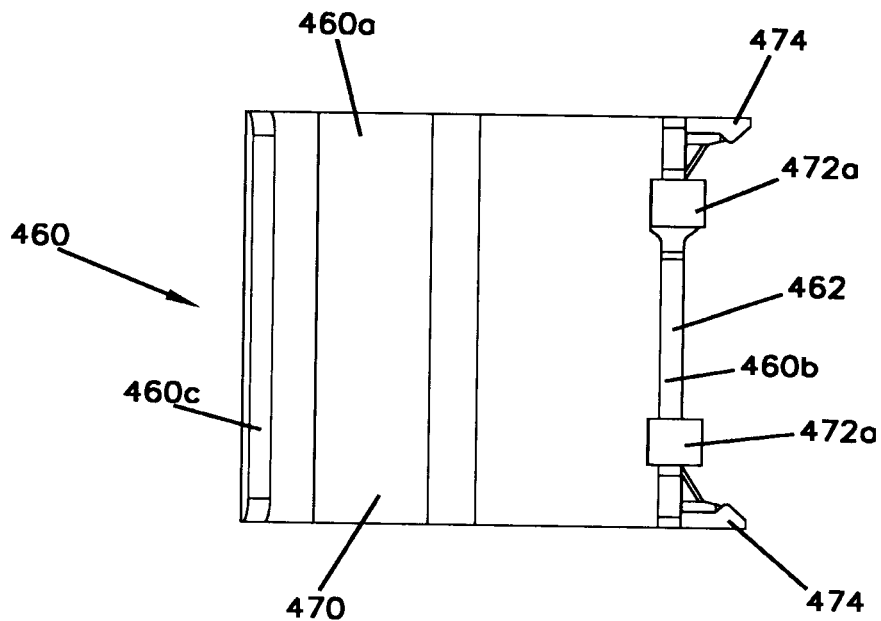
FIG. 30 is a second end view of the bend radius limiter shown in FIG. 27.
Figure 34:
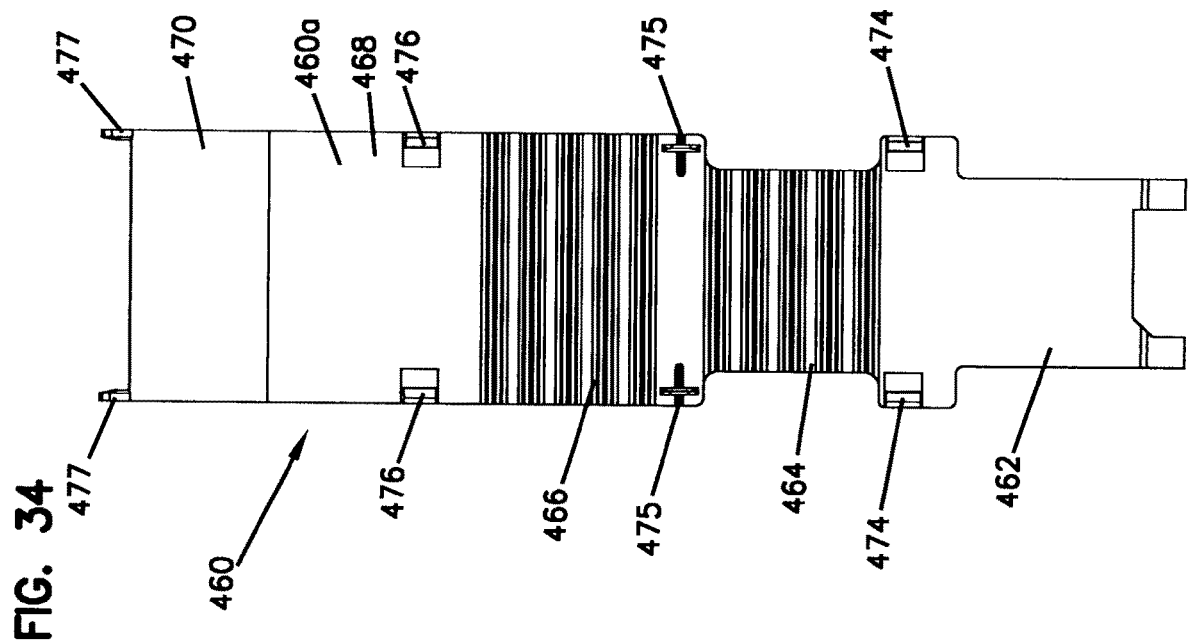
FIG. 34 is a rear view of the bend radius limiter shown in FIG. 27.
Figure 33:
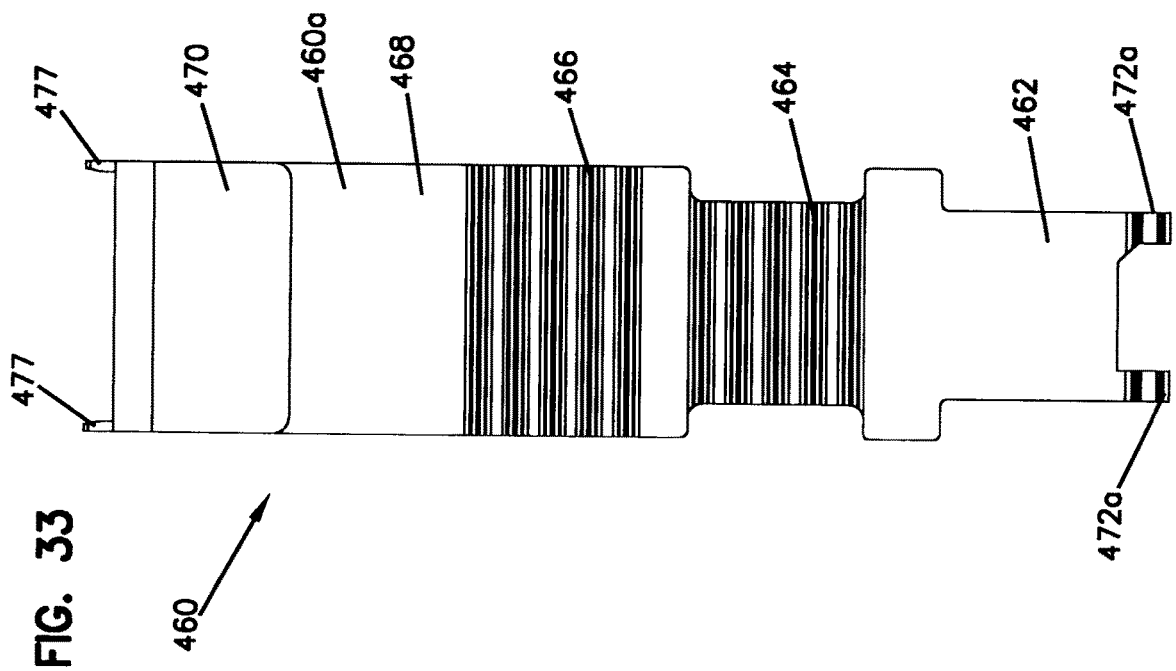
FIG. 33 is a front view of the bend radius limiter shown in FIG. 27.

In one aspect, the bend radius limiter ensures that the minimum radius to which the cables 300 may be safely bent during installation and use is not exceeded. To accommodate the bend radius limiter 460 in this embodiment, the second support arm 424 has a modified structure in comparison to the sidewall 22c and 22e of the tray 22. For example, the second support arm is configured such that the bend radius limiter 460 can be rotatably mounted to the tray and such that the bend radius limiter 460 can be secured to the wall structure 480 via a snap-fit connection to the wall structure 480. In contrast to the top loading design of tray 20, cables 300 are installed within the wall structure 480 from an open side 480a that is closed off by the limiter 460. This closed position is shown at FIGS. 20, 21, and 25. With this configuration, the bend radius limiter 460 can be rotated away from the cable pathway 208 for easier routing of the cables 300 and can then be secured to the wall structure 480 to retain the cables 300 within the cable pathway 208. This open position is shown at FIG. 21.

The bend radius limiter 460, in the secured position, provides a smooth transition between the tray 422 and the support arm 424 across the location of the pivot hinge 426. The support arm 424 is provided with a rib, notch, or alignment feature 424a for positively locating an end 460c of bend radius limiter 460 to ensure that the transition between the interior channel defined by the support arm 424 and the bend radius limiter 460 is smooth. As such, the limiter 460 beneficially prevents the cables 300 from being stretched or sharply bent into straight segments extending between a portion of the support arm 424 and a portion of the tray 422.

The tray 420 is further provided with a mounting structure 486 to which the bend radius limiter 460 can be rotatably attached. As shown, the mounting structure 486 is provided with a pair of pins 486a configured to be received in corresponding recesses in the bend radius limiter 460. It is noted that although the mounting structure 486 is shown as including pins 486a, such pins could be located on the bend radius limiter 460 with corresponding recesses provided on the mounting structure 486. Other types of pivotable or hinged connections may also be utilized.

To retain the cables 300 within the channel defined by the walls 482, 483, 484 a pivotable or attachable retainer element 488 may be utilized which extends between walls 482 and 484. In an open position, the element 488 is rotated away from the open face 480b such that cables can be placed in the channel. In the closed position, the element 488 is rotated within the channel such that the open face 480b is at least partially blocked. The element 488 allows for the bend radius limiter 460 to be moved to the closed position without having to provide the necessary force or cable management features to retain the cables 300 within the channel. Similarly, the cables 300 can be retained within the channel when the limiter 460 is in the open position. The second support arm 480 may also be provided with an extension member 485 which bridges from the top wall to the radius limiting feature 422f nearest the read wall 422a of the tray 422 to further guide the cables 300 into the channel 480a.

As most easily viewed at FIGS. 27-34, the pivotable bend radius limiter 460 is shown in greater detail. As shown, the bend radius limiter 460 includes a main body 460a extending between a first end 460b and a second end 460c. The main body 460a is provide with a continuous, unitary construction defining a first segment 462, a second segment 464, a third segment 466, a fourth segment 468, and a fifth segment 470. It is noted that the main body 460a can be characterized as having fewer or more than five segments.

As shown, the first segment 462 defines the first end 460b and is provided with a mounting structure 472 having a pair of recesses 472a. The recesses 472a are configured to snap-fit onto the posts or pins 468a of the mounting structure 486. Once mounted, the bend radius limiter 460 can rotate with respect to the tray 422 about an axis A5 defined by the pins 468a. The first segment also includes a pair of attachment features 474 which are configured as latches that can snap-fit into the notches or attachment features 482a, 484a of the tray 422 most proximate to the mounting structure 486.

The second segment 464, which is located between the first segment 462 and the third segment 466, is configured to be relatively flexible about axes parallel to axis A5 to enable the bend radius limiter 460 to be bent away from the wall structure 480 even when the attachment features 474 proximate the mounting structure 486 are engaged with the corresponding attachment features 482a, 484a. This functionality can be most easily seen at FIG. 38. As shown, the second segment 464 is made flexible by providing a series of transversely extending ribs 464a that are interconnected by similarly extending sections 464b of material having a reduced thickness, in comparison to ribs 464a. This configuration allows for each section 464b to act as a living hinge, and in a larger sense, allows the entirety of the second segment 464 to act as a living hinge between the first and third segments 462, 466. The second segment 464 is also shown as being provided with alignment protrusions 474 which extend into the middle attachment features 482a, 484a. The protrusions 474 act to maintain the vertical position (i.e. position in a direction parallel to the A5 axis) of the bend radius limiter 460.

It is noted that the first and second segment 462, 464 have a height that is less than that of the height of the third, fourth, and fifth segments 466, 468, 470 and that is less than the distance between the top and bottom walls 482, 484. This reduced height can allow for the accommodation of various structural features or aspects of the tray 422 and wall structure 480 and/or make routing of the cables 300 less cumbersome.

As shown, the third segment 466 extends between the second and fourth segments 464, 468. Similar to the second segment 464, the third segment 464 is configured to be relatively flexible about axes parallel to axis A5 to enable the bend radius limiter 460 to be bent away from the wall structure 480 even when the attachment features 474 proximate the mounting structure 486 are engaged with the corresponding attachment features 482a, 484a. This functionality can be most easily seen at FIGS. 38 and 39, wherein it can be seen that both the second and third segments 464, 466 can be bent together in a generally continuous arc. As shown, the third segment 466 is made flexible by providing a series of transversely extending ribs 466a that are interconnected by similarly extending sections 466b of material having a reduced thickness, in comparison to ribs 466a. This configuration allows for each section 466b to act as a living hinge, and in a larger sense, allows the entirety of the third section 466 to act as a living hinge between the second and fourth segments 464, 468. Accordingly, the bend radius limiter 460 can be moved between the closed and open position with less overall clearance required in comparison to a similarly shaped element that is not flexible or cannot bend.

As shown, the fourth segment 468 extends between the third and fifth segments 466, 470 and is provided with a generally smooth surface. The fourth segment 468 is similar to the first segment 462 in that it is generally more rigid or stiffer than the second and third segments 464, 466. The fourth segment 468 also includes a pair of attachment features 476 which are configured as latches that can snap-fit into the notches or attachment features 482a, 484a of the tray 422 most proximate to the pivot joint 426.

The fifth segment 470 is the portion of the bend radius limiter 460 that performs the primary bend radius limiting functions and extends between the fourth segment 468 and the second end 460c. The first through fourth segments 462 to 468 more primarily function to close off the open face 480b of the wall structure 480 to retain cables 300 within the channel defined by the wall structure 480. As shown, the fifth segment 470 is provided with a curved or arc-shaped profile that defines a minimum bend radius for cables extending between the support arm 424 and the tray 422. As stated previously, the second end 460c terminates the fifth segment 470 and locks into the rib 424a of the support arm 424 when the tray 422 is rotated into the folded position to ensure a smooth transition between the support arm 424 and the fifth segment 470. The fifth segment 470 is also shown as being provided with alignment protrusions 477 which extend over the upper and lower joint extensions 432, 434 of the tray 422. The protrusions 477 act to maintain the vertical position (i.e. position in a direction parallel to the A5 axis) of the fifth segment 470 of the bend radius limiter 460 with respect to the tray 422.

Figure 35:
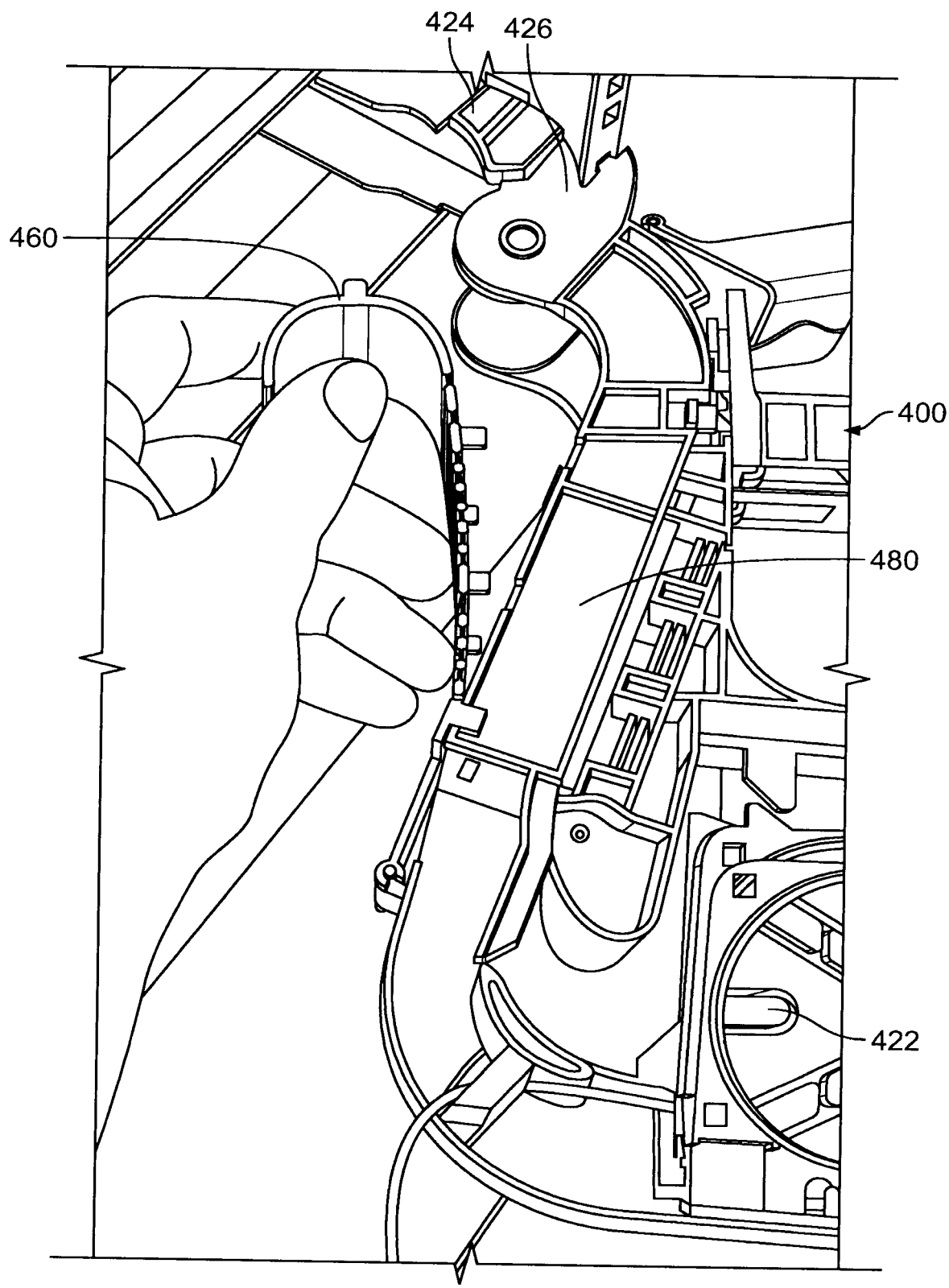
FIGS. 35-37 show the bend radius limiter shown in FIG. 27 being sequentially moved towards the open position from the closed position.

Referring to FIGS. 35 to 40, the functionality of the bend radius limiter 460 is further illustrated. As shown in FIG. 35, the tray 422 has been rotated to the access position and the bend radius limiter 460 has been partially moved from the secured position towards the open position. At this point, the latches 476 have been disengaged from their corresponding notches 482a, 484a while the latches 474 remain engaged with their corresponding notches 482a, 484a. As can be seen, the fifth segment 470 is able to be pulled away from the wall structure 480 and pivot joint 426 by the flexibility of the second segment 464, and to a lesser extent the flexibility of the third segment 466.

Figure 36:
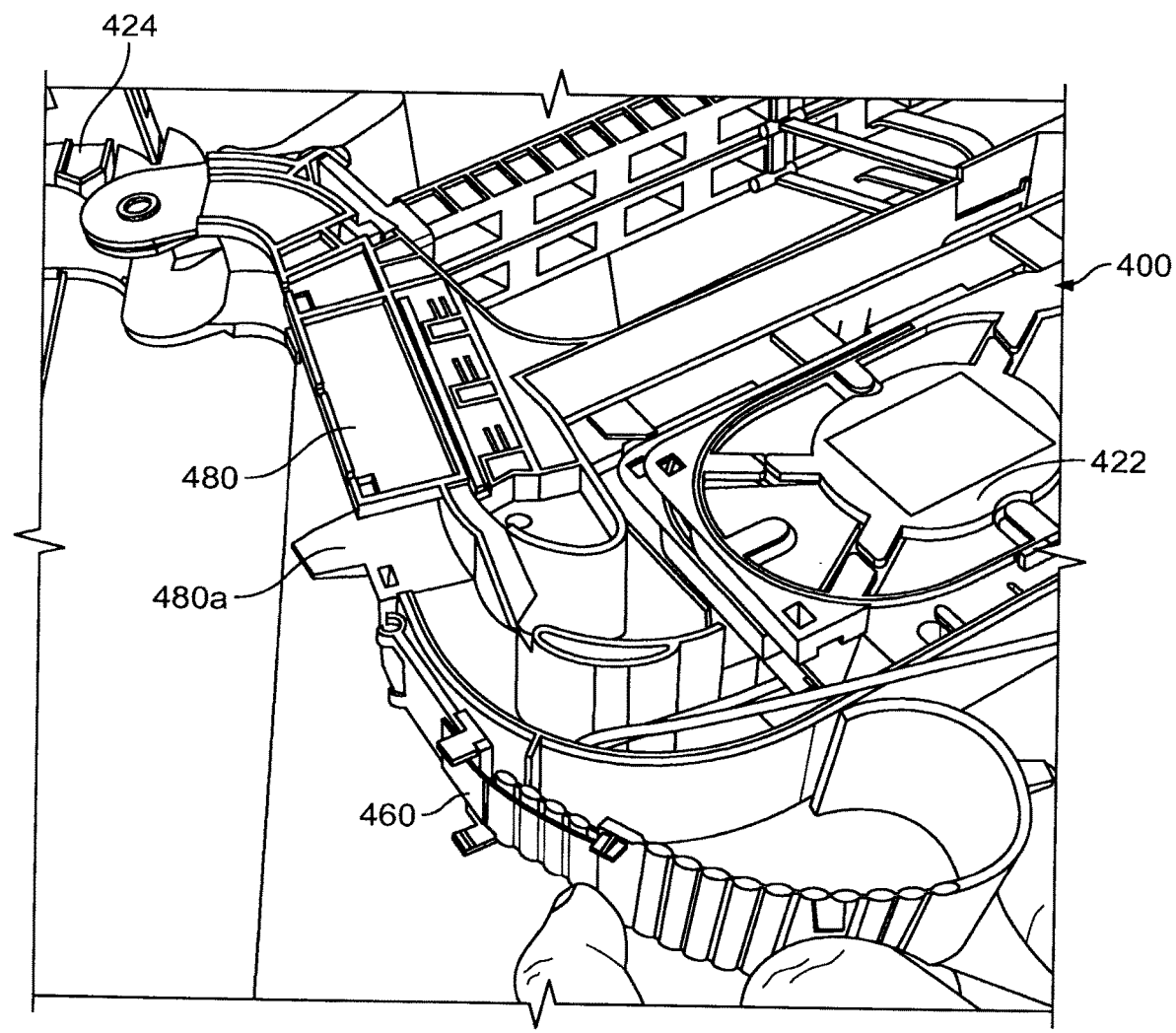
Figure 37:
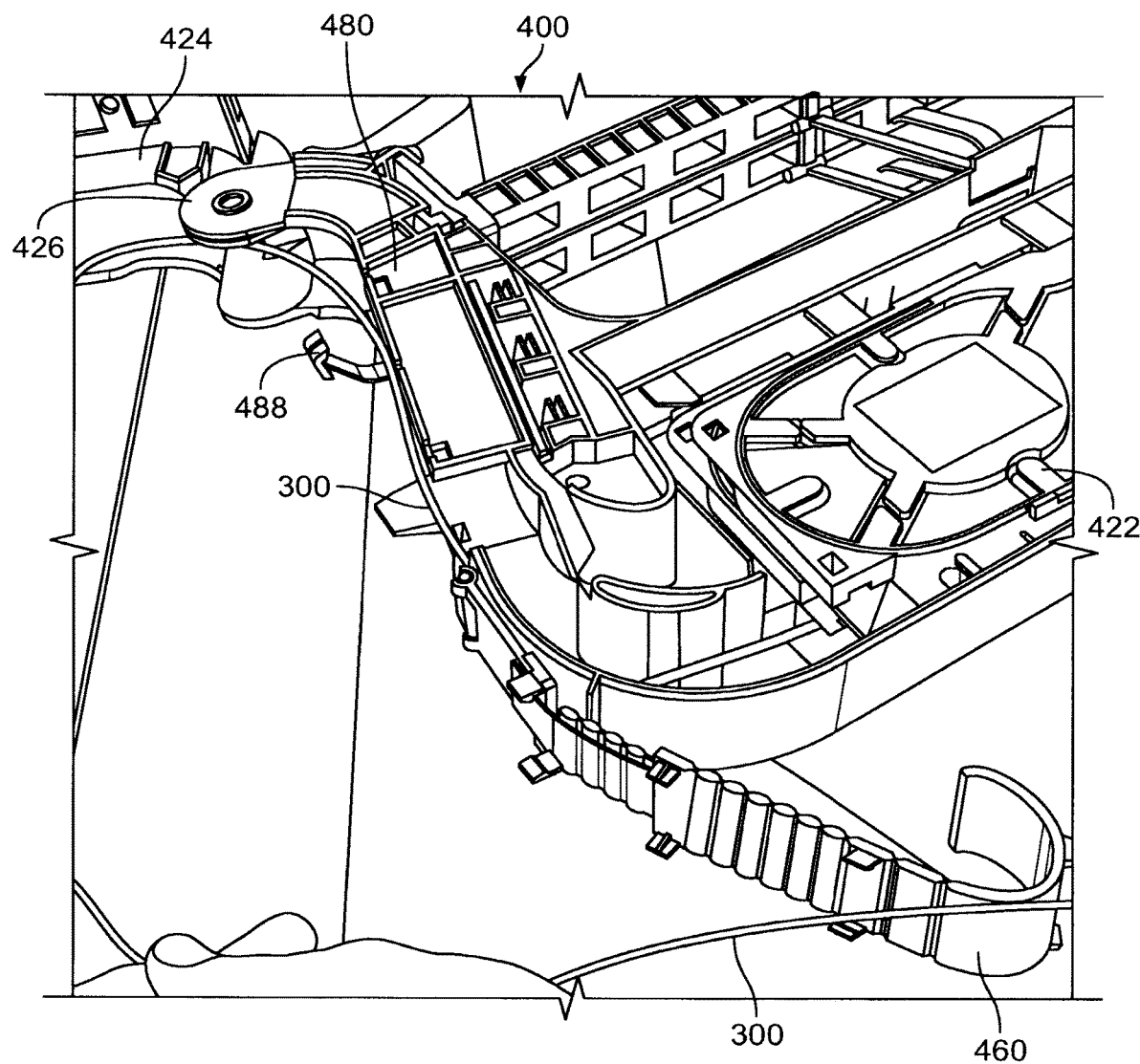
Figure 38:
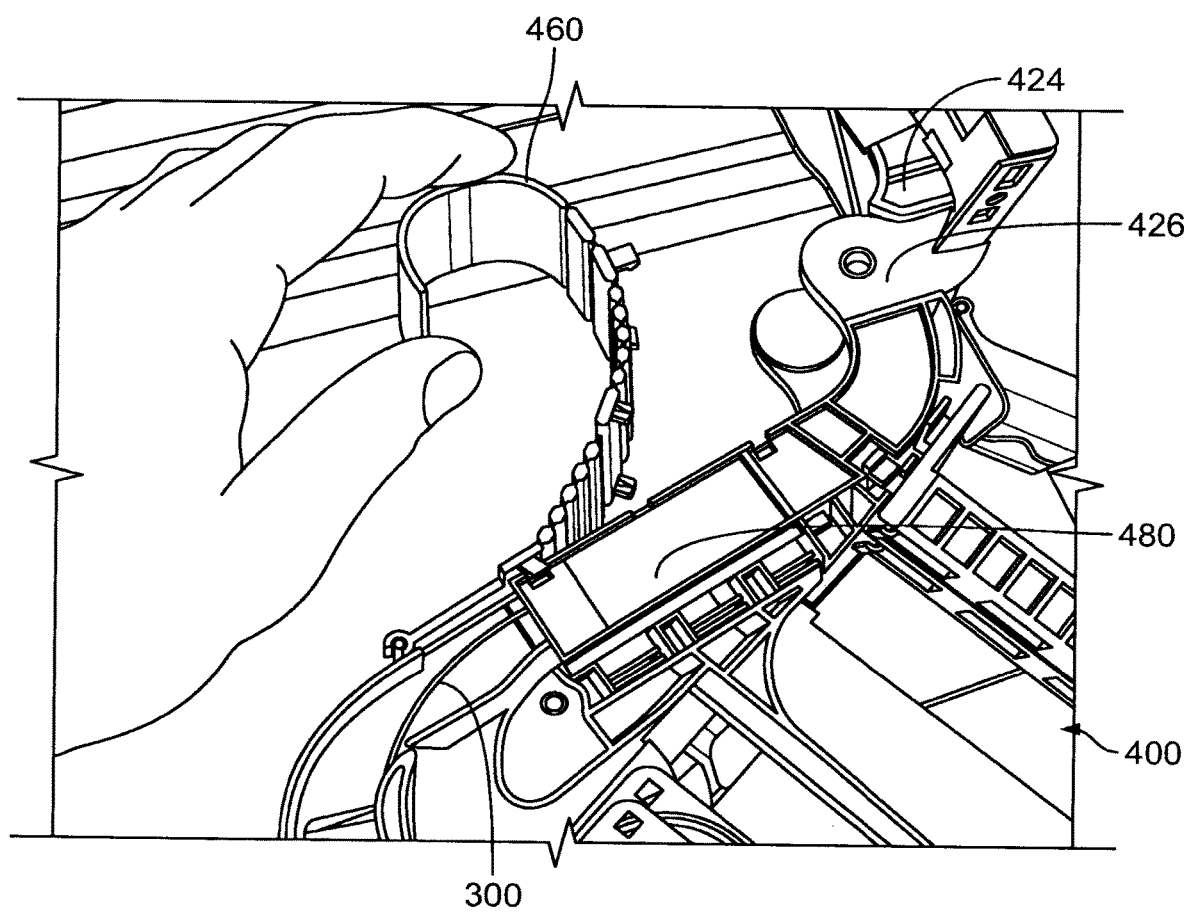
FIGS. 38-41 show the bend radius limiter shown in FIG. 27 being sequentially moved towards the closed position from the open position.
Figure 39:
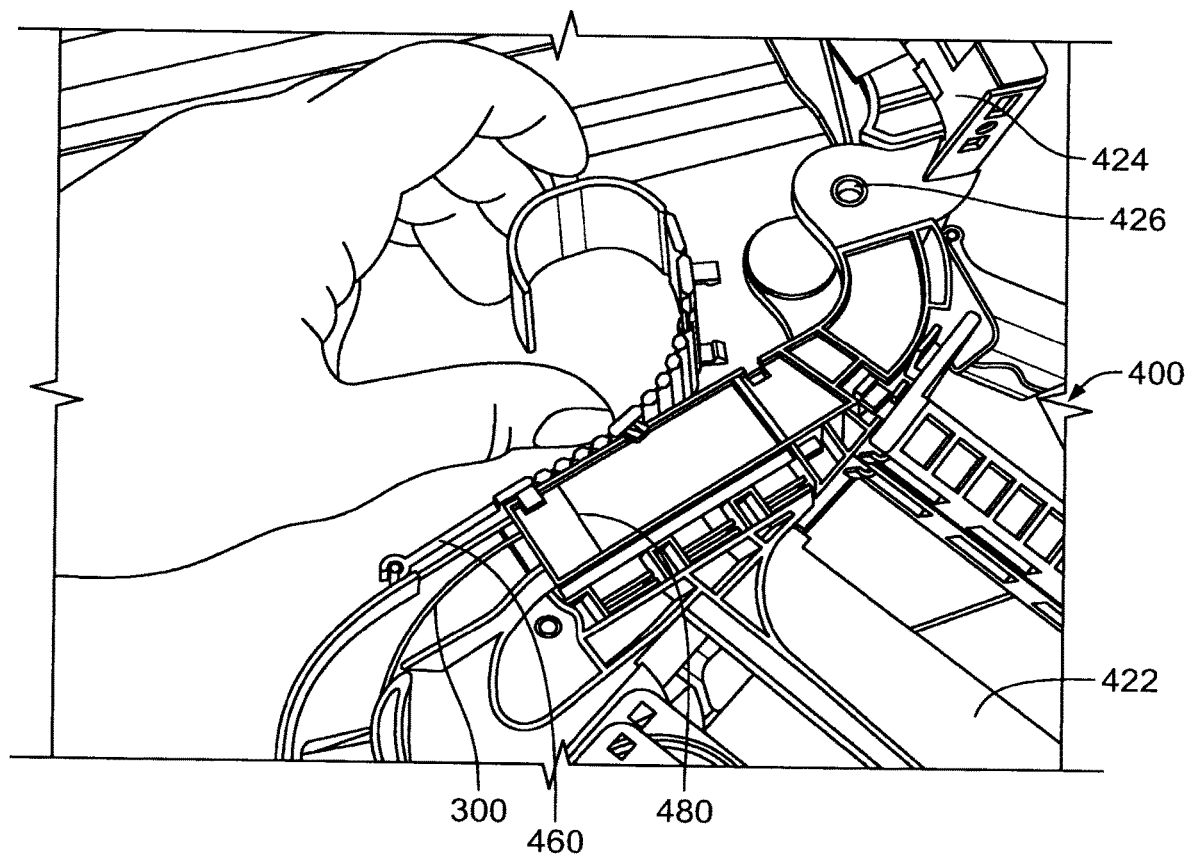
Figure 40:
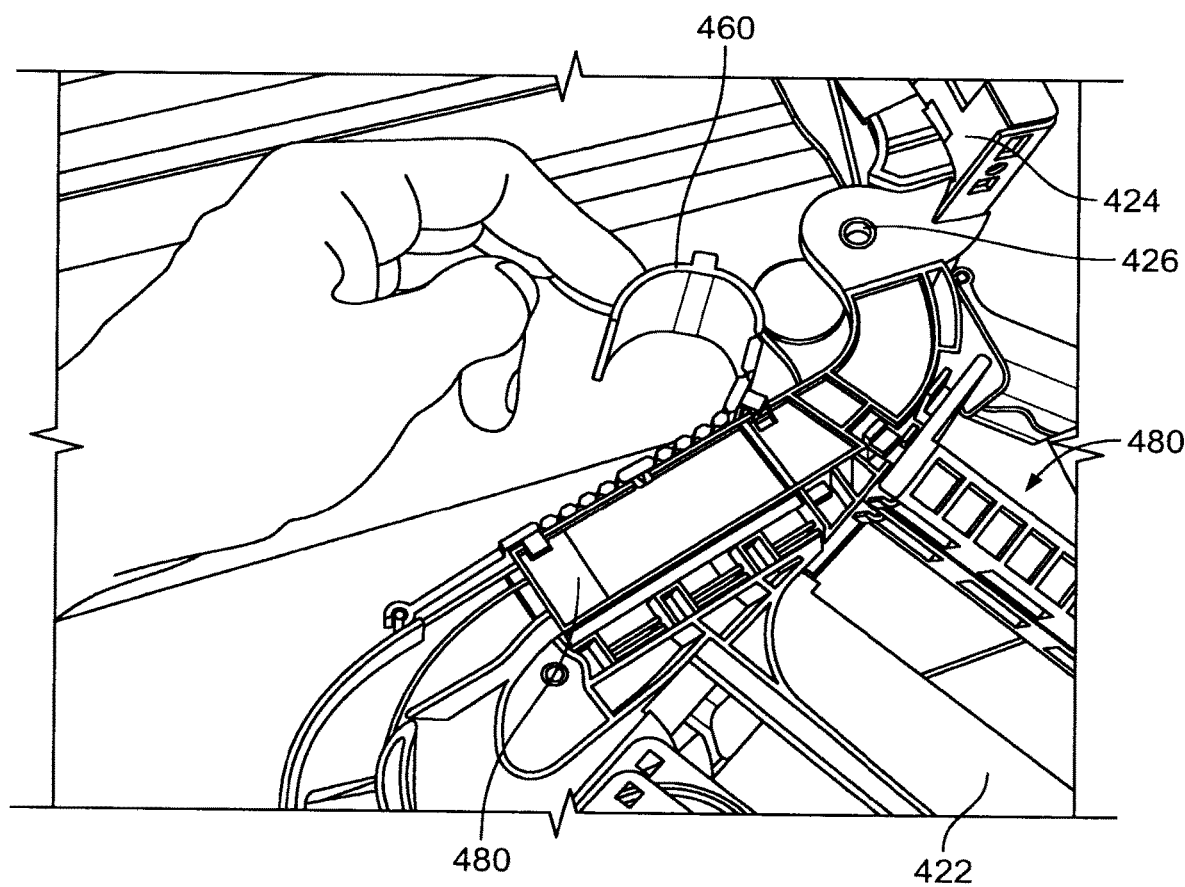
Figure 41:
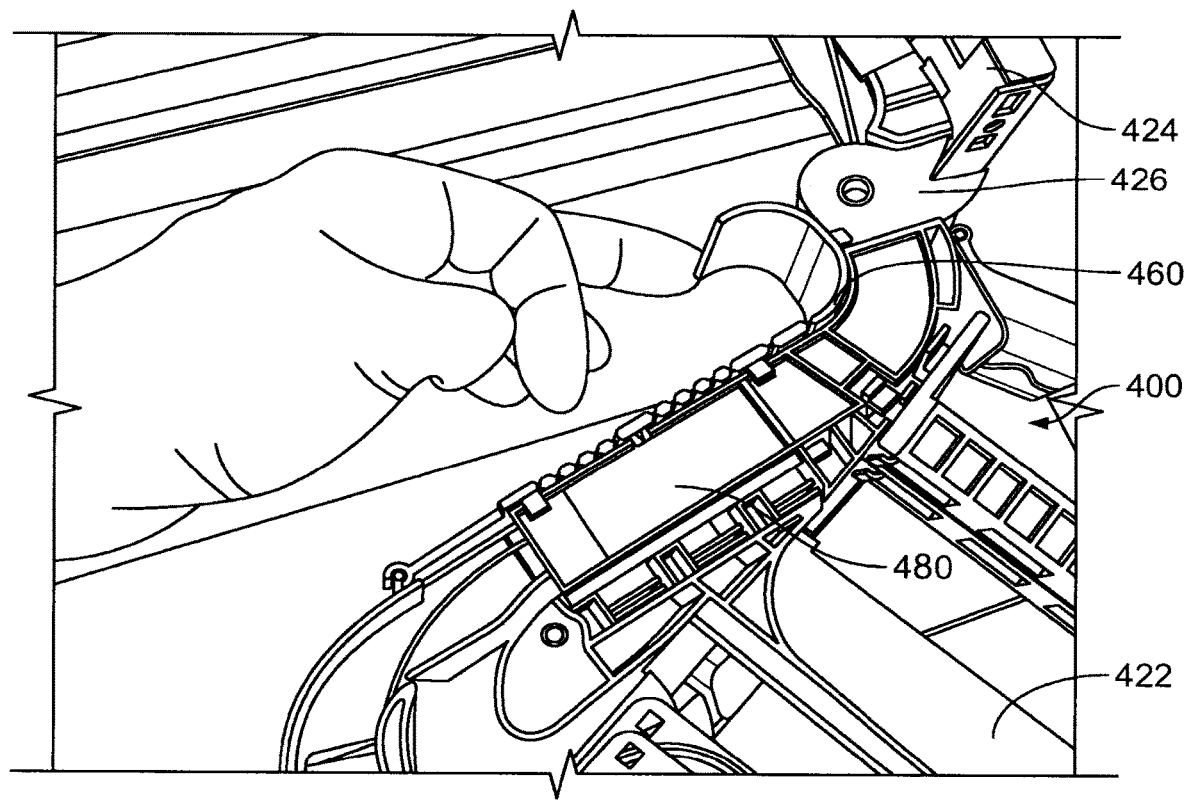

As shown at FIG. 36, the latches 474 have been disengaged and the bend radius limiter 460 has been rotated fully to the open position and away from the open face 480b of the wall structure 480. FIG. 37 shows how a patch cord or cable 300 can now be routed into the interior channel defined by the wall structure 480 through the now unblocked open face 480b. FIGS. 38 to 41 show the reverse process of moving the bend radius limiter 460 back into the closed position after the desired number of patch cords or cables 300 have been routed, which is essentially the reverse of the process shown in FIGS. 35-37.

Figure 42:
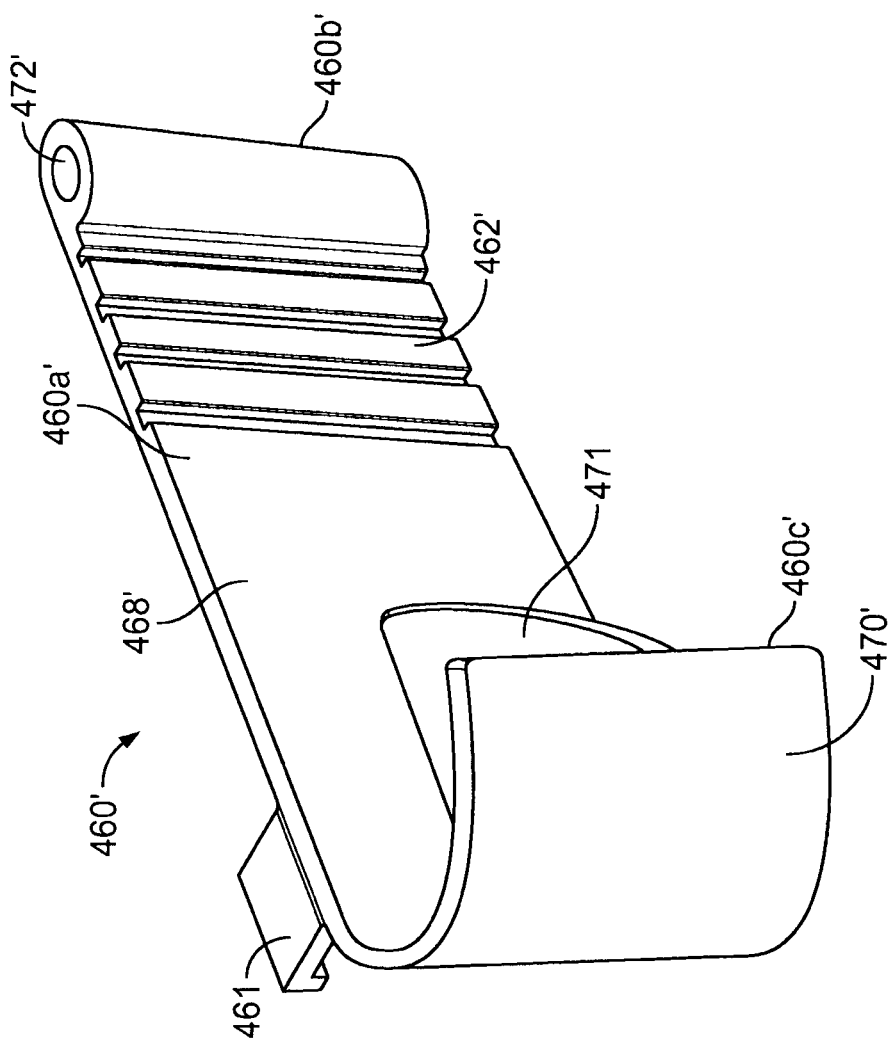
FIG. 42 is a perspective view of a second embodiment of a bend radius limiter.
Figure 43:
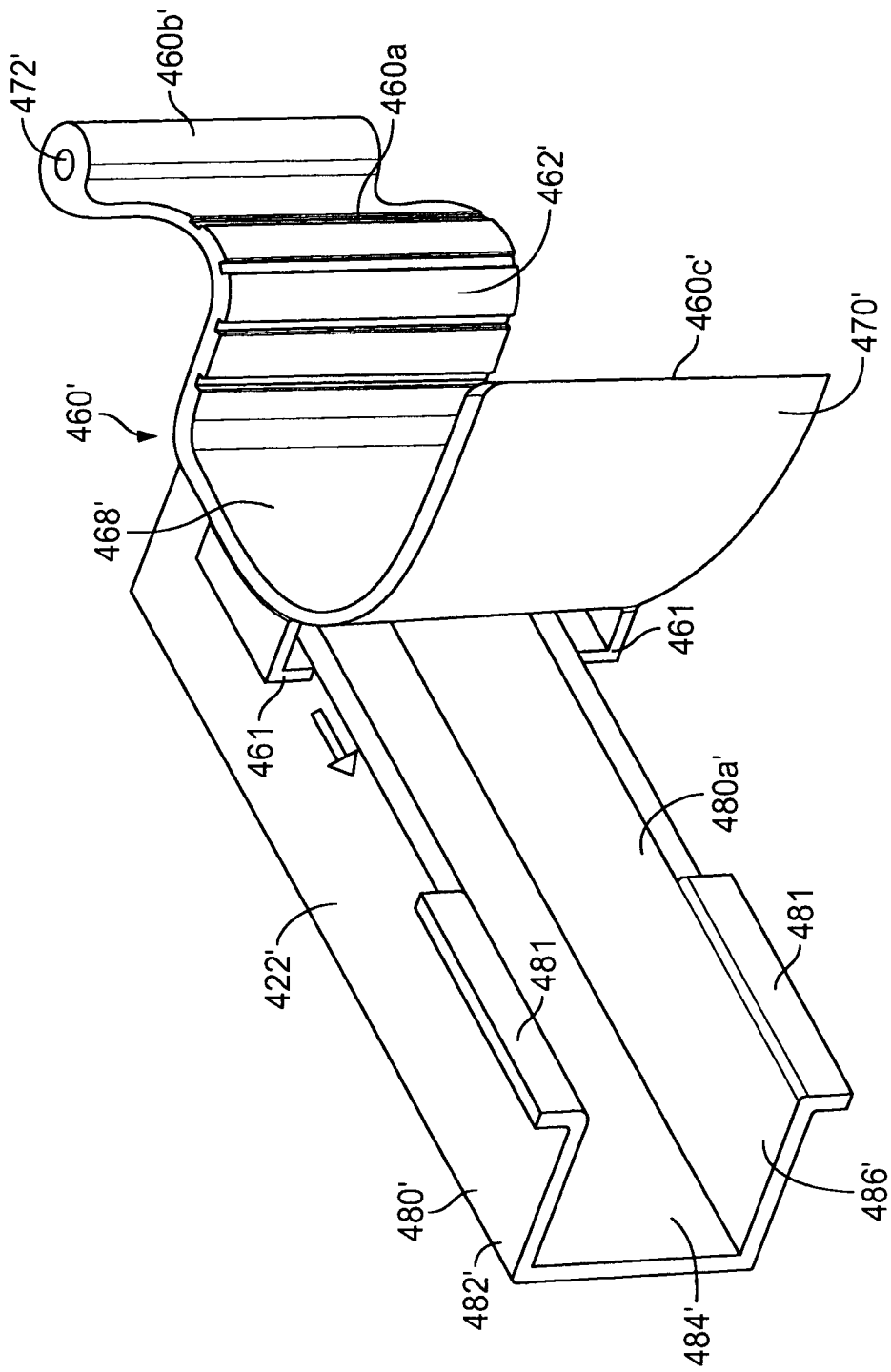
FIG. 43 is a perspective view of the bend radius limiter shown in FIG. 42 and a portion of a second embodiment of a tray usable with the system of FIG. 1.
Figure 44:
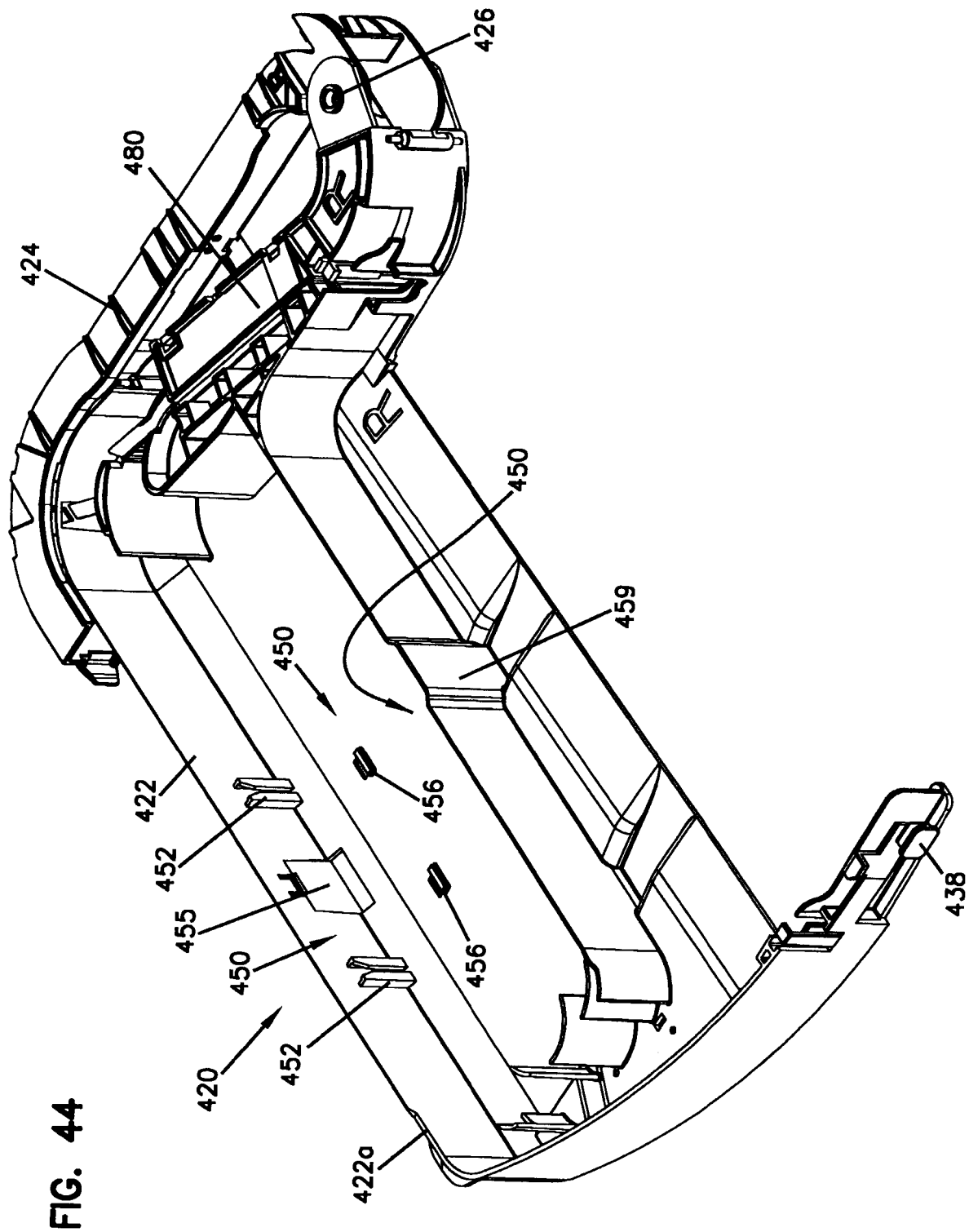
FIG. 44 is a perspective view of the tray assembly shown in FIG. 20, with the bend radius limiter removed.
Figure 45:
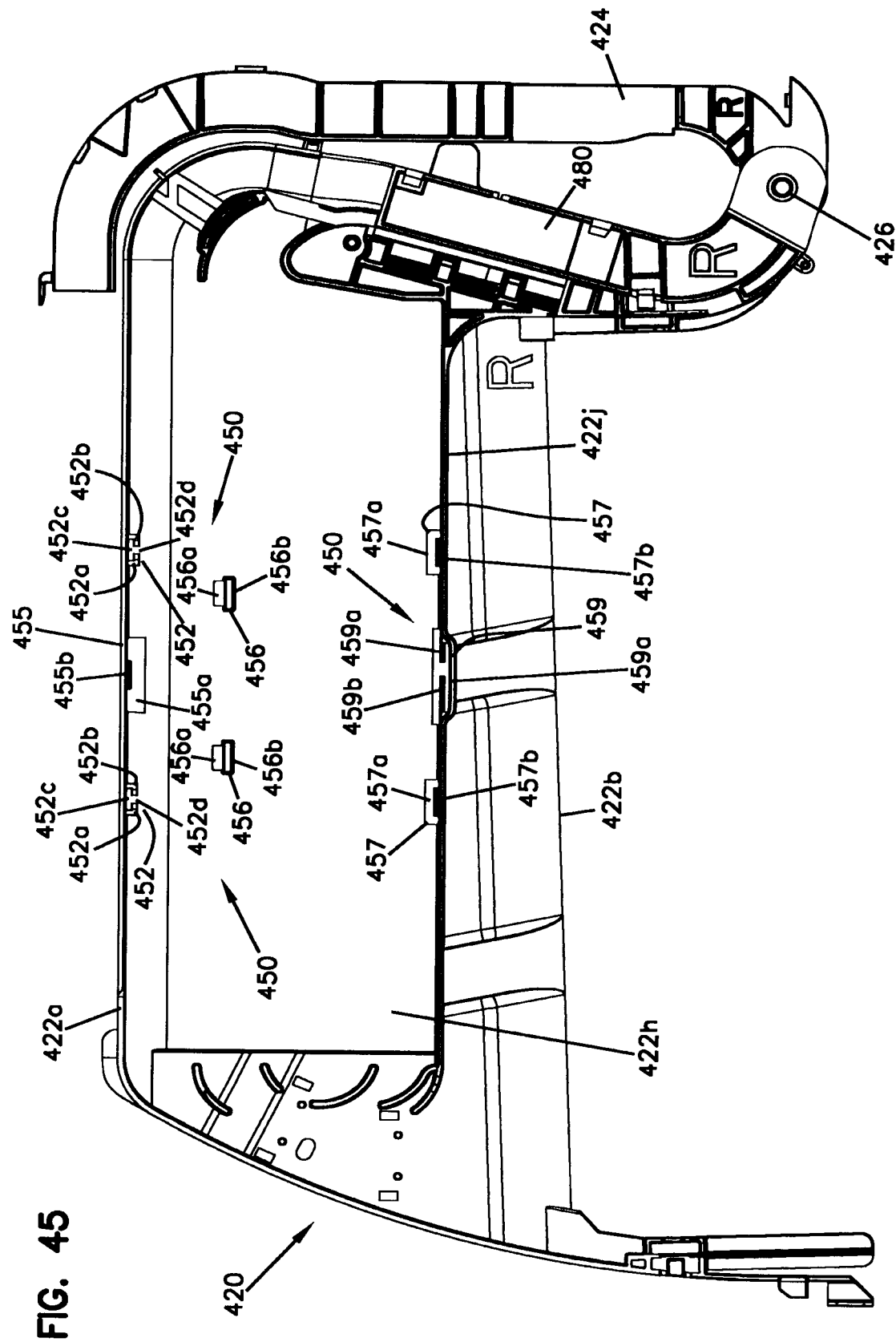
FIG. 45 is top view of the tray assembly shown in FIG. 44.

Referring to FIGS. 42 and 43, and alternative bend radius limiter 460' configuration is shown. As many of the concepts and features are similar to the first embodiment of the bend radius limiter shown in FIGS. 20-41, the description for the first embodiment is hereby incorporated by reference for the second embodiment. Where like or similar features or elements are shown, the same reference numbers will be used where possible (e.g. reference number 460' instead of reference number 60 for the limiter). The following description for the second embodiment will be limited primarily to the differences between the first and second embodiments.

The primary difference for limiter 460' is that the limiter is provided with channels 461 that slide onto corresponding ribs 481 of a modified wall structure 480'. The limiter 460' is provided with a flexible segment 462' that allows the limiter 460' to flex as the channels 461 slide along the ribs 481. This configuration allows the limiter 460' to be in an extended and closed position to at least partially close off the open face 480b. This configuration also allows the second end 460c' of the limiter 460' to be slid towards the first end 460b' until the channels 461 disengage with the ribs 481, at which point the limiter 460' can be rotated into the fully open position. In contrast to limiter 460, the limiter 460' is also provided with a stiffening element 471 that bridges horizontally across and strengthens the bend radius limiting segment 470'. Element 471 could also be utilized in conjunction with limiter 460, if desired.

Referring to FIGS. 44-57, it can be seen that the tray 422 is configured with multiple attachment feature arrangements 450 which enables the tray 422 to accept various types of telecommunications components. In one example, a pair of spaced attachment features 452 is provided at the rear sidewall 422a of the tray 422. As shown, each attachment feature 452 is provided with a first extension 452a and a second extension 452b which together define a channel 452c having an open slot 452d. The first and second extensions 452a, 452b are shown as having an L-shaped cross section, but other shapes may be used. An attachment feature 455 is also provided at the rear sidewall 422a and between the attachment features 452. As shown, the attachment feature 455 is defined by a recessed portion 455a in the rear sidewall 422a and in the bottom wall 422h and defined by a tab portion 455b located above the recessed portion 455a in the rear sidewall 422a. Another pair of attachment features 456 is provided on the bottom wall 422h. The attachment features 456 are defined by a recess 456a in the bottom wall 422h and a latch portion 456b adjacent the recess 456a.

Attachment features 450 can also be provided at the front sidewall 422j. For example, a pair of attachment features 457 can be provided, each of which is similarly configured to the attachment feature 455. As shown, each attachment feature 457 is defined by a recessed portion 457a in the front sidewall 422j and in the bottom wall 422h and defined by a tab portion 457b located above the recessed portion 457a in the front sidewall 422j. Yet another attachment feature 459 can be provided and is shown as being located between the attachment features 457. As shown, the attachment feature 459 is defined by a recess or depression in the front sidewall 422j and is further defined by a laterally extending first tab 459b and a laterally extending second tab 459c that each extend across a portion of the recess or depression 459a.

Figure 46:
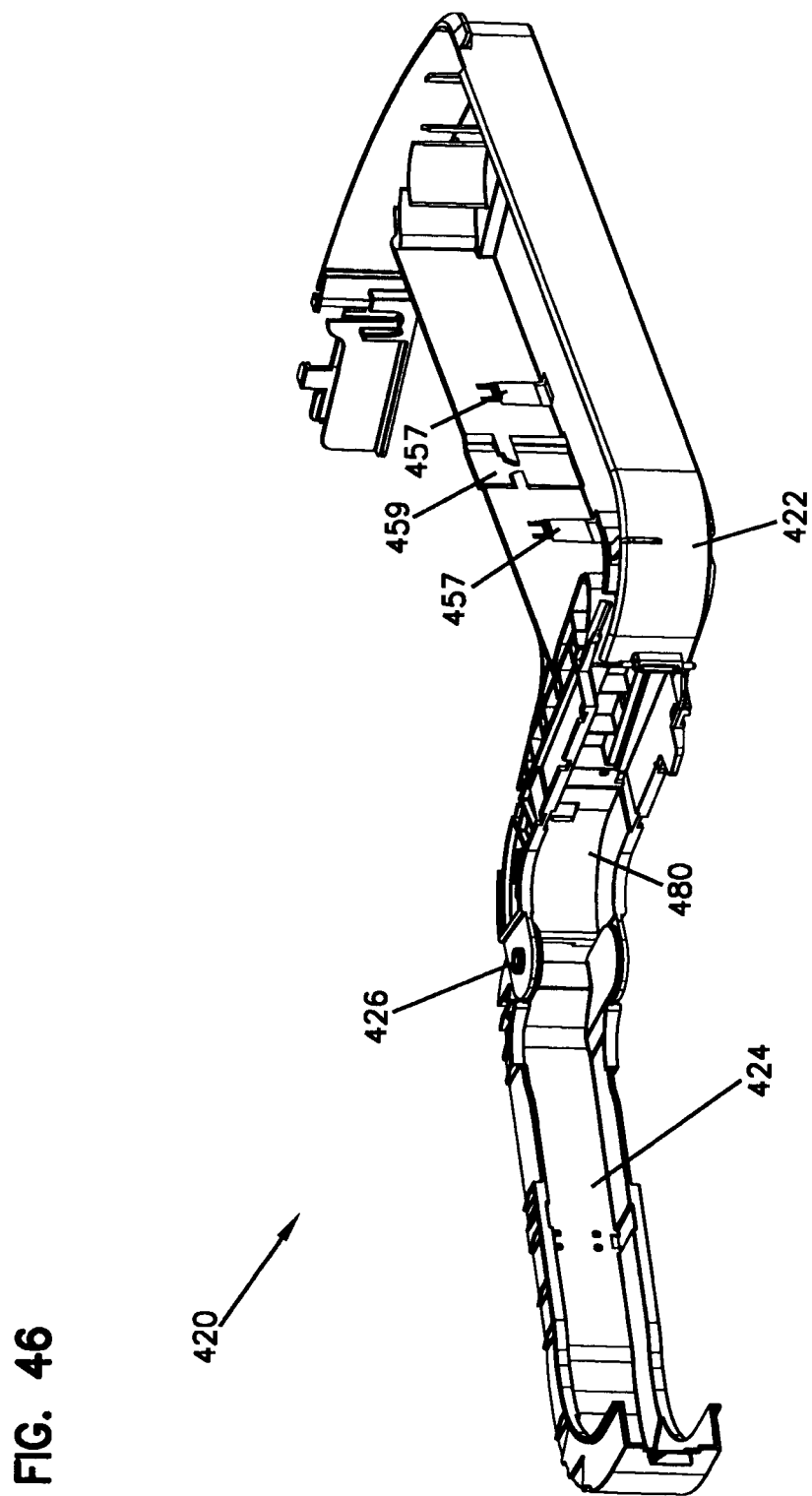
FIG. 46 is a perspective view of the tray assembly shown in FIG. 44, with the tray in an access position.
Figure 47:
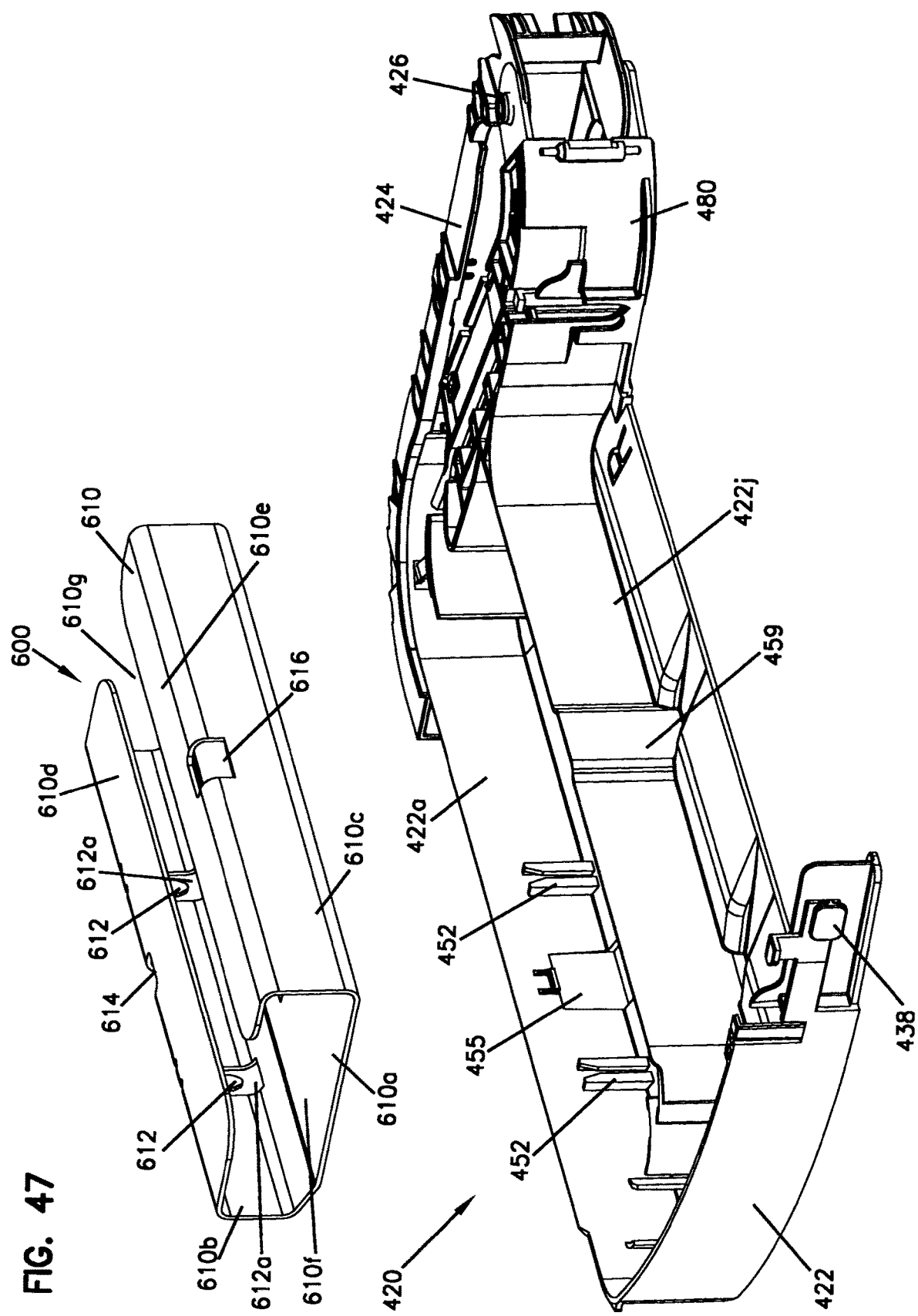
FIG. 47 is a perspective view of the tray assembly shown in FIG. 44 and a cable management structure.
Figure 48:
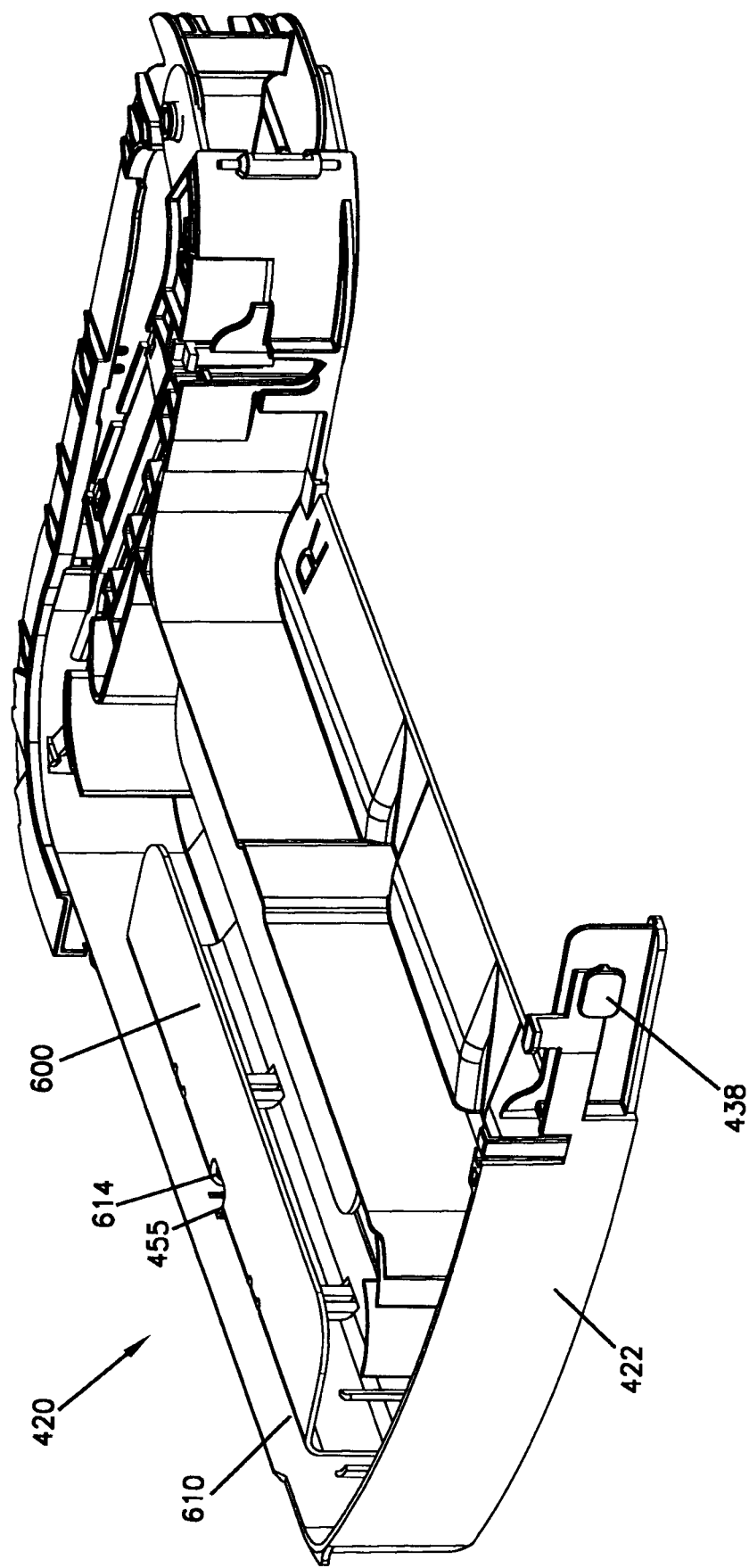
FIG. 48 is a perspective view of the tray assembly shown in FIG. 44 with the cable management structure shown in FIG. 47 installed within the tray.
Figure 49:
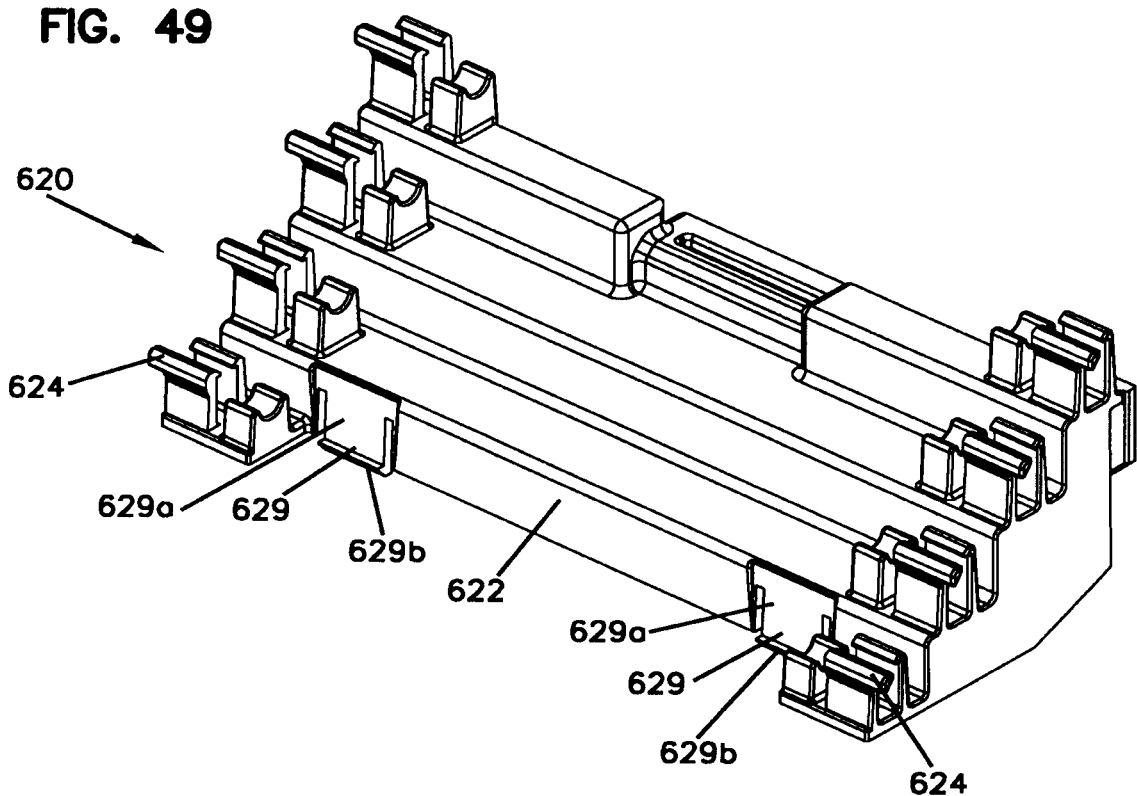
FIG. 49 is a front perspective view of a mounting base for a cable management tray.
Figure 50:
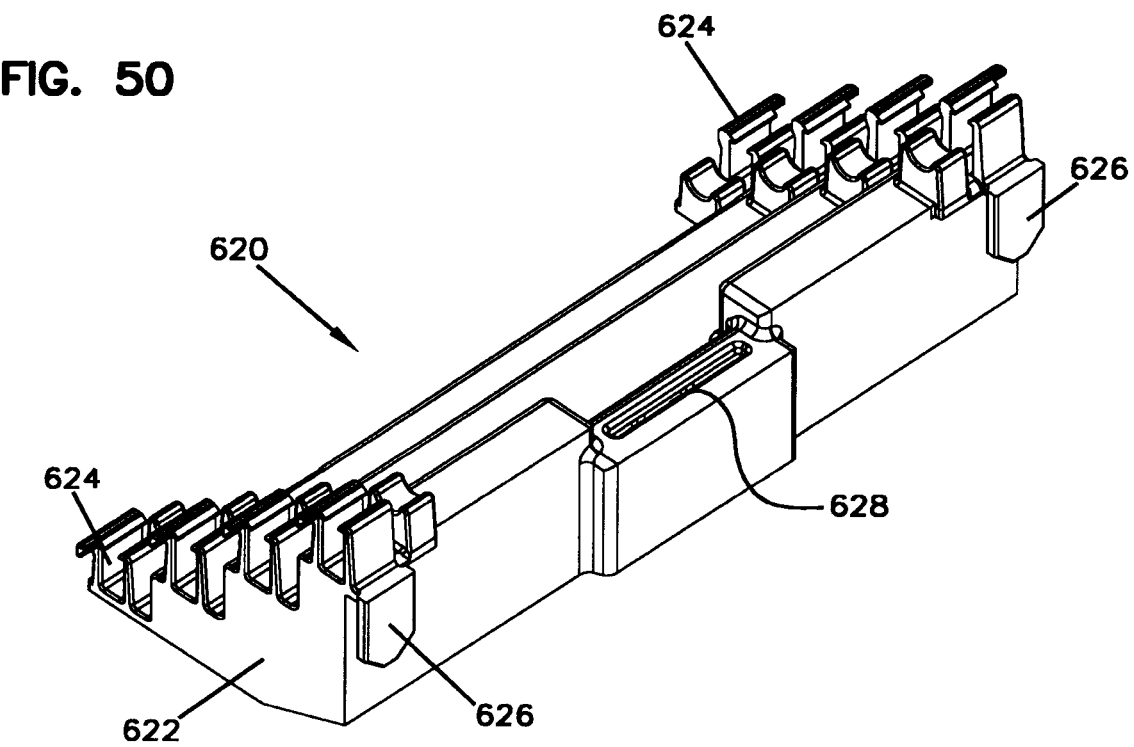
FIG. 50 is a rear perspective view of the mounting base shown in FIG. 49.
Figure 51:
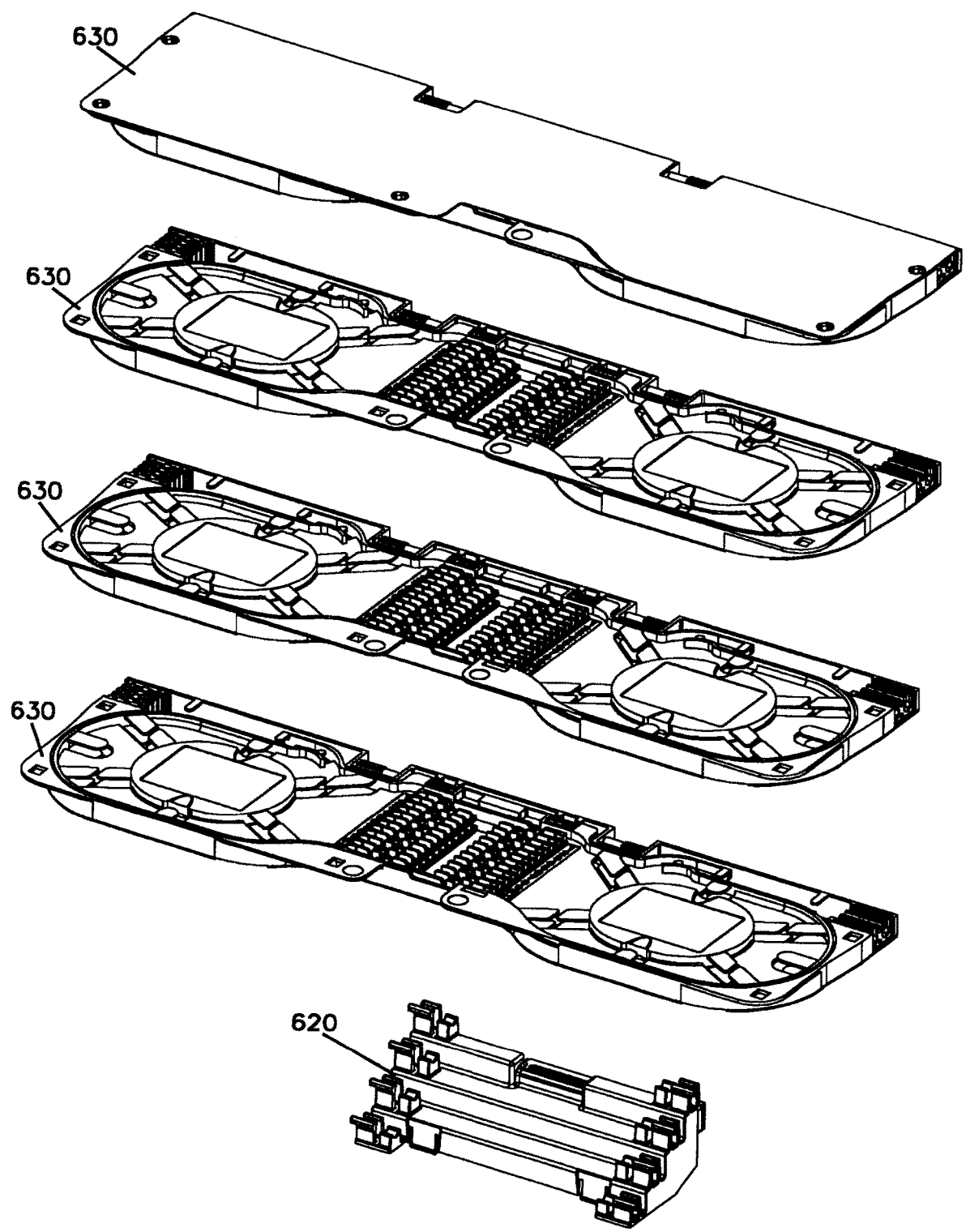
FIG. 51 is an exploded perspective view of the mounting base of FIG. 49 and a plurality of cable management trays.
Figure 52:
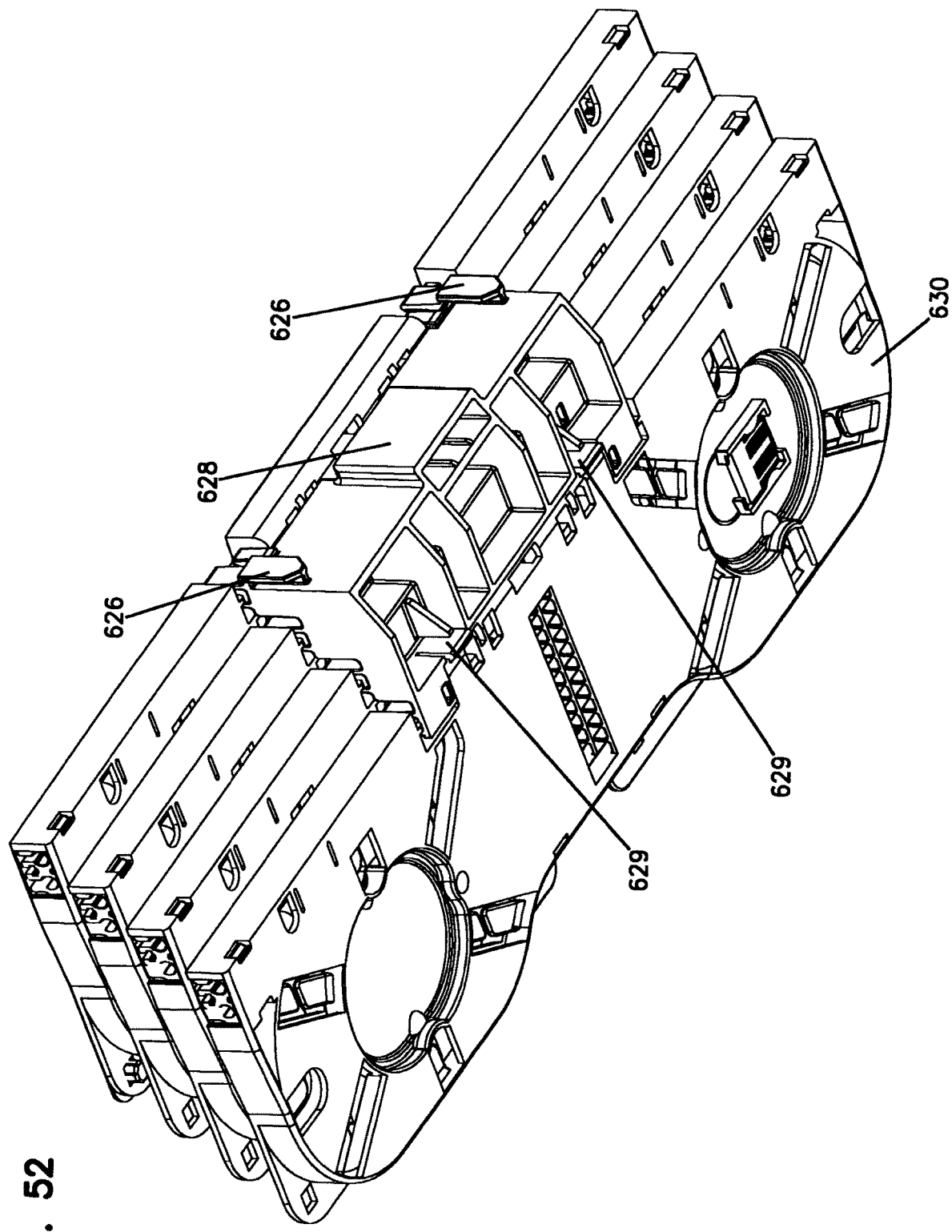
FIG. 52 is a perspective view of the cable management trays shown in FIG. 51 mounted to the mounting base shown in FIG. 49.
Figure 53:
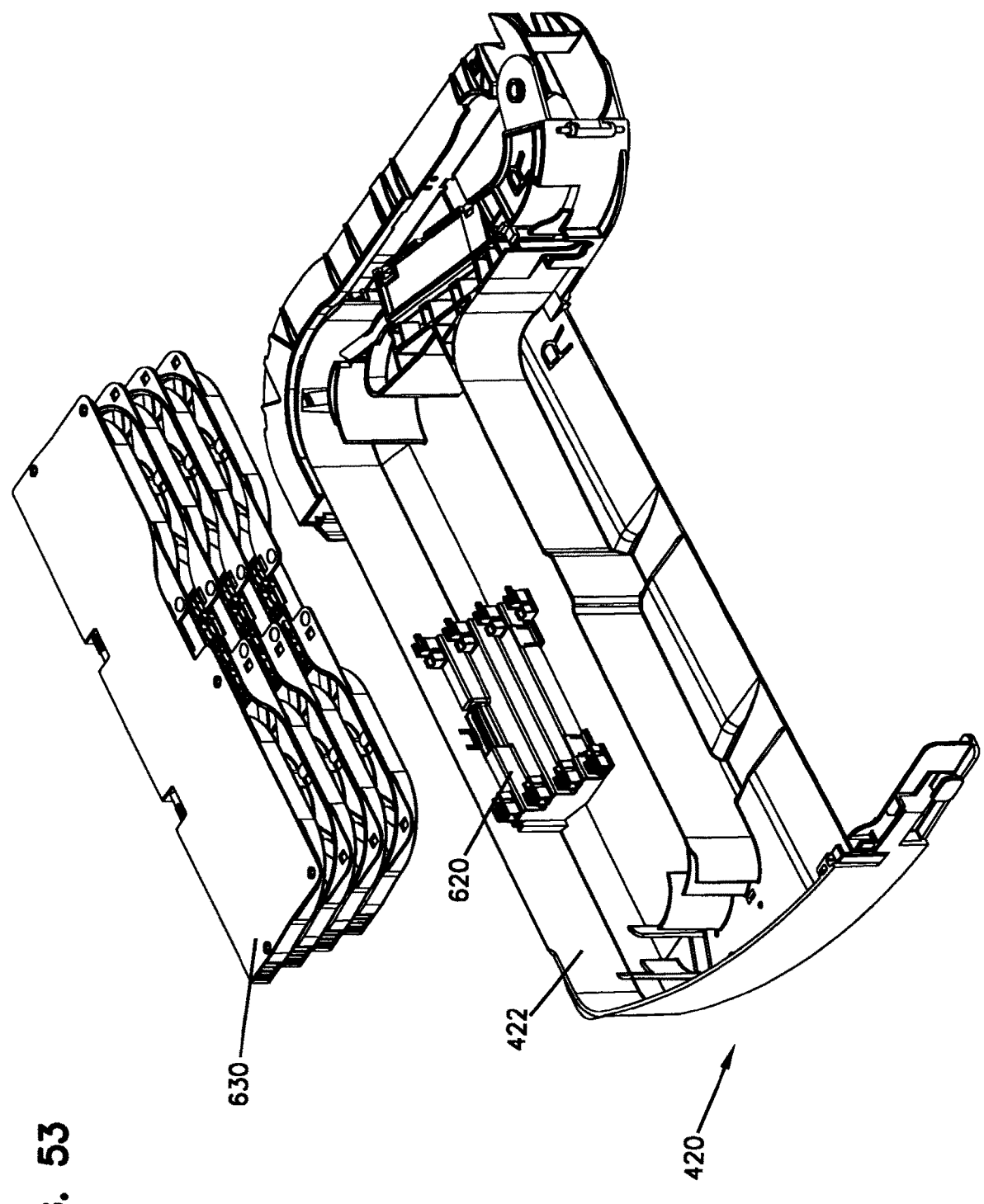
FIG. 53 is a front perspective view of the tray shown in FIG. 44 with the mounting base shown in FIG. 49 installed within the tray and with the cable management trays aligned for installation onto the base.
Figure 54:
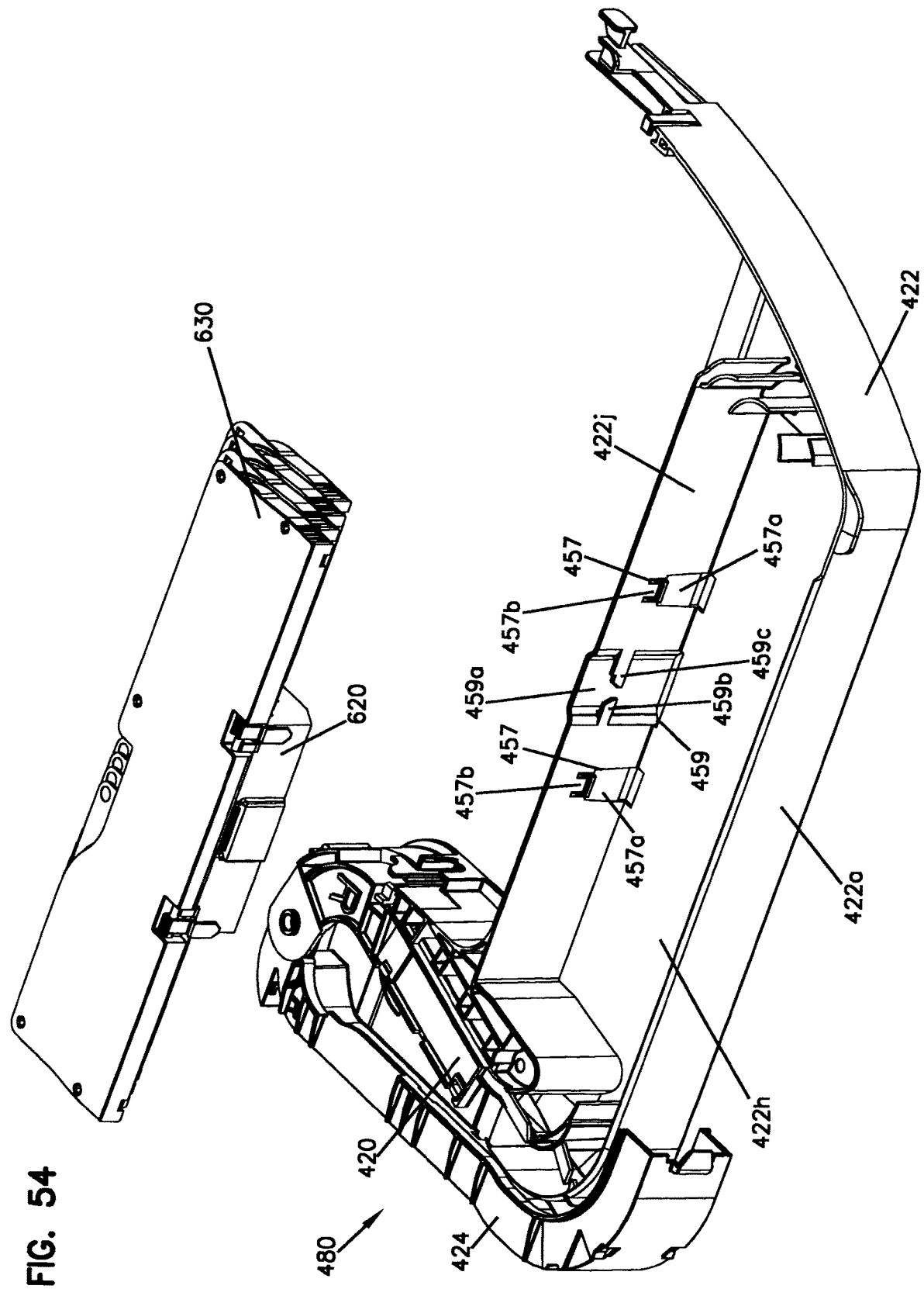
FIG. 54 is a rear perspective view of the tray shown in FIG. 44 with the mounting base shown in FIG. 49 installed within the tray and with the a cable management trays aligned for installation onto the base.

Referring to FIGS. 46 to 47, it can be seen that a cable management structure 610 can be installed into the tray 422 and secured within the tray by attachment features 452, 455, and/or 459. The cable management structure 610 is shown as being formed as channel from a singular sheet of metal, but could be formed through plastic molding or by other means. As shown, the cable management structure 610 includes a main body 610 having a bottom portion 610a from which a first sidewall 610b and a second sidewall 610c extend. A first top wall 612d extends from the first sidewall 610b while a second top wall 610e extends from the second sidewall 610c to form an interior space 610f and a slot or gap 610g through which cables can be moved into the interior space 610f. The cable management structure main body 610 is also provided with a pair of extensions 612 within a cutaway portion 612a of the main body 610 that are configured to extend into the attachment features 452. The main body 610 is also provided with an open portion 614 which engages with the tab 455b to secure the main body 610 to the tray with a snap-fit type of connection. The main body 610 can be further provided with an open portion 616 that can be used to engage with the attachment feature 459.

In an alternative configuration for the tray assembly 420, a tray mount 620 can be provided that is configured to be snap-fit into the tray 422 and to support a plurality of trays, such as fiber optic splitter and/or splice trays. The tray mount 620 is shown in greater detail at FIGS. 49 to 50 while applications using the tray mount 620 as shown at FIGS. 51-55. In one aspect, the tray mount 620 includes a main body 622 having a plurality of hinge bracket pairs 624 for rotatably supporting a tray. The main body 622 is further shown as including a first pair of extension members 626 configured to be received into the attachment features 452, a protrusion member 628 configured to be received into the recess 455a and secured by the tab portion 455b, and a pair of latch members 629 configured to engage with the attachment features 456. As shown, the extension members 626 are provided with a t-shaped cross section having a base portion 626a that can be received through the slot 452d of the attachment feature 452 and having a flange portion 626b that can be received within the interior portion 452c of the attachment feature 452. The protrusion member 628 is shown as having a cavity portion 628 into which a portion of the tab portion 455b of the attachment feature 455 can extend to provide a snap-fit connection. The latch members 629 can be provided as an extension member 629a having a deflectable free end with a catch member 629b which engages with the latch portion 456b of the attachment feature 456 which also enables the snap-fit connection.

Figure 55:
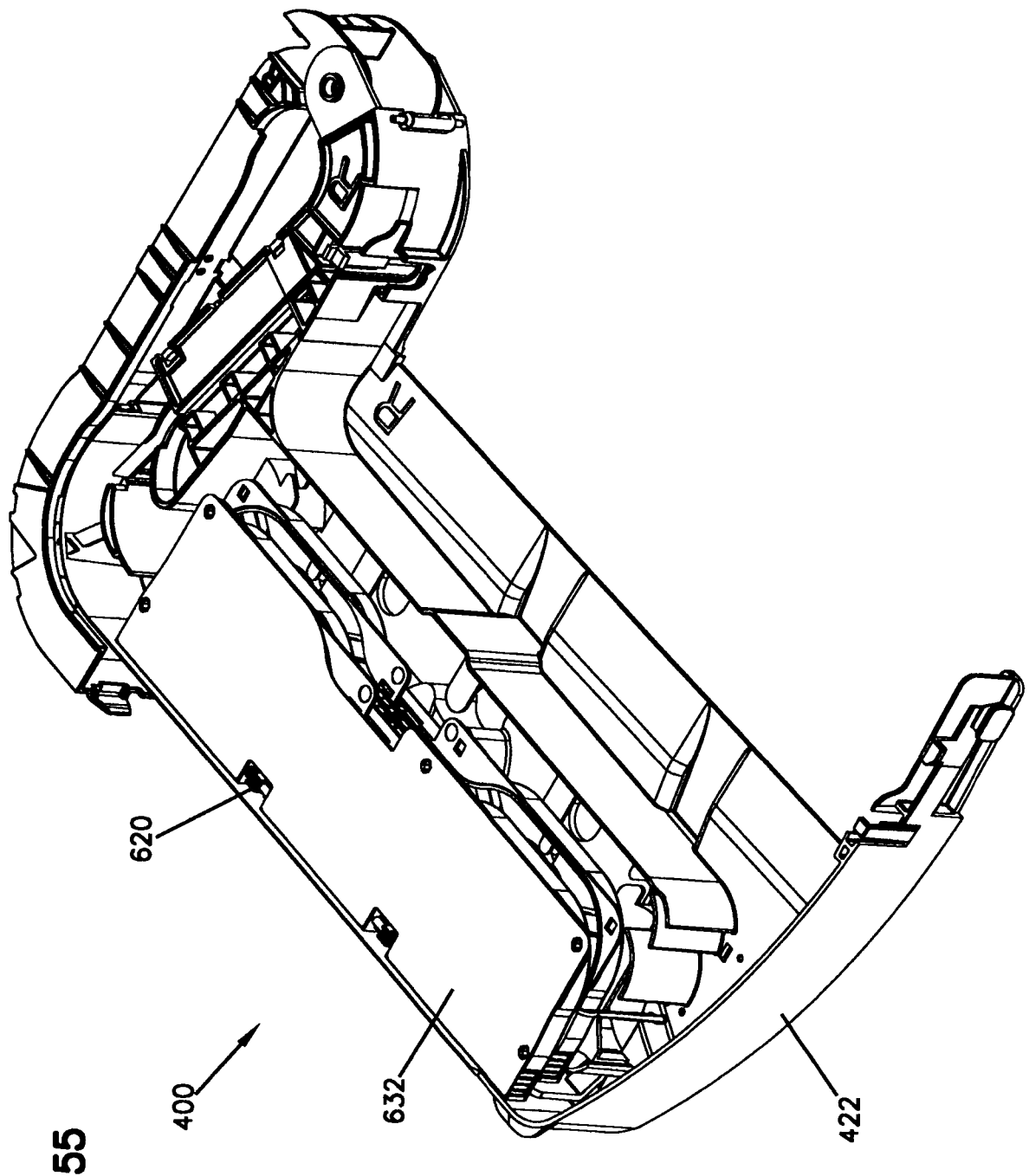
FIG. 55 is a front perspective view of the tray assembly shown in FIG. 44 with the mounting base shown in FIG. 49 installed within the tray and with a second configuration of cable management trays installed onto the base.

With the above described configuration, the tray mount 620 can be easily aligned over the tray 422 and depressed downwardly for form a snap-fit connection into the tray 422. Referring to FIGS. 51 to 54, it can be seen that the tray mount 620 can be utilized to support a plurality of splice trays 630. Referring to FIG. 55, it can be seen that the tray mount 620 can be utilized to support a plurality of splitter trays 632. The tray mount 620 can be installed into the tray 422 before the trays 630 and/or 632 are attached to the tray mount 620 or can be installed after the trays 630 and/or 632 are attached to the tray mount 620.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

LIST OF REFERENCE NUMERALS AND
CORRESPONDING FEATURES

A1 pivot axis
A2 transverse axis
A3 longitudinal connection axis
A4 front face plane
A5 pivot axis for bend radius limiter
D1 first distance
D2 second distance
D3 third distance
D4 fourth distance
1 telecommunications cabinet
10 chassis
10a rear side
10b front side
10c first side
10d second side
12 attachment slots
14 first latch recess
16 second latch recess
20 multi-positionable tray assembly
22 tray
23 tray cover
22a rear side
22b front side
22c first side
22d second side
22e interior wall structure
22f radius guides
22g cable guides
22h bottom portion
23 tray cover
24 support arm
24a first end
24b second end
24c open interior side
24d exterior side
24e top wall
24f bottom wall 26 pivot joint
28 upper joint arm
30 lower joint arm
32 upper joint extension
34 lower joint extension
36 first latch member
38 second latch member
40 attachment guide members
42 support arm cable guides
44 cable management feature
46 cable routing slot
48 cable routing aperture
50 cable management feature
52 cover hinges
54 cable management feature
100 telecommunications panel
102 cable management structure
104 patch panel
106 patch panel frame
106a first end
106b second end
108 fiber optic adapters
108a first side
108b second side
110 first fiber optic connectors
110a cabled end
112 splice tray
114 second fiber optic connectors
114a cabled end
200 folded position
202 access position
204 installed position
206 removed position
208 cable routing pathway
300 cables
302 patch cord
304 patch cord
420 tray assembly
422 tray
422a tray rear sidewall
422b tray front side
422c interior wall structure
422f radius guides
422g receiving structure
422h bottom side
422j tray front sidewall
423 support arm structure
424 support arm assembly
424a alignment feature, rib
424f bottom wall
426 pivot joint
432 upper joint extensions
434 lower joint extensions
438 latch member
440 receiving structure
442 receiving structure
446 extension tab
454 cable management part
454a recesses
454b top wall
454c bottom wall
454d back wall
454e front wall
454f front wall
454g channel
454h interior space
454i first opening
454j second opening
460 bend radius limiter
460a main body
460b first end
460b' first end
460c second end
460c' second end
460' alternative bend radius limiter
461 channels
462 first segment
464 second segment
464a ribs
464b section
466 third segment
466a ribs
466b section
468 fourth segment
468a pins
470 fifth segment
470' bend radius limiting segment
471 stiffening element
472 mounting structure
472a recesses
474 attachment features, latches
474 protrusions
476 attachment features, latches
477 alignment protrusions
480 second support arm
480a channel
480b open face
480' modified wall structure
481 ribs
482 top wall
482a attachment features, notches
483 back wall
484 bottom wall
484a attachment features, notches
485 alignment tab
486 mounting structure
486a pins
487 support member
487a tapered bottom surface
488 attachable retainer element
490 lower lug
490a base portion
490b extension portion
490c recess
492 upper lug
492a base portion
492b extension portion
492c recess
494 receiving channel
495 alignment tab
496 mounting structure
497 slot or channel
496a base portion
496b flange portion
496c recess
496d recess
498 aperture
499 mounting structure
506 patch panel frame
550 cable management feature

What is claimed is:
1. A tray assembly for mounting within a telecommunications chassis, the tray assembly comprising:

a) a rotatable tray having a base wall from which a front side wall and rear side wall extend to define a storage area, the rotatable tray being rotatable about a first pivot axis proximate a first side of the tray; and
b) an attachment arrangement integrally formed as part of the rotatable tray and being for retaining a telecommunications arrangement within the storage area, the attachment arrangement including a first attachment feature formed in the rear side wall, a second attachment feature formed in the base wall, and a third attachment feature formed in the front side wall.

2. The tray assembly of claim 1, wherein the first attachment feature includes a first receiving structure for receiving a correspondingly shaped portion of the telecommunications arrangement.

3. The tray assembly of claim 1, wherein the first attachment feature includes a first tab structure for latching with a portion of the telecommunications arrangement.

4. The tray assembly of claim 1, wherein the first attachment feature includes a first receiving structure for receiving a correspondingly shaped portion of the telecommunications arrangement and includes a first tab structure for latching with the telecommunications arrangement.

5. The tray assembly of claim 2, wherein the first receiving structure includes a pair of slots.

6. The tray assembly of claim 1, wherein each of the first attachment feature, the second attachment feature, and the third attachment feature includes a receiving structure for receiving a portion of the telecommunications arrangement.

7. The tray assembly of claim 1, wherein each of the first attachment feature, the second attachment feature, and the third attachment feature includes a tab structure for latching with the telecommunications arrangement.

8. The tray assembly of claim 1, wherein each of the first attachment feature, the second attachment feature, and the third attachment feature includes a receiving structure for receiving a portion of the telecommunications arrangement and wherein each of the first attachment feature, the second attachment feature, and the third attachment feature includes a tab structure for latching with the telecommunications arrangement.

9. A tray arrangement comprising:
a) the tray assembly of claim 1; and
b) a tray mount engaged with at least the first and second attachment features and including a plurality of trays rotatably secured to the tray mount.

10. A tray arrangement comprising:
a) the tray assembly of claim 1; and
b) a cable management structure engaged with at least the first and third attachment features.

* * * * *